US012619888B2

(12) United States Patent
Lowinger et al.

(10) Patent No.: US 12,619,888 B2
(45) Date of Patent: May 5, 2026

(54) END-TO-END SYSTEMS AND METHODS FOR CONSTRUCT SCORING

(71) Applicant: Artizan Technologies, Inc, Wilmington, DE (US)

(72) Inventors: Robert Lowinger, Miami, FL (US); Kartik Thakore, San Francisco, CA (US)

(73) Assignee: Artizan Technologies, Inc, Wilmington, DE (US)

( * ) Notice: Subject to any disclaimer, the term of this patent is extended or adjusted under 35 U.S.C. 154(b) by 23 days.

(21) Appl. No.: 18/885,745

(22) Filed: Sep. 16, 2024

(65) Prior Publication Data

US 2025/0094800 A1 Mar. 20, 2025

Related U.S. Application Data

(60) Provisional application No. 63/538,793, filed on Sep. 15, 2023, provisional application No. 63/538,790, filed on Sep. 15, 2023, provisional application No. 63/538,791, filed on Sep. 15, 2023, provisional application No. 63/538,792, filed on Sep. 15, 2023.

(51) Int. Cl.
| | |
|---|---|
| *G06N 5/022* | (2023.01) |
| *G06N 3/042* | (2023.01) |
| *G06N 3/0442* | (2023.01) |
| *G06N 3/0455* | (2023.01) |
| *G06N 3/08* | (2023.01) |
| *G06N 3/084* | (2023.01) |
| *G06N 5/045* | (2023.01) |

(52) U.S. Cl.
CPC ............. *G06N 5/022* (2013.01); *G06N 3/042* (2023.01); *G06N 3/0442* (2023.01); *G06N*

*3/0455* (2023.01); *G06N 3/08* (2013.01); *G06N 3/084* (2013.01); *G06N 5/045* (2013.01)

(58) Field of Classification Search
CPC .......... G06N 3/08; G06N 3/042; G06N 5/022; G06N 3/0442; G06N 3/0455; G06N 3/084; G06N 5/045; G06N 3/045
See application file for complete search history.

(56) References Cited

U.S. PATENT DOCUMENTS

| | | | | | |
|---|---|---|---|---|---|
| 7,996,210 | B2 * | 8/2011 | Godbole | ................. | G06F 40/10 707/706 |
| 10,349,134 | B2 * | 7/2019 | Hamiti | ................. | H04N 21/454 |
| 11,294,971 | B1 * | 4/2022 | Gokhan | ................ | G06F 16/951 |
| 11,307,881 | B1 * | 4/2022 | Bhutani | .............. | G06F 16/3347 |

(Continued)

OTHER PUBLICATIONS

Choudhury, N., Faisal, F., & Khushi, M. (2020). Mining temporal evolution of knowledge graphs and genealogical features for literature-based discovery prediction. Journal of Informetrics, 14(3), 101057. (Year: 2020).*

(Continued)

*Primary Examiner* — Usmaan Saeed
*Assistant Examiner* — Hyungjun B Yi
(74) *Attorney, Agent, or Firm* — FP; Sikander M. Khan

(57) ABSTRACT

A construct scoring system may provide construct scores with user understandable explanations of the factors that influenced the construct score determination. The construct scoring system may include a data platform architecture which may include a data layer, a processing layer, a serving layer and a monitoring layer.

13 Claims, 28 Drawing Sheets

Context Vector

(56) References Cited

U.S. PATENT DOCUMENTS

| | | | |
|---|---|---|---|
| 11,586,826 B2 * | 2/2023 | Kehler | G06F 18/24155 |
| 12,020,265 B1 * | 6/2024 | Mao | G06Q 30/0243 |
| 12,099,533 B2 * | 9/2024 | Osuala | G06F 16/3338 |
| 2014/0257921 A1 * | 9/2014 | Bear | G06Q 30/0269 |
| | | | 705/7.29 |
| 2023/0214264 A1 * | 7/2023 | Qiao | G06F 9/5027 |
| | | | 718/104 |
| 2024/0104623 A1 * | 3/2024 | Deng | G06F 18/29 |
| 2024/0203599 A1 * | 6/2024 | Liu | G16H 50/70 |
| 2024/0265015 A1 * | 8/2024 | Badii | G06F 16/2452 |

OTHER PUBLICATIONS

Hamdan, H., & Ganascia, J. G. (2017). Graph Centrality Measures for Boosting Popularity-Based Entity Linking. arXiv preprint arXiv:1712.00044. (Year: 2017).*

Liu, J., & Zhong, Y. (2022). Time-weighted community search based on interest. Applied Sciences, 12(14), 7077. (Year: 2022).*

Zhong, Q., Ding, L., Liu, J., Du, B., Jin, H., & Tao, D. (2023). Knowledge graph augmented network towards multiview representation learning for aspect-based sentiment analysis. IEEE Transactions on knowledge and data engineering, 35(10), 10098-10111. (Year: 2023).*

Chatterjee, S., & Simonoff, J. S. (2013). Handbook of regression analysis. John Wiley & Sons. (Year: 2013).*

* cited by examiner

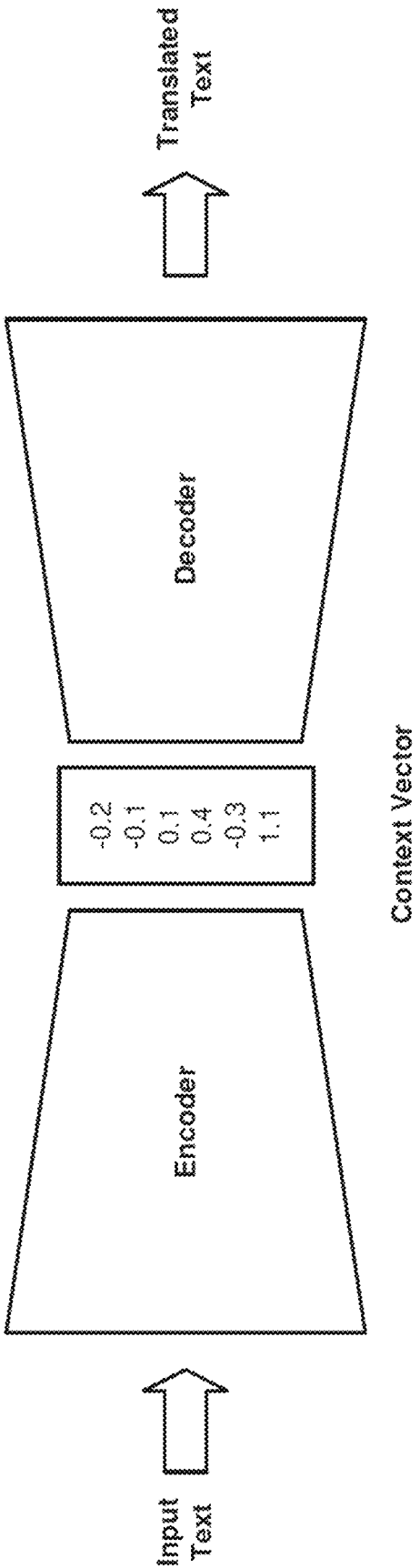
FIG. 1

```
batch_size = tf.shape(x)[0]

x = self.rescale(x)

patches = self.extract_patches(x)

x = self.patch_proj(patches)

class_emb = tf.broadcast_to(
    self.class_emb, [batch_size, 1, self.d_model]
)

x = tf.concat([class_emb, x], axis=1)

x = x + self.pos_emb for layer in self.enc_layers:
    x = layer(x, training)

return self.mlp_head(x[:, 0])
```

FIG. 10

FIG. 12

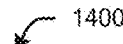

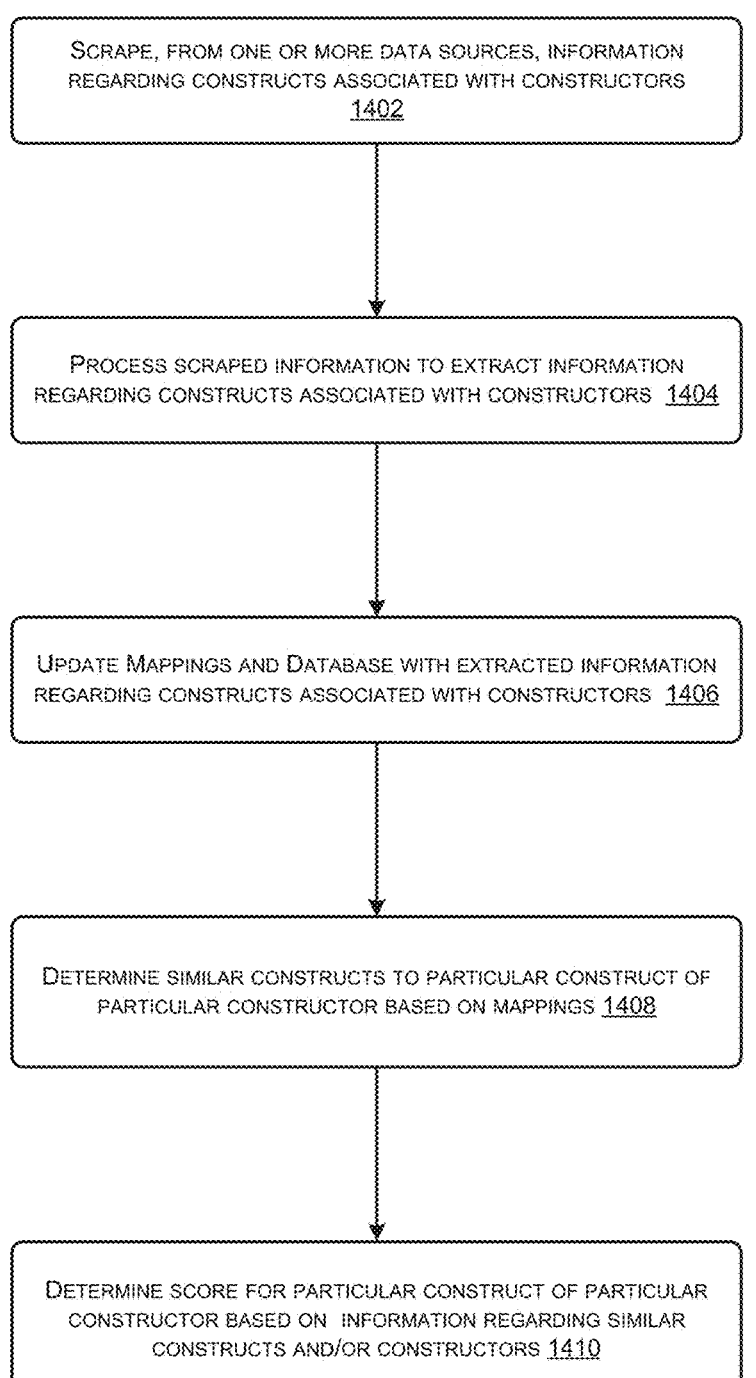

SCRAPE, FROM ONE OR MORE DATA SOURCES, INFORMATION REGARDING CONSTRUCTS ASSOCIATED WITH CONSTRUCTORS
1402

PROCESS SCRAPED INFORMATION TO EXTRACT INFORMATION REGARDING CONSTRUCTS ASSOCIATED WITH CONSTRUCTORS  1404

UPDATE MAPPINGS AND DATABASE WITH EXTRACTED INFORMATION REGARDING CONSTRUCTS ASSOCIATED WITH CONSTRUCTORS  1406

DETERMINE SIMILAR CONSTRUCTS TO PARTICULAR CONSTRUCT OF PARTICULAR CONSTRUCTOR BASED ON MAPPINGS 1408

DETERMINE SCORE FOR PARTICULAR CONSTRUCT OF PARTICULAR CONSTRUCTOR BASED ON  INFORMATION REGARDING SIMILAR CONSTRUCTS AND/OR CONSTRUCTORS 1410

FIG. 14

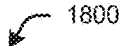

1800

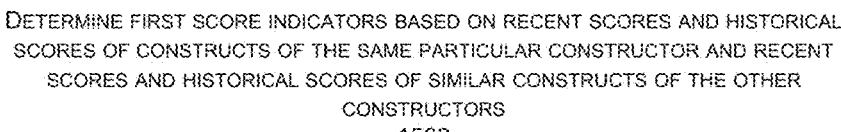

DETERMINE FIRST SCORE INDICATORS BASED ON RECENT SCORES AND HISTORICAL SCORES OF CONSTRUCTS OF THE SAME PARTICULAR CONSTRUCTOR AND RECENT SCORES AND HISTORICAL SCORES OF SIMILAR CONSTRUCTS OF THE OTHER CONSTRUCTORS
1502

DETERMINE SECOND SCORE INDICATORS BASED ON RATE OF OCCURRENCE OF INSTANCES OF INFORMATION FROM DATA SOURCES REGARDING PARTICULAR CONSTRUCT, PARTICULAR CONSTRUCTOR, SIMILAR CONSTRUCTS AND CONSTRUCTORS, AND CATEGORIES OF THE PARTICULAR CONSTRUCT, PARTICULAR CONSTRUCTOR AND SENTIMENT ANALYSIS OF THOSE INSTANCES 1504

DETERMINE BASELINE SCORE FOR PARTICULAR CONSTRUCT OF PARTICULAR CONSTRUCTOR BASED ON WEIGHTING OF FIRST SCORE INDICATORS AND SECOND SCORE INDICATORS 1506

FIG. 15

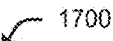
1700

RECEIVE QUERY FOR SCORE FOR PARTICULAR CONSTRUCT 1702

DETERMINE SIMILAR CONSTRUCTS TO PARTICULAR CONSTRUCT OF PARTICULAR CONSTRUCTOR BASED ON MAPPINGS OF CONSTRUCTS AND ASSOCIATED CONSTRUCTORS 1704

DETERMINE A PLURALITY OF CURRENT POPULARITY INDICATORS OF THE PARTICULAR CONSTRUCT INCLUDING OR BASED ON RECENT SCORES AND HISTORICAL SCORES OF CONSTRUCTS OF THE SAME PARTICULAR CONSTRUCTOR, RECENT SCORES AND HISTORICAL SCORES OF SIMILAR CONSTRUCTS OF OTHER CONSTRUCTORS, RATE OF OCCURRENCE OF INSTANCES OF INFORMATION FROM DATA SOURCES REGARDING PARTICULAR CONSTRUCT, PARTICULAR CONSTRUCTOR, SIMILAR CONSTRUCTS, SIMILAR CONSTRUCTORS, OR CATEGORIES OF THE PARTICULAR CONSTRUCT, PARTICULAR CONSTRUCTOR AND SENTIMENT ANALYSIS OF THOSE INSTANCES 1706

DETERMINE A SCORE FOR THE PARTICULAR CONSTRUCT USING THE PLURALITY OF CURRENT POPULARITY INDICATORS OF THE PARTICULAR CONSTRUCT 1708

DISPLAY THE SCORE OF THE PARTICULAR CONSTRUCT OF THE PARTICULAR CONSTRUCTOR 1710

DISPLAY THE PLURALITY OF CURRENT POPULARITY INDICATORS WITH THE SCORE 1712

FIG. 17

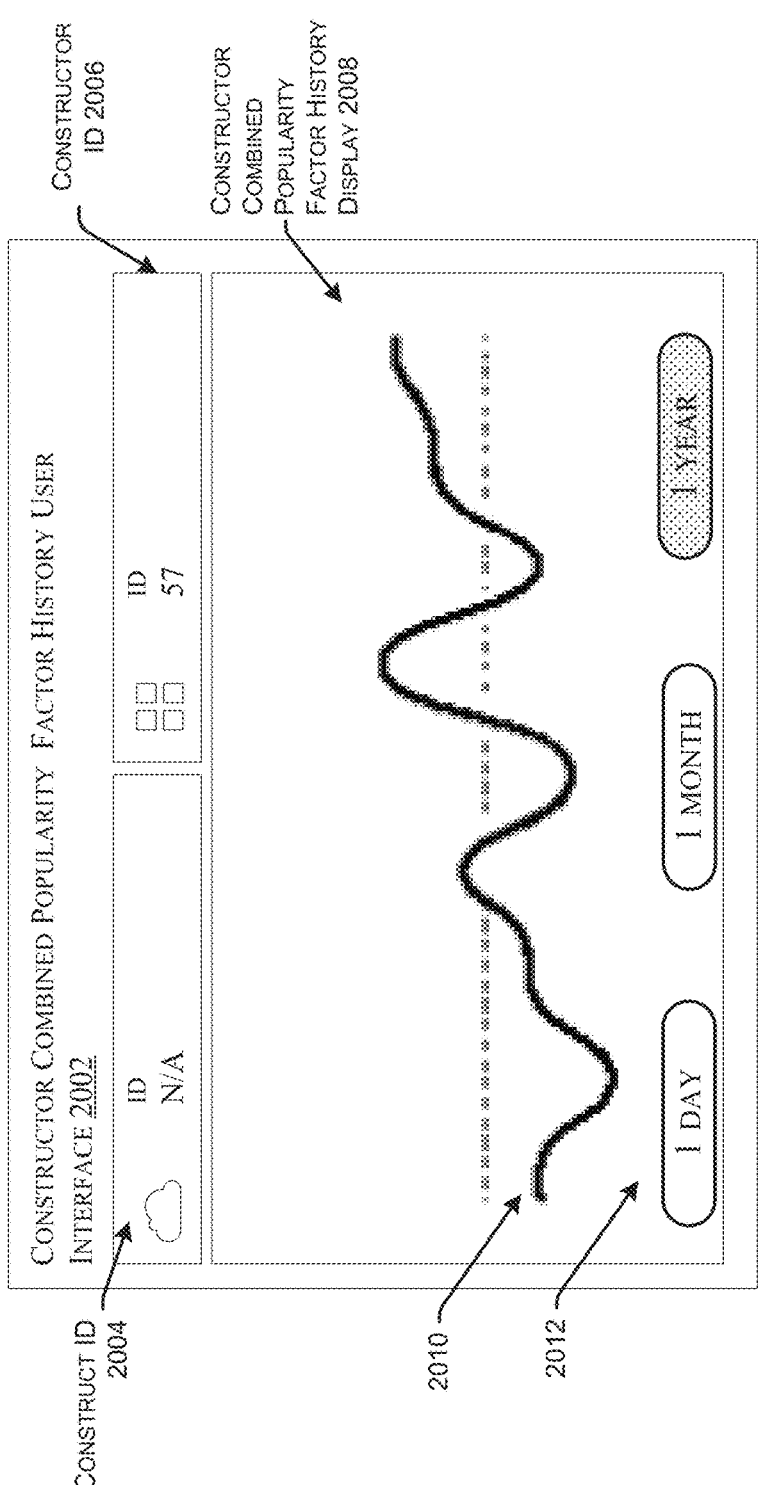
FIG. 20

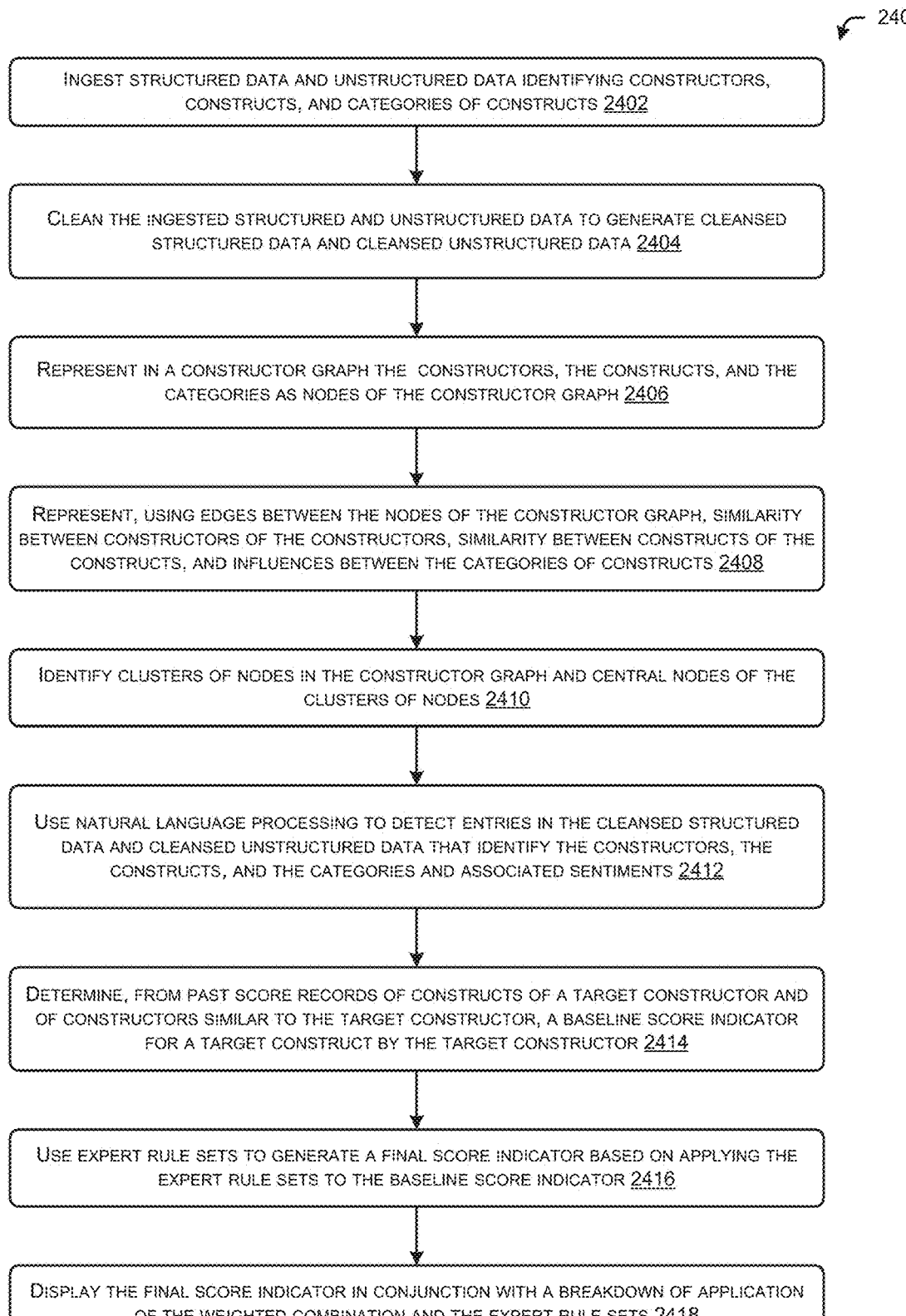

2400

INGEST STRUCTURED DATA AND UNSTRUCTURED DATA IDENTIFYING CONSTRUCTORS, CONSTRUCTS, AND CATEGORIES OF CONSTRUCTS <u>2402</u>

CLEAN THE INGESTED STRUCTURED AND UNSTRUCTURED DATA TO GENERATE CLEANSED STRUCTURED DATA AND CLEANSED UNSTRUCTURED DATA <u>2404</u>

REPRESENT IN A CONSTRUCTOR GRAPH THE CONSTRUCTORS, THE CONSTRUCTS, AND THE CATEGORIES AS NODES OF THE CONSTRUCTOR GRAPH <u>2406</u>

REPRESENT, USING EDGES BETWEEN THE NODES OF THE CONSTRUCTOR GRAPH, SIMILARITY BETWEEN CONSTRUCTORS OF THE CONSTRUCTORS, SIMILARITY BETWEEN CONSTRUCTS OF THE CONSTRUCTS, AND INFLUENCES BETWEEN THE CATEGORIES OF CONSTRUCTS <u>2408</u>

IDENTIFY CLUSTERS OF NODES IN THE CONSTRUCTOR GRAPH AND CENTRAL NODES OF THE CLUSTERS OF NODES <u>2410</u>

USE NATURAL LANGUAGE PROCESSING TO DETECT ENTRIES IN THE CLEANSED STRUCTURED DATA AND CLEANSED UNSTRUCTURED DATA THAT IDENTIFY THE CONSTRUCTORS, THE CONSTRUCTS, AND THE CATEGORIES AND ASSOCIATED SENTIMENTS <u>2412</u>

DETERMINE, FROM PAST SCORE RECORDS OF CONSTRUCTS OF A TARGET CONSTRUCTOR AND OF CONSTRUCTORS SIMILAR TO THE TARGET CONSTRUCTOR, A BASELINE SCORE INDICATOR FOR A TARGET CONSTRUCT BY THE TARGET CONSTRUCTOR <u>2414</u>

USE EXPERT RULE SETS TO GENERATE A FINAL SCORE INDICATOR BASED ON APPLYING THE EXPERT RULE SETS TO THE BASELINE SCORE INDICATOR <u>2416</u>

DISPLAY THE FINAL SCORE INDICATOR IN CONJUNCTION WITH A BREAKDOWN OF APPLICATION OF THE WEIGHTED COMBINATION AND THE EXPERT RULE SETS <u>2418</u>

FIG. 24

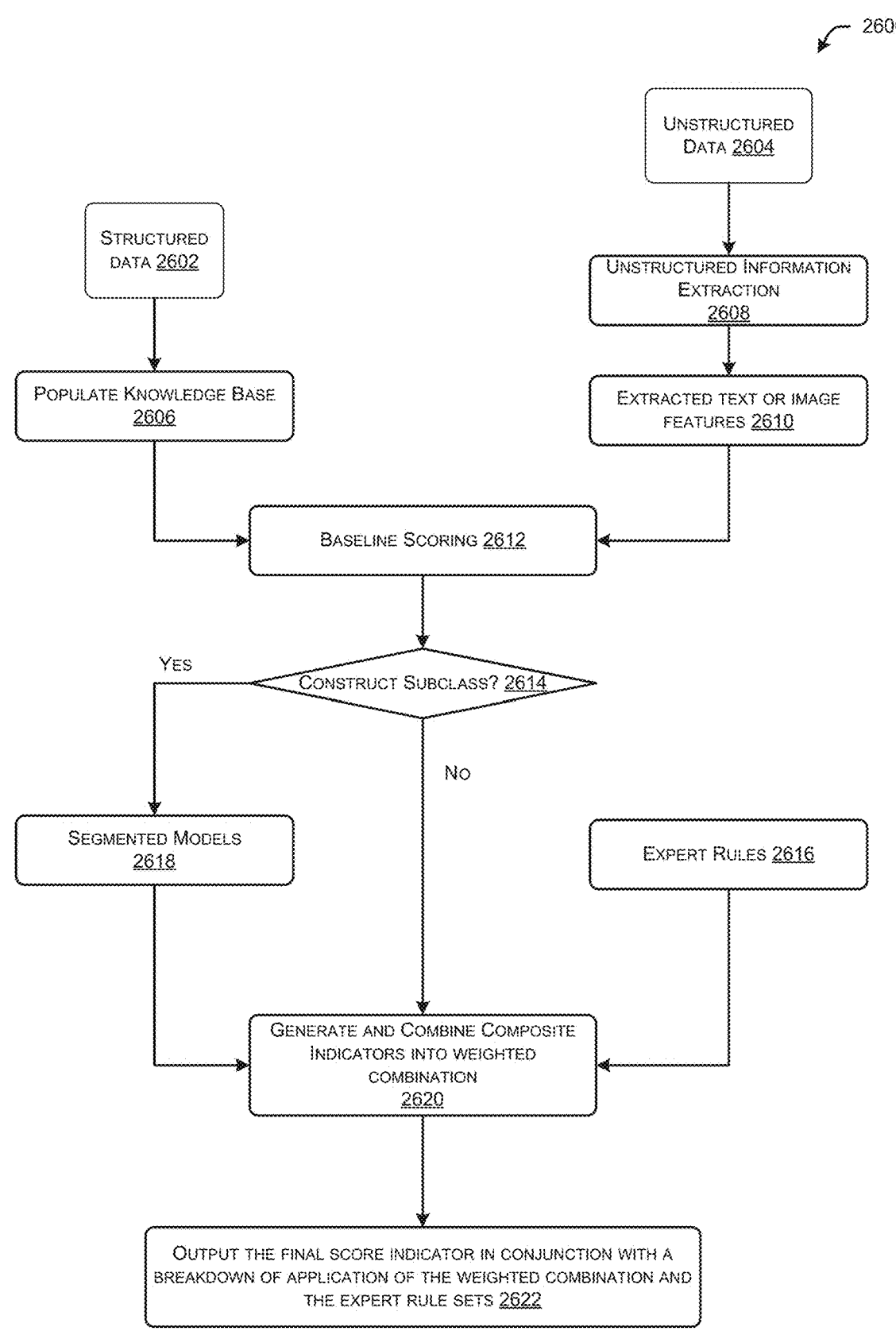

2600

UNSTRUCTURED DATA 2604

STRUCTURED DATA 2602

UNSTRUCTURED INFORMATION EXTRACTION 2608

POPULATE KNOWLEDGE BASE 2606

EXTRACTED TEXT OR IMAGE FEATURES 2610

BASELINE SCORING 2612

CONSTRUCT SUBCLASS? 2614

YES

NO

SEGMENTED MODELS 2618

EXPERT RULES 2616

GENERATE AND COMBINE COMPOSITE INDICATORS INTO WEIGHTED COMBINATION 2620

OUTPUT THE FINAL SCORE INDICATOR IN CONJUNCTION WITH A BREAKDOWN OF APPLICATION OF THE WEIGHTED COMBINATION AND THE EXPERT RULE SETS 2622

FIG. 26

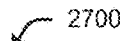
2700

INGEST STRUCTURED DATA AND UNSTRUCTURED DATA IDENTIFYING CONSTRUCTORS, CONSTRUCTS, AND CATEGORIES OF CONSTRUCTS 2702

REPRESENT IN A CONSTRUCTOR SCORING GRAPH THE CONSTRUCTORS, THE CONSTRUCTS, AND THE CATEGORIES AS NODES OF THE CONSTRUCTOR GRAPH 2704

REPRESENT, USING EDGES BETWEEN THE NODES OF THE CONSTRUCTOR GRAPH, SIMILARITY BETWEEN CONSTRUCTORS OF THE CONSTRUCTORS, SIMILARITY BETWEEN CONSTRUCTS OF THE CONSTRUCTS, AND INFLUENCES BETWEEN THE CATEGORIES OF CONSTRUCTS, SIMILARITY IN HISTORICAL SCORING OF CONSTRUCTS OVER TIME 2706

PERFORM PATH ANALYSIS AND WEIGHTED EDGE TRAVERSAL OF THE CONSTRUCTOR SCORING GRAPH TO IDENTIFY CHAINS OF CORRELATION AND CAUSATION BETWEEN CONSTRUCTS AND REPRESENT CHAINS OF CORRELATIONS AND CAUSATIONS AS CAUSAL EDGES THAT REPRESENT DRIVER-DRIVEN RELATIONSHIPS BETWEEN SCORES OF RELATED OR SIMILAR CONSTRUCTS 2708

IDENTIFY CLUSTERS OF NODES IN THE CONSTRUCTOR SCORING GRAPH AND UTILIZE CENTRALITY MEASURES TO DETERMINE CENTRAL NODES OF THE CLUSTERS OF NODES AS THE MOST INFLUENTIAL CONSTRUCTS OF THE CLUSTERS 2710

GENERATE OR VALIDATE CONSTRUCT SCORING INDICATORS BASED ON ADJACENT CORRELATED CONSTRUCT AND CAUSAL RELATIONSHIPS 2712

FIG. 27

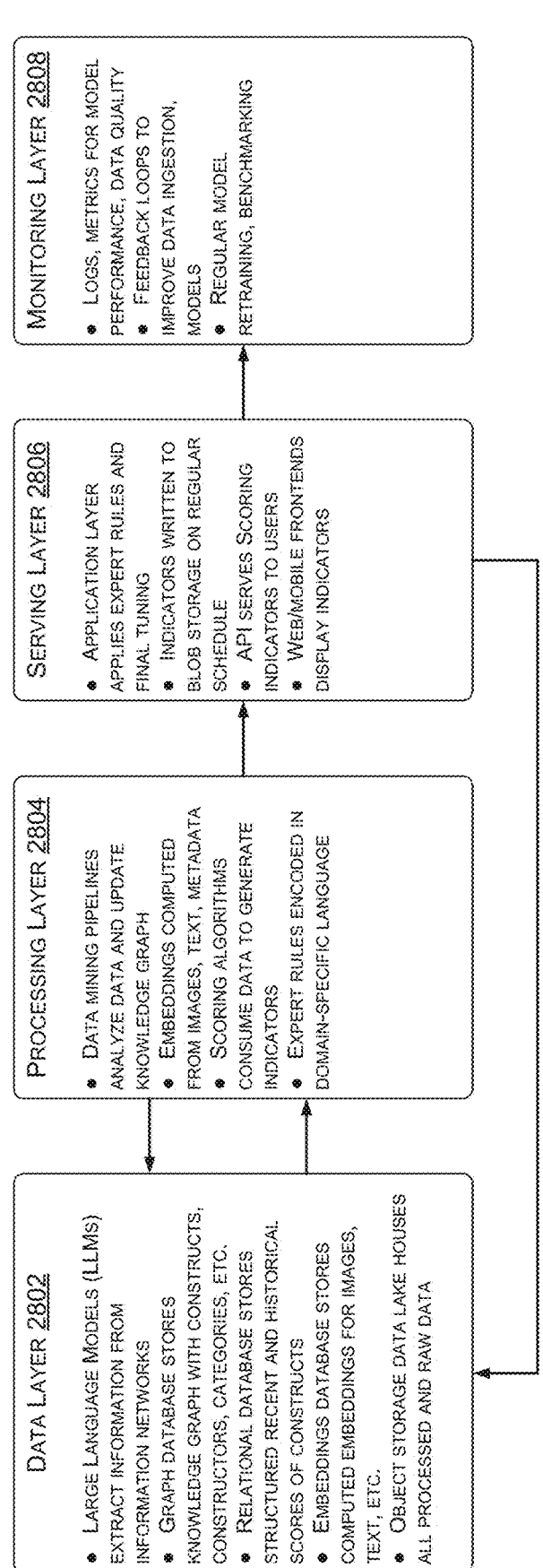
FIG. 28

END-TO-END SYSTEMS AND METHODS FOR CONSTRUCT SCORING

PRIORITY DATA

This patent application claims the benefit of and priority to the following four U.S. Provisional Patent Applications:

U.S. Provisional Patent Application No. 63/538,790, titled "ACCURATE ARTWORK PRICE PREDICTION," filed Sep. 15, 2023 ;

U.S. Provisional Patent Application No. 63/538,791, titled "INTERFACE FOR ARTWORK PRICE PREDICTION," filed Sep. 15, 2023;

U.S. Provisional Patent Application No. 63/538,792, titled "ARTIFICIAL INTELLIGENCE-BASED ARTWORK PRICE PREDICTION," filed Sep. 15, 2023; and U.S. Provisional Patent Application No. 63/538,793, titled "END-TO-END SYSTEMS AND METHODS FOR ARTWORK PRICE PREDICTION," filed Sep. 15, 2023.

The priority U.S. Provisional Patent Applications are incorporated herein by reference in their entirety and for all purposes as if completely and fully set forth herein.

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Deep learning is a frontier for artificial intelligence, aiming to be closer to its primary goal—artificial intelligence. Deep learning has seen great success in a wide variety of applications, such as natural language processing, speech recognition, medical applications, computer vision, and intelligent transportation systems. The great success of deep learning is due to the larger models. The scale of these models has included hundreds of millions of parameters. These hundreds of millions of parameters allow the model to have more degrees of freedom enough to produce awe-inspiring description capability.

However, the large number of parameters requires a massive amount of training data with labels. Improving model performance by data annotation has two crucial challenges. On the one hand, the data growth rate is far behind the growth rate of model parameters, so data growth has primarily hindered the further development of the model. On the other hand, the emergence of new tasks has far exceeded the speed of data updates, and annotating for all samples is laborious.

To tackle this challenge, new datasets are built by generating synthetic samples, thereby speeding up model iteration and reducing the cost of data annotation. Pre-training methods and transfer learning have also been used to solve this challenge, such as Transformers, BERT, and GPT. These works have achieved incredible results.

However, the generated data is only used as base data to initialize the model. In order to obtain a high-precision usable model, it is often necessary to label and update specific data.

Integrating apriori knowledge in the learning framework is an effective means to deal with sparse data, as the learner does not need to induce the knowledge from the data itself. As special agents, humans have rich prior knowledge. If the machine can learn human wisdom and knowledge, it will help deal with sparse data.

Human-in-the-loop (HITL) addresses these issues by incorporating human knowledge into the modeling process. HITL aims to train an accurate prediction model with minimum cost by integrating human knowledge and experience. Humans can provide training data for machine learning applications and directly accomplish some tasks that are hard for computers in the pipeline with the help of machine-based approaches.

At present, there is still a high degree of coupling between deep learning tasks and data, and the performance of deep learning largely depends on the quality of the data. For a new task, if you want to obtain better performance, you need to provide a large amount of high-quality labeled data. However, the labeled data requires a large amount of labor. In addition, large-scale data annotation takes a long time, and many iterations of tasks cannot wait such a long time. Unlike weak annotate and automatic annotate, HITL-based methods emphasize finding the key samples that play a decisive factor in new sample data.

A core set is a weighted subset of a larger set. A core set guarantees that a model fitting the core set also fits the larger set. Core set construction methods perform importance sampling with respect to sensitivity score, to provide high-probability solutions for a particular problem, such as k-means and k-median clustering, naïve Bayes and nearest-neighbors, mixture models, low rank approximation, spectral approximation, Nystrom methods, and Bayesian inference.

Supervised learning usually requires a large set of labeled data to train the prediction model. As the learning algorithms become more and more complicated, the required size of training set gets larger and larger. Meanwhile, labeling data examples is rather expensive, because the annotation process is usually time-consuming and needs high expertise in some difficult tasks. It is thus a significant challenge to learn with insufficient labeled data.

Active learning is a primary approach to overcome this challenge. It iteratively selects the most useful examples from the unlabeled dataset to query their labels from the oracle. After adding the newly labeled data into the training set, the model can be updated to achieve better performance. The key task in active learning is how to accurately estimate the potential utility of an example on improving the performance, such that the model can be well trained with minimal queries.

An opportunity arises to use machine learning and artificial intelligence approaches for construct scoring. Accelerated deep learning with minimal coding may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIG. 1 is a schematic representation of an encoder-decoder architecture.

FIG. 10 shows example software code that implements a Transformer block.

FIG. 12 illustrates a schematic diagram of an example environment with service system(s), construct system(s), data storage, information network(s), other data source(s), and client device(s) that may enable construct scoring, in accordance with example embodiments of the disclosure.

FIG. 14 illustrates a flow diagram of an example method that may provide functionality for determining a score for a construct, in accordance with example embodiments of the disclosure.

FIG. 15 illustrates a flow diagram of an example method that may provide functionality for determining a baseline score for a particular construct, in accordance with example embodiments of the disclosure.

FIG. 17 illustrates a flow diagram of an example method that may provide functionality for determining a score for a construct and providing the score with an explanation of factors used in its determination, in accordance with example embodiments of the disclosure.

FIG. 20 illustrates an example view of a constructor combined popularity factor user interface that may be presented to a user requesting to know the history of the popularity for a particular constructor, in accordance with example embodiments of the disclosure.

FIG. 24 illustrates a flow diagram of an example method that may provide functionality for determining a score for a construct and providing the score with an explanation of factors used in its determination, in accordance with example embodiments of the disclosure.

FIG. 26 illustrates a data flow diagram of an example process that may provide functionality for determining a score for a construct and providing the score with an explanation of factors used in its determination, in accordance with example embodiments of the disclosure.

FIG. 27 illustrates a flow diagram of an example method that may provide functionality for determining a baseline score for a construct and providing the baseline score with an explanation of factors used in its determination, in accordance with example embodiments of the disclosure.

FIG. 28 illustrates a block diagram of an example system architecture that may provide a construct score with an explanation of factors used in its determination, in accordance with examples of the disclosure.

DETAILED DESCRIPTION

Figure 2:
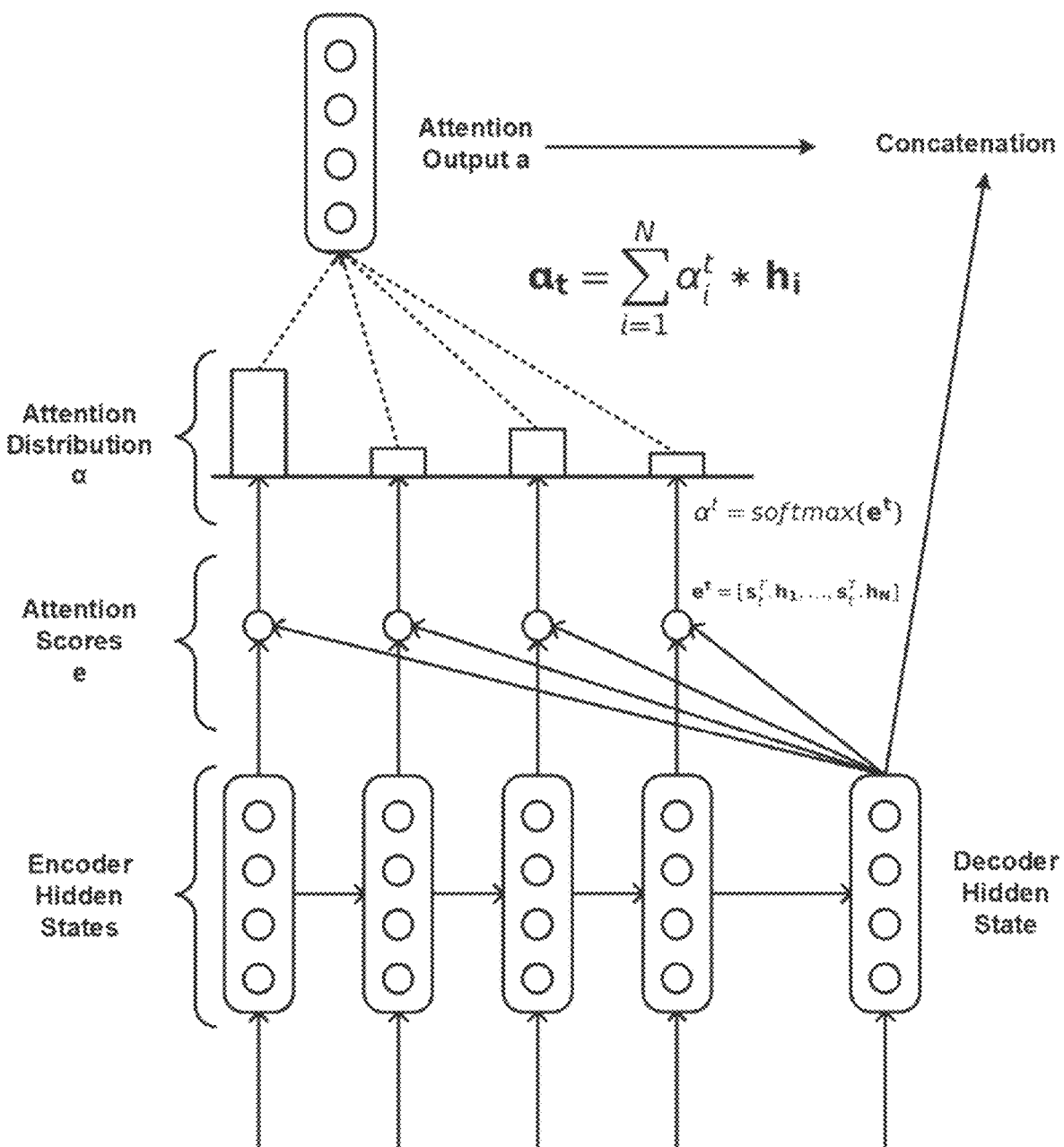
FIG. 2 shows an overview of an attention mechanism added onto an RNN encoder-decoder architecture.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Some implementations of the technology disclosed relate to using a Transformer model to provide an AI system. In particular, the technology disclosed proposes an AI management system based on the Transformer architecture. The Transformer model relies on a self-attention mechanism to compute a series of context-informed vector-space representations of elements in the input sequence and the output sequence, which are then used to predict distributions over subsequent elements as the model predicts the output sequence element-by-element. Not only is this mechanism straightforward to parallelize, but as each input's representation is also directly informed by all other inputs' representations, this results in an effectively global receptive field across the whole input sequence. This stands in contrast to, e.g., convolutional architectures which typically only have a limited receptive field.

In one implementation, the disclosed AI system is a multilayer perceptron (MLP). In another implementation, the disclosed AI system is a feedforward neural network. In yet another implementation, the disclosed AI system is a fully connected neural network. In a further implementation, the disclosed AI system is a fully convolution neural network. In a yet further implementation, the disclosed AI system is a semantic segmentation neural network. In a yet another further implementation, the disclosed AI system is a generative adversarial network (GAN) (e.g., CycleGAN, StyleGAN, pixelRNN, text-2-image, DiscoGAN, IsGAN). In a yet another implementation, the disclosed AI system includes self-attention mechanisms like Transformer, Vision Transformer (ViT), Bidirectional Transformer (BERT), Detection Transformer (DETR), Deformable DETR, UP-DETR, DeiT, Swin, GPT, iGPT, GPT-2, GPT-3, various ChatGPT versions, various LLaMA versions, BERT, Span-BERT, RoBERTa, XLNet, ELECTRA, UniLM, BART, T5, ERNIE (THU), KnowBERT, DeiT-Ti, DeiT-S, DeiT-B, T2T-ViT-14, T2T-ViT-19, T2T-ViT-24, PVT-Small, PVT-Medium, PVT-Large, TNT-S, TNT-B, CPVT-S, CPVT-S-GAP, CPVT-B, Swin-T, Swin-S, Swin-B, Twins-SVT-S, Twins-SVT-B, Twins-SVT-L, Shuffle-T, Shuffle-S, Shuffle-B, XCiT-S12/16, CMT-S, CMT-B, VOLO-D1, VOLO-D2, VOLO-D3, VOLO-D4, MoCo v3, ACT, TSP, Max-Deep-Lab, VisTR, SETR, Hand-Transformer, HOT-Net, METRO, Image Transformer, Taming transformer, TransGAN, IPT, TTSR, STTN, Masked Transformer, CLIP, DALL-E, Cogview, UniT, ASH, TinyBert, FullyQT, ConvBert, FCOS, Faster R-CNN+FPN, DETR-DC5, TSP-FCOS, TSP-RCNN, ACT+MKDD (L=32), ACT+MKDD (L=16), SMCA, Efficient DETR, UP-DETR, UP-DETR, ViTB/16-FRCNN, ViT-B/16-FRCNN, PVT-Small+RetinaNet, Swin-T+RetinaNet, Swin-T+ATSS, PVT-Small+DETR, TNT-S+DETR, YOLOS-Ti, YOLOS-S, and YOLOS-B.

In one implementation, the disclosed AI system is a convolution neural network (CNN) with a plurality of convolution layers. In another implementation, the disclosed AI system is a recurrent neural network (RNN) such as a long short-term memory network (LSTM), bi-directional LSTM (Bi-LSTM), or a gated recurrent unit (GRU). In yet another implementation, the disclosed AI system includes both a CNN and an RNN.

In yet other implementations, the disclosed AI system can use 1D convolutions, 2D convolutions, 3D convolutions, 4D convolutions, 5D convolutions, dilated or atrous convolutions, transpose convolutions, depthwise separable convolutions, pointwise convolutions, 1×1 convolutions, group convolutions, flattened convolutions, spatial and cross-channel convolutions, shuffled grouped convolutions, spatial separable convolutions, and deconvolutions. The disclosed AI system can use one or more loss functions such as logistic regression/log loss, multi-class cross-entropy/softmax loss, binary cross-entropy loss, mean-squared error loss, L1 loss, L2 loss, smooth L1 loss, and Huber loss. The disclosed AI system can use any parallelism, efficiency, and compression schemes such TFRecords, compressed encoding (e.g., PNG), sharding, parallel calls for map transformation, batching, prefetching, model parallelism, data parallelism, and synchronous/asynchronous stochastic gradient descent (SGD). The disclosed AI system can include upsampling layers, downsampling layers, recurrent connections, gates and gated memory units (like an LSTM or GRU), residual blocks, residual connections, highway connections, skip connections, peephole connections, activation functions (e.g., non-linear transformation functions like rectifying linear unit (ReLU), leaky ReLU, exponential liner unit (ELU), sigmoid and hyperbolic tangent (tanh)), batch normalization layers, regularization layers, dropout, pooling layers (e.g., max or average pooling), global average pooling layers, and attention mechanisms.

The disclosed AI system can be a linear regression model, a logistic regression model, an Elastic Net model, a support vector machine (SVM), a random forest (RF), a decision tree, and a boosted decision tree (e.g., XGBoost), or some other tree-based logic (e.g., metric trees, kd-trees, R-trees, universal B-trees, X-trees, ball trees, locality sensitive hashes, and inverted indexes). The disclosed AI system can be an ensemble of multiple models, in some implementations.

In some implementations, the disclosed AI system can be trained using backpropagation-based gradient update techniques. Example gradient descent techniques that can be used for training the disclosed AI system include stochastic gradient descent, batch gradient descent, and mini-batch gradient descent. Some examples of gradient descent optimization algorithms that can be used to train the disclosed AI system are Momentum, Nesterov accelerated gradient, Adagrad, Adadelta, RMSprop, Adam, AdaMax, Nadam, and AMSGrad.

Transformer Logic

Machine learning is the use and development of computer systems that can learn and adapt without following explicit instructions, by using algorithms and statistical models to analyze and draw inferences from patterns in data. Some of the state-of-the-art models use Transformers, a more powerful and faster model than neural networks alone. Transformers originate from the field of natural language processing (NLP), but can be used in computer vision and many other fields. Neural networks process input in series and weight relationships by distance in the series. Transformers can process input in parallel and do not necessarily weigh by distance. For example, in natural language processing, neural networks process a sentence from beginning to end with the weights of words close to each other being higher than those further apart. This leaves the end of the sentence very disconnected from the beginning causing an effect called the vanishing gradient problem. Transformers look at each word in parallel and determine weights for the relationships to each of the other words in the sentence. These relationships are called hidden states because they are later condensed for use into one vector called the context vector. Transformers can be used in addition to neural networks. This architecture is described here.

Encoder-Decoder Architecture

FIG. 1 is a schematic representation of an encoder-decoder architecture. This architecture is often used for NLP and has two main building blocks. The first building block is the encoder that encodes an input into a fixed-size vector. In the system we describe here, the encoder is based on a recurrent neural network (RNN). At each time step, t, a hidden state of time step, t−1, is combined with the input value at time step t to compute the hidden state at timestep t. The hidden state at the last time step, encoded in a context vector, contains relationships encoded at all previous time steps. For NLP, each step corresponds to a word. Then the context vector contains information about the grammar and the sentence structure. The context vector can be considered a low-dimensional representation of the entire input space. For NLP, the input space is a sentence, and a training set consists of many sentences.

The context vector is then passed to the second building block, the decoder. For translation, the decoder has been trained on a second language. Conditioned on the input context vector, the decoder generates an output sequence. At each time step, t, the decoder is fed the hidden state of time step, t–1, and the output generated at time step, t–1. The first hidden state in the decoder is the context vector, generated by the encoder. The context vector is used by the decoder to perform the translation.

The whole model is optimized end-to-end by using back-propagation, a method of training a neural network in which the initial system output is compared to the desired output and the system is adjusted until the difference is minimized. In backpropagation, the encoder is trained to extract the right information from the input sequence, the decoder is trained to capture the grammar and vocabulary of the output language. This results in a fluent model that uses context and generalizes well. When training an encoder-decoder model, the real output sequence is used to train the model to prevent mistakes from stacking. When testing the model, the previously predicted output value is used to predict the next one.

When performing a translation task using the encoder-decoder architecture, all information about the input sequence is forced into one vector, the context vector. Information connecting the beginning of the sentence with the end is lost, the vanishing gradient problem. Also, different parts of the input sequence are important for different parts of the output sequence, information that cannot be learned using only RNNs in an encoder-decoder architecture.

Attention Mechanism

Attention mechanisms distinguish Transformers from other machine learning models. The attention mechanism provides a solution for the vanishing gradient problem. FIG. 2 shows an overview of an attention mechanism added onto an RNN encoder-decoder architecture. At every step, the decoder is given an attention score, e, for each encoder hidden state. In other words, the decoder is given weights for each relationship between words in a sentence. The decoder uses the attention score concatenated with the context vector during decoding. The output of the decoder at time step t is based on all encoder hidden states and the attention outputs. The attention output captures the relevant context for time step t from the original sentence. Thus, words at the end of a sentence may now have a strong relationship with words at the beginning of the sentence. In the sentence "The quick brown fox, upon arriving at the doghouse, jumped over the lazy dog," fox and dog can be closely related despite being far apart in this complex sentence.

To weight encoder hidden states, a dot product between the decoder hidden state of the current time step, and all encoder hidden states, is calculated. This results in an attention score for every encoder hidden state. The attention scores are higher for those encoder hidden states that are similar to the decoder hidden state of the current time step. Higher values for the dot product indicate the vectors are pointing more closely in the same direction. The attention scores are converted to fractions that sum to one using the SoftMax function.

The SoftMax scores provide an attention distribution. The x-axis of the distribution is position in a sentence. The y-axis is attention weight. The scores show which encoder hidden states are most closely related. The SoftMax scores specify which encoder hidden states are the most relevant for the decoder hidden state of the current time step.

The elements of the attention distribution are used as weights to calculate a weighted sum over the different encoder hidden states. The outcome of the weighted sum is called the attention output. The attention output is used to predict the output, often in combination (concatenation) with the decoder hidden states. Thus, both information about the inputs, as well as the already generated outputs, can be used to predict the next outputs.

By making it possible to focus on specific parts of the input in every decoder step, the attention mechanism solves the vanishing gradient problem. By using attention, information flows more directly to the decoder. It does not pass through many hidden states. Interpreting the attention step can give insights into the data. Attention can be thought of as a soft alignment. The words in the input sequence with a high attention score align with the current target word. Attention describes long-range dependencies better than RNN alone. This enables analysis of longer, more complex sentences.

The attention mechanism can be generalized as: given a set of vector values and a vector query, attention is a technique to compute a weighted sum of the vector values, dependent on the vector query. The vector values are the encoder hidden states, and the vector query is the decoder hidden state at the current time step.

The weighted sum can be considered a selective summary of the information present in the vector values. The vector query determines on which of the vector values to focus. Thus, a fixed-size representation of the vector values can be created, in dependence upon the vector query.

The attention scores can be calculate by the dot product, or by weighing the different values (multiplicative attention).

Embeddings

For most machine learning models, the input to the model needs to be numerical. The input to a translation model is a sentence, and words are not numerical. multiple methods exist for the conversion of words into numerical vectors. These numerical vectors are called the embeddings of the words. Embeddings can be used to convert any type of symbolic representation into a numerical one.

Embeddings can be created by using one-hot encoding. The one-hot vector representing the symbols has the same length as the total number of possible different symbols. Each position in the one-hot vector corresponds to a specific symbol. For example, when converting colors to a numerical vector, the length of the one-hot vector would be the total number of different colors present in the dataset. For each input, the location corresponding to the color of that value is one, whereas all the other locations are valued at zero. This works well for working with images. For NLP, this becomes problematic, because the number of words in a language is very large. This results in enormous models and the need for a lot of computational power. Furthermore, no specific information is captured with one-hot encoding. From the numerical representation, it is not clear that orange and red are more similar than orange and green. For this reason, other methods exist.

A second way of creating embeddings is by creating feature vectors. Every symbol has its specific vector representation, based on features. With colors, a vector of three elements could be used, where the elements represent the amount of yellow, red, and/or blue needed to create the color. Thus, all colors can be represented by only using a vector of three elements. Also, similar colors have similar representation vectors.

For NLP, embeddings based on context, as opposed to words, are small and can be trained. The reasoning behind this concept is that words with similar meanings occur in similar contexts. Different methods take the context of words into account. Some methods, like GloVe, base their context embedding on co-occurrence statistics from corpora (large texts) such as Wikipedia. Words with similar co-occurrence statistics have similar word embeddings. Other methods use neural networks to train the embeddings. For example, they train their embeddings to predict the word based on the context (Common Bag of Words), and/or to predict the context based on the word (Skip-Gram). Training these contextual embeddings is time intensive. For this reason, pre-trained libraries exist. Other deep learning methods can be used to create embeddings. For example, the latent space of a variational autoencoder (VAE) can be used as the embedding of the input. Another method is to use 1D convolutions to create embeddings. This causes a sparse, high-dimensional input space to be converted to a denser, low-dimensional feature space.

Self-Attention: Queries (Q), Keys (K), Values (V)

Transformer models are based on the principle of self-attention. Self-attention allows each element of the input sequence to look at all other elements in the input sequence and search for clues that can help it to create a more meaningful encoding. It is a way to look at which other sequence elements are relevant for the current element. The Transformer can grab context from both before and after the currently processed element.

When performing self-attention, three vectors need to be created for each element of the encoder input: the query vector (Q), the key vector (K), and the value vector (V). These vectors are created by performing matrix multiplications between the input embedding vectors using three unique weight matrices.

After this, self-attention scores are calculated. When calculating self-attention scores for a given element, the dot products between the query vector of this element and the key vectors of all other input elements are calculated. To make the model mathematically more stable, these self-attention scores are divided by the root of the size of the vectors. This has the effect of reducing the importance of the scalar thus emphasizing the importance of the direction of the vector. Just as before, these scores are normalized with a SoftMax layer. This attention distribution is then used to calculate a weighted sum of the value vectors, resulting in a vector z for every input element. In the attention principle explained above, the vector to calculate attention scores and to perform the weighted sum was the same, in self-attention two different vectors are created and used. As the self-attention needs to be calculated for all elements (thus a query for every element), one formula can be created to calculate a Z matrix. The rows of this Z matrix are the z vectors for every sequence input element, giving the matrix a size length sequence dimension QKV.

Figure 3:
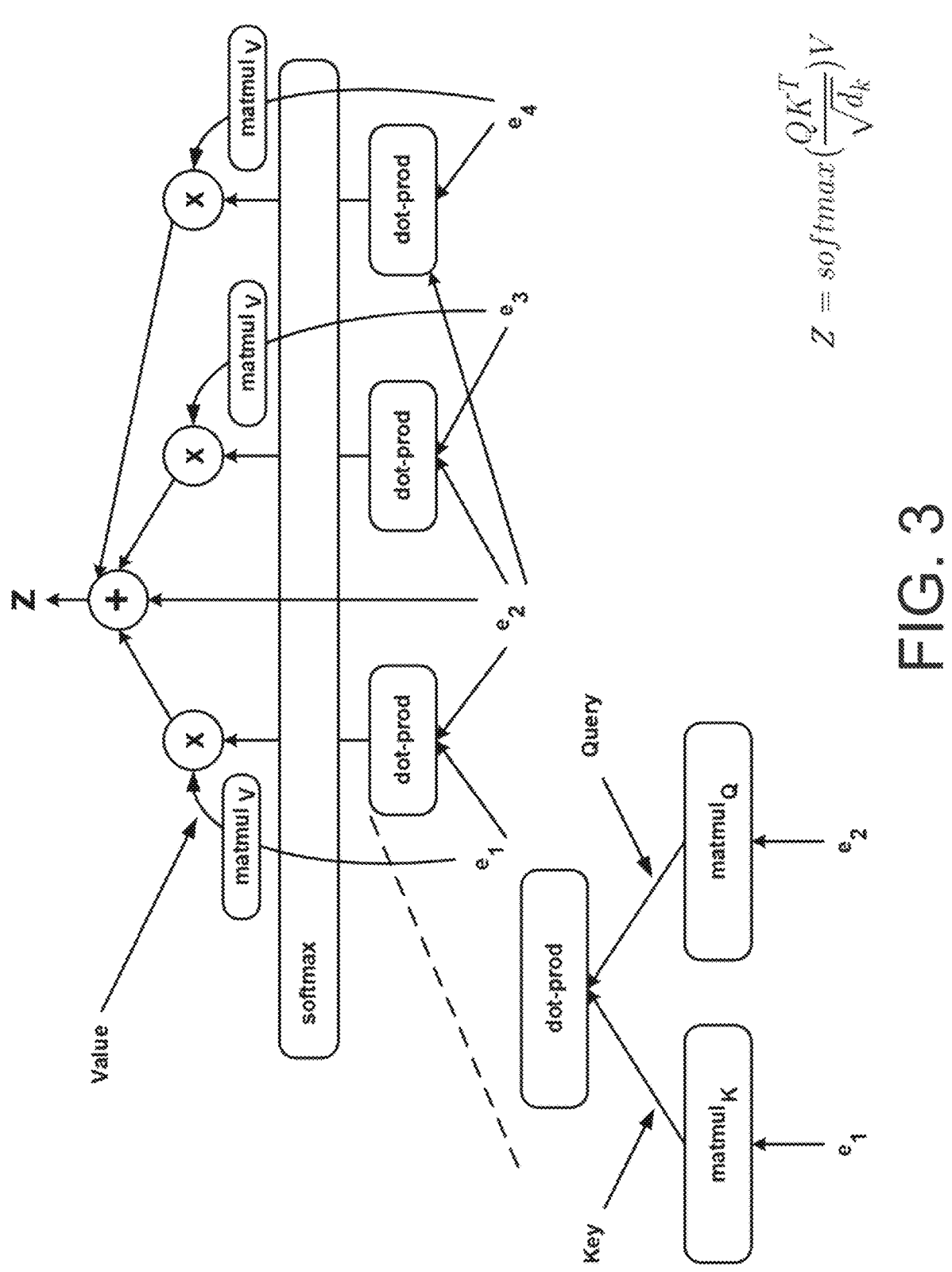
FIG. 3 is a schematic representation of the calculation of self-attention showing one attention head.

Multi-headed attention is executed in the Transformer. FIG. 3 is a schematic representation of the calculation of self-attention showing one attention head. For every attention head, different weight matrices are trained to calculate Q, K, and V. Every attention head outputs a matrix Z. Different attention heads can capture different types of information. The different Z matrices of the different attention heads are concatenated. This matrix can become large when multiple attention heads are used. To reduce dimensionality, an extra weight matrix W is trained to condense the different attention heads into a matrix with the same size as one Z matrix. This way, the amount of data given to the next step does not enlarge every time self-attention is performed.

When performing self-attention, information about the order of the different elements within the sequence is lost. To address this problem, positional encodings are added to the embedding vectors. Every position has its unique positional encoding vector. These vectors follow a specific pattern, which the Transformer model can learn to recognize. This way, the model can consider distances between the different elements.

As discussed above, in the core of self-attention are three objects: queries (Q), keys (K), and values (V). Each of these objects has an inner semantic meaning of their purpose. One can think of these as analogous to databases. We have a user-defined query of what the user wants to know. Then we have the relations in the database, i.e., the values which are the weights. More advanced database management systems create some apt representation of its relations to retrieve values more efficiently from the relations. This can be achieved by using indexes, which represent information about what is stored in the database. In the context of attention, indexes can be thought of as keys. So instead of running the query against values directly, the query is first executed on the indexes to retrieve where the relevant values or weights are stored. Lastly, these weights are run against the original values to retrieve data that is most relevant to the initial query.

Figure 4:
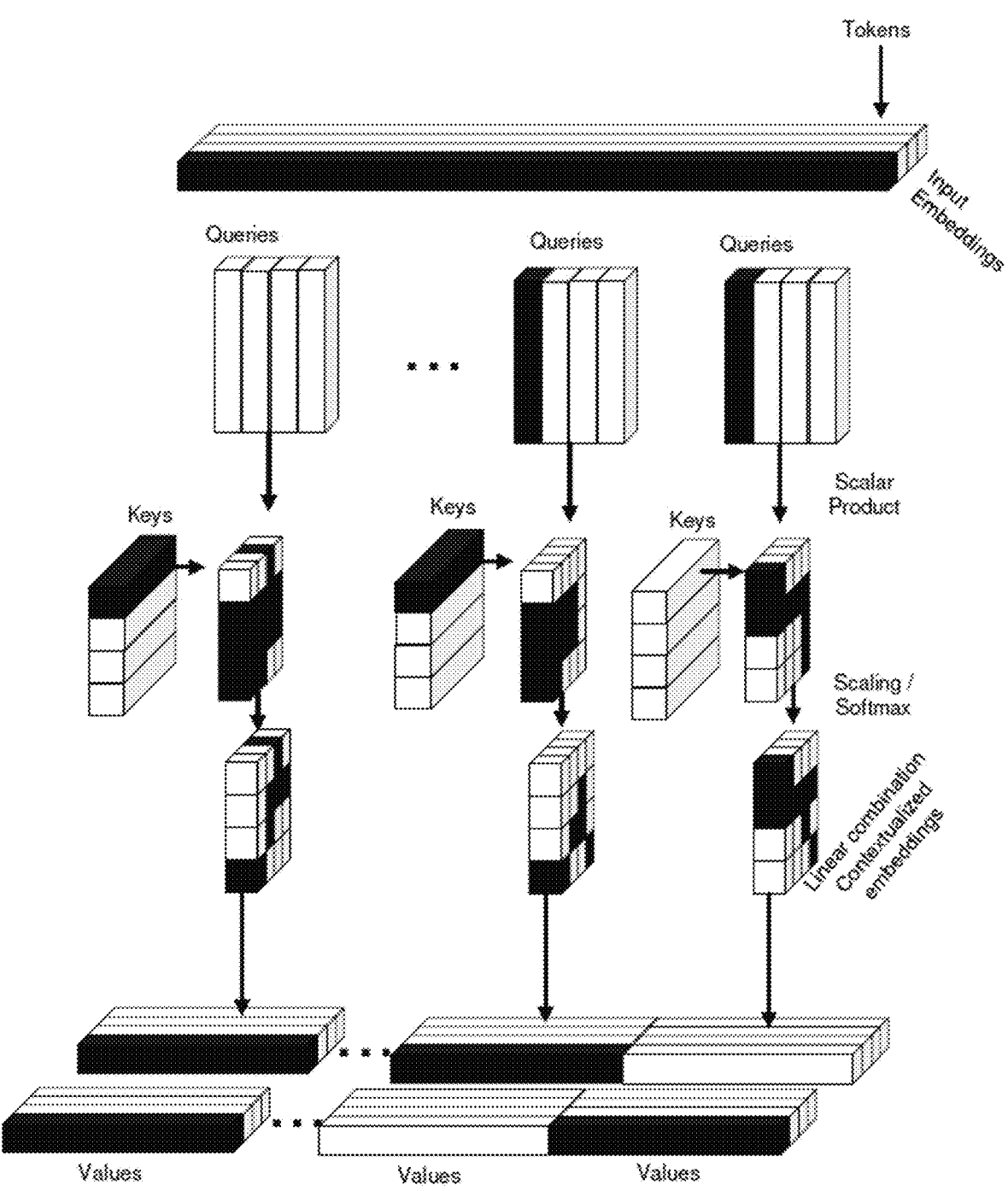
FIG. 4 is a depiction of several attention heads in a Transformer block.

FIG. 4 depicts several attention heads in a Transformer block. We can see that the outputs of queries and keys dot products in different attention heads are differently colored. This depicts the capability of the multi-head attention to focus on different aspects of the input and aggregate the obtained information by multiplying the input with different attention weights.

Examples of attention calculation include scaled dot-product attention and additive attention. There are several reasons why scaled dot-product attention is used in the Transformers. Firstly, the scaled dot-product attention is relatively fast to compute, since its main parts are matrix operations that can be run on modern hardware accelerators. Secondly, it performs similarly well for smaller dimensions of the K matrix, dk, as the additive attention. For larger dk, the scaled dot-product attention performs a bit worse because dot products can cause the vanishing gradient problem. This is compensated via the scaling factor, which is defined as $\sqrt{dk}$.

As discussed above, the attention function takes as input three objects: key, value, and query. In the context of Transformers, these objects are matrices of shapes (n, d), where n is the number of elements in the input sequence and d is the hidden representation of each element (also called the hidden vector). Attention is then computed as:

$$\text{Attention}\,(Q, K, V) = \text{SoftMax}\left(\frac{QK^T}{\sqrt{dk}}\right)V$$

where Q, K, V are computed as:

$$X \cdot W_Q,\ X \cdot W_K,\ X \cdot W_V$$

X is the input matrix and $W_Q$, $W_K$, $W_V$ are learned weights to project the input matrix into the representations. The dot products appearing in the attention function are exploited for their geometrical interpretation where higher values of their results mean that the inputs are more similar, i.e., pointing in the geometrical space in the same direction. Since the attention function now works with matrices, the dot product becomes matrix multiplication. The SoftMax function is used to normalize the attention weights into the value of 1 prior to being multiplied by the values matrix. The resulting matrix is used either as input into another layer of attention or becomes the output of the Transformer.

Multi-Head Attention

Transformers become even more powerful when multi-head attention is used. Queries, keys, and values are computed the same way as above, though they are now projected into h different representations of smaller dimensions using a set of h learned weights. Each representation is passed into a different scaled dot-product attention block called a head. The head then computes its output using the same procedure as described above.

Formally, the multi-head attention is defined as:

$$\text{MultiHeadAttention } (Q, K, V) = [\text{head}_1, \ldots, \text{head}_h] \; W_0 \text{ where head}_i =$$

$$\text{Attention} \left( Q W_i^Q, K W_i^K, V W_i^V \right)$$

The outputs of all heads are concatenated together and projected again using the learned weights matrix $W_0$ to match the dimensions expected by the next block of heads or the output of the Transformer. Using the multi-head attention instead of the simpler scaled dot-product attention enables Transformers to jointly attend to information from different representation subspaces at different positions.

Figure 5:
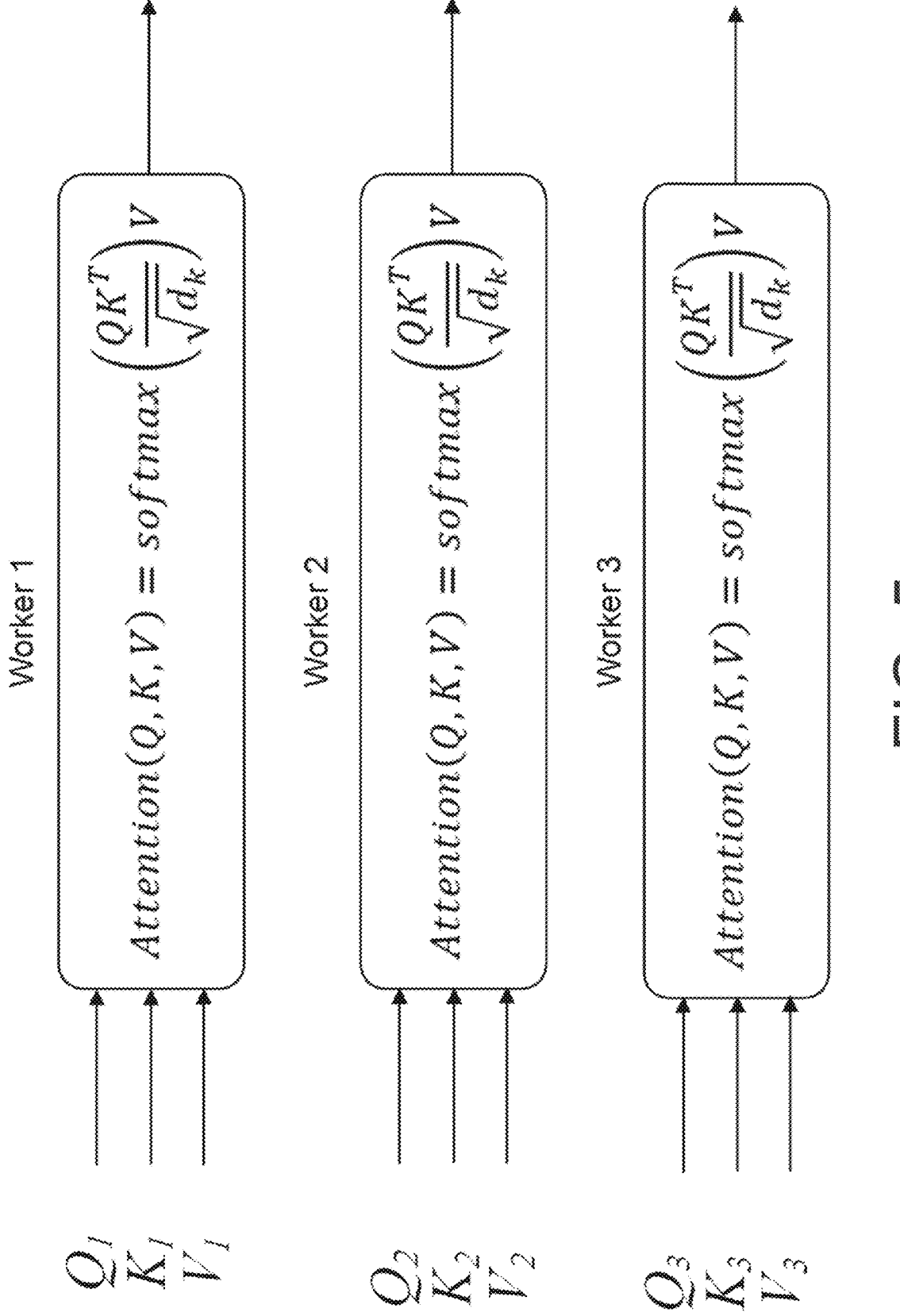
FIG. 5 is an illustration that shows how one can use multiple workers to compute the multi-head attention in parallel, as the respective heads compute their outputs independently of one another.

As shown in FIG. 5, one can use multiple workers to compute the multi-head attention in parallel, as the respective heads compute their outputs independently of one another. Parallel processing is one of the advantages of Transformers over RNNs.

Assuming the naive matrix multiplication algorithm which has a complexity of:

$$a \cdot b \cdot c$$

For matrices of shape (a, b) and (c, d), to obtain values Q, K, V, we need to compute the operations:

$$X \cdot W_Q,$$

$$X \cdot W_K,$$

$$X \cdot WV$$

The matrix X is of shape (n, d) where n is the number of patches and d is the hidden vector dimension. The weights $W_Q$, $W_K$, $W_V$ are all of shape (d, d). Omitting the constant factor 3, the resulting complexity is:

$$n \cdot d^2$$

We can proceed to the estimation of the complexity of the attention function itself, i.e., of $$\text{SoftMax} \left( \frac{Q K^T}{\sqrt{dk}} \right) V.$$

The matrices Q and K are both of shape (n, d). The transposition operation does not influence the asymptotic complexity of computing the dot product of matrices of shapes (n, d)·(d, n), therefore its complexity is:

$$n^2 \cdot d$$

Scaling by a constant factor of $\sqrt{dk}$, where dk is the dimension of the keys vector, as well as applying the SoftMax function, both have the complexity of a·b for a matrix of shape (a, b), hence they do not influence the asymptotic complexity. Lastly the dot product SoftMax $$\left( \frac{Q K^T}{\sqrt{dk}} \right) \cdot V$$

is between matrices of shapes (n, n) and (n, d) and so its complexity is:

$$n^2 \cdot d$$

The final asymptotic complexity of scaled dot-product attention is obtained by summing the complexities of computing Q, K, V, and of the following attention function:

$$n \cdot d^2 + n^2 \cdot d.$$

The asymptotic complexity of multi-head attention is the same since the original input matrix X is projected into h matrices of shapes $$\left( n, \frac{d}{h} \right),$$

where h is the number of heads. From the point of view of asymptotic complexity, h is constant, therefore we would arrive at the same estimate of asymptotic complexity using a similar approach as for the scaled dot-product attention.

Transformer models often have the encoder-decoder architecture, although this is not necessarily the case. The encoder is built out of different encoder layers which are all constructed in the same way. The positional encodings are added to the embedding vectors. Afterward, self-attention is performed.

Encoder Block of Transformer

Figure 6:
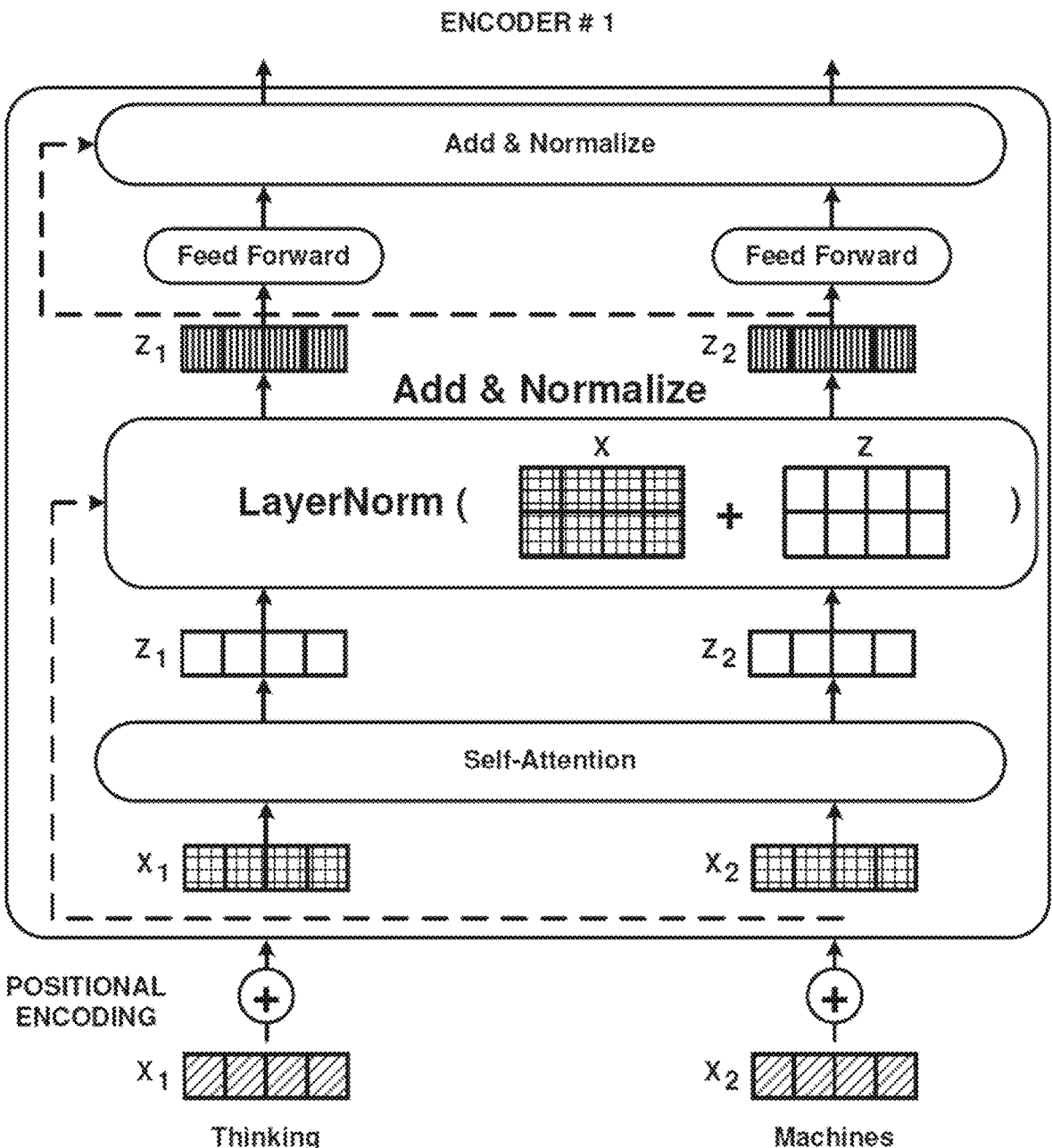
FIG. 6 is a portrayal of one encoder Nick the weighted one of shares have a of a Transformer network.

FIG. 6 portrays one encoder layer of a Transformer network. Every self-attention layer is surrounded by a residual connection, summing up the output and input of the self-attention. This sum is normalized, and the normalized vectors are fed to a feed-forward layer. Every z vector is fed separately to this feed-forward layer. The feed-forward layer is wrapped in a residual connection and the outcome is normalized too. Often, numerous encoder layers are piled to form the encoder. The output of the encoder is a fixed-size vector for every element of the input sequence.

Just like the encoder, the decoder is built from different decoder layers. In the decoder, a modified version of self-attention takes place. The query vector is only compared to the keys of previous output sequence elements. The elements further in the sequence are not known yet, as they still must be predicted. No information about these output elements may be used.

Encoder-Decoder Blocks of Transformer

Figure 7:
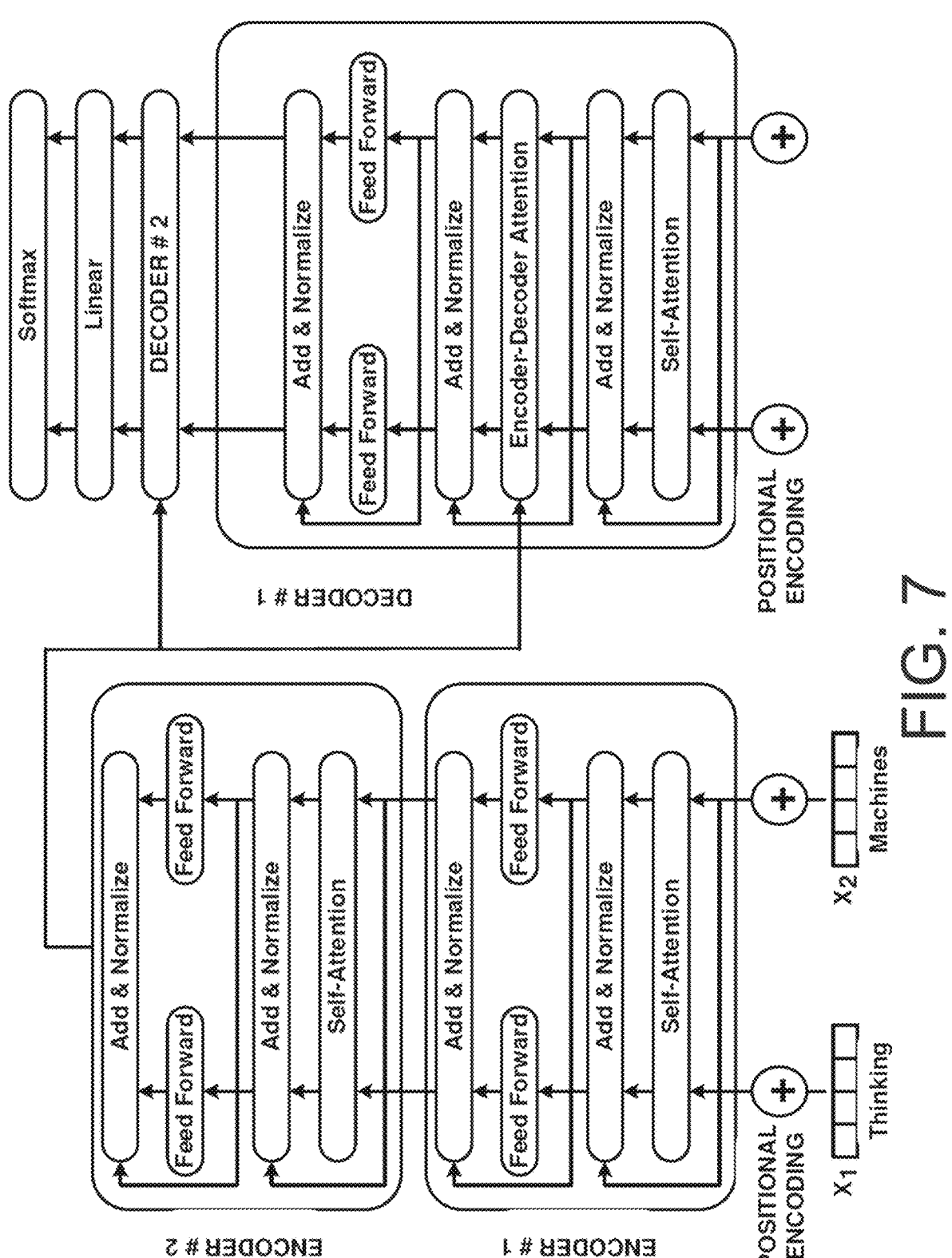
FIG. 7 shows a schematic overview of a Transformer model.

FIG. 7 shows a schematic overview of a Transformer model. Next to a self-attention layer, a layer of encoder-decoder attention is present in the decoder, in which the decoder can examine the last Z vectors of the encoder, providing fluent information transmission. The ultimate decoder layer is a feed-forward layer. All layers are packed in a residual connection. This allows the decoder to examine all previously predicted outputs and all encoded input vectors to predict the next output. Thus, information from the encoder is provided to the decoder, which could improve the predictive capacity. The output vectors of the last decoder layer need to be processed to form the output of the entire system. This is done by a combination of a feed-forward layer and a SoftMax function. The output corresponding to the highest probability is the predicted output value for a subject time step.

For some tasks other than translation, only an encoder is needed. This is true for both document classification and name entity recognition. In these cases, the encoded input vectors are the input of the feed-forward layer and the SoftMax layer. Transformer models have been extensively applied in different NLP fields, such as translation, document summarization, speech recognition, and named entity recognition. These models have applications in the field of biology as well for predicting protein structure and function and labeling DNA sequences.

Vision Transformer

There are extensive applications of transformers in vision including popular recognition tasks (e.g., image classification, object detection, action recognition, and segmentation), generative modeling, multi-modal tasks (e.g., visual-question answering, visual reasoning, and visual grounding), video processing (e.g., activity recognition, video forecasting), low-level vision (e.g., image super-resolution, image enhancement, and colorization) and 3D analysis (e.g., point cloud classification and segmentation).

Transformers were originally developed for NLP and worked with sequences of words. In image classification, we often have a single input image in which the pixels are in a sequence. To reduce the computation required, Vision Transformers (ViTs) cut the input image into a set of fixed-sized patches of pixels. The patches are often 16×16 pixels. They are treated much like words in NLP Transformers. ViTs are depicted in FIGS. 8A, 8B, 9A, 9B, 9C, and 9D. Unfortunately, important positional information is lost because image sets are position-invariant. This problem is solved by adding a learned positional encoding into the image patches.

Figures 8A, 8B:
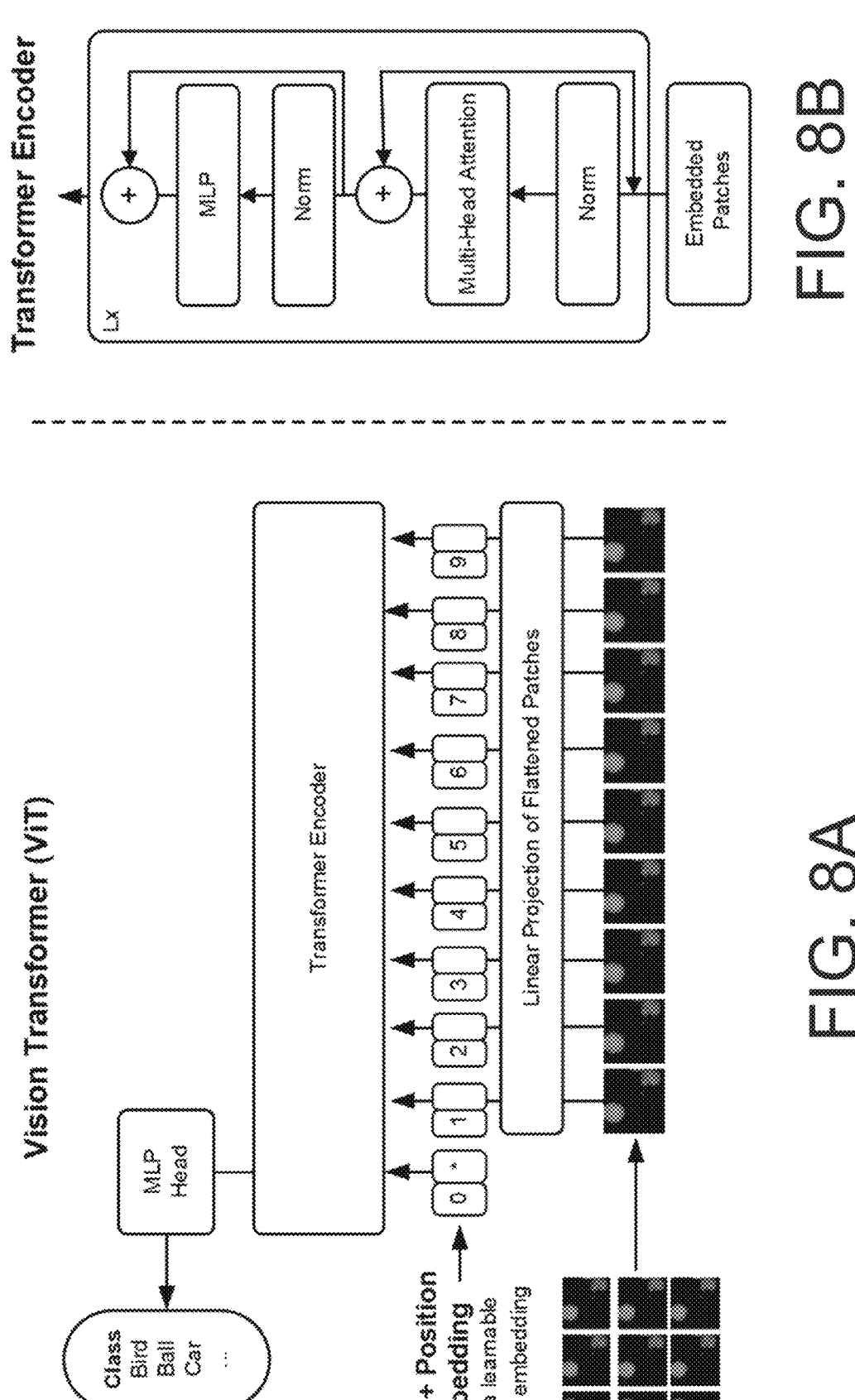
FIG. 8 is a depiction of a Vision Transformer (ViT).
Figures 9A, 9B, 9C, 9D:
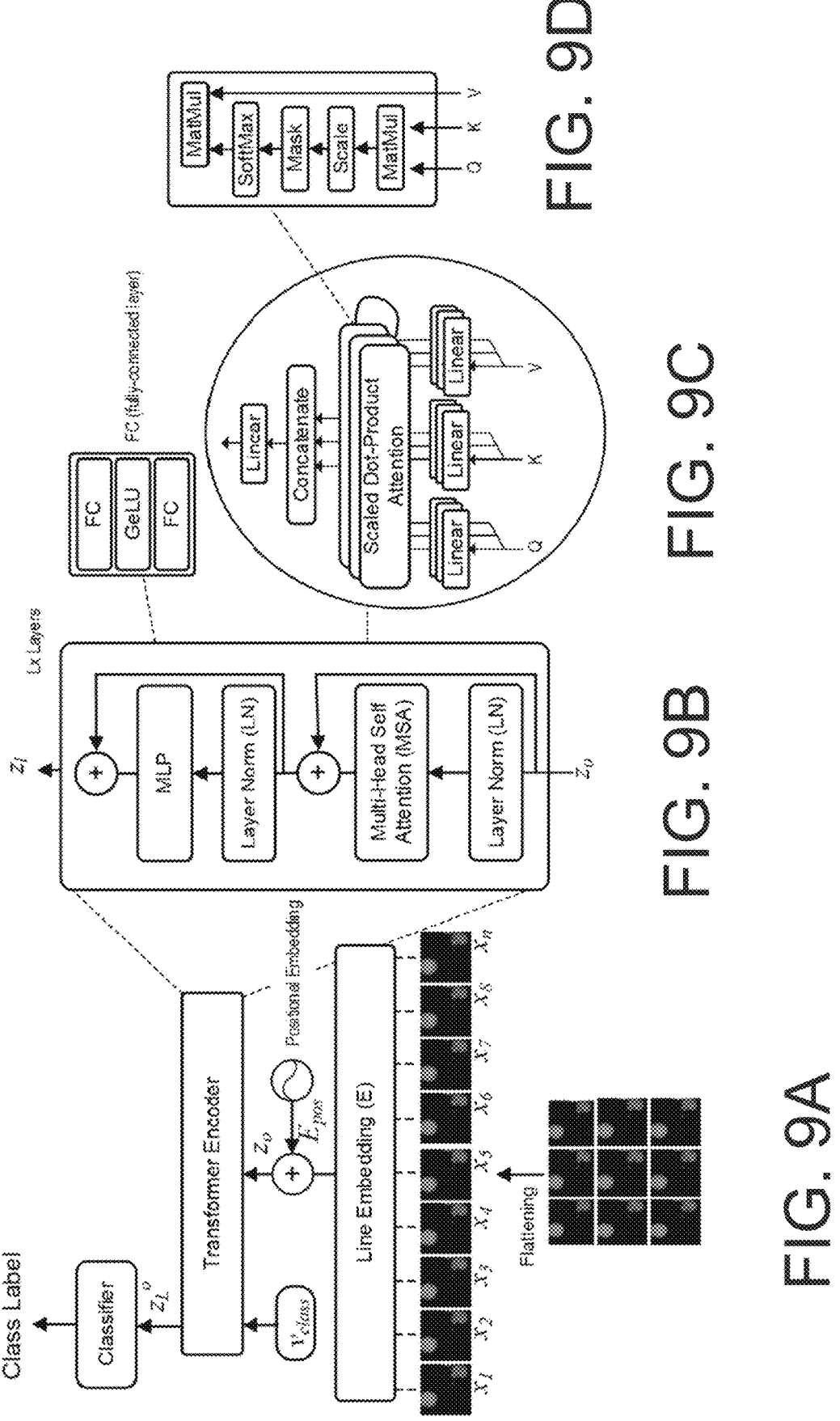
FIG. 9 illustrates a processing flow of the Vision Transformer (ViT).

The computations of the ViT architecture can be summarized as follows. The first layer of a ViT extracts a fixed number of patches from an input image (FIG. 8A). The patches are then projected to linear embeddings. A special class token vector is added to the sequence of embedding vectors to include all representative information of all tokens through the multi-layer encoding procedure. The class vector is unique to each image. Vectors containing positional information are combined with the embeddings and the class token. The sequence of embedding vectors is passed into the Transformer blocks. The class token vector is extracted from the output of the last Transformer block and is passed into a multilayer perceptron (MLP) head whose output is the final classification. The perceptron takes the normalized input and places the output in categories. It classifies the images. This procedure directly translates into the Python Keras code shown in FIG. 10.

When the input image is split into patches, a fixed patch size is specified before instantiating a ViT. Given the quadratic complexity of attention, patch size has a large effect on the length of training and inference time. A single Transformer block comprises several layers. The first layer implements Layer Normalization, followed by the multi-head attention that is responsible for the performance of ViTs. In the depiction of a Transformer block in FIG. 8B, we can see two arrows. These are residual skip connections. Including skip connection data can simplify the output and improve the results. The output of the multi-head attention is followed again by Layer Normalization. And finally, the output layer is an MLP (Multi-Layer Perceptron) with the GELU (Gaussian Error Linear Unit) activation function.

ViTs can be pretrained and fine-tuned. Pretraining is generally done on a large dataset. Fine-tuning is done on a domain specific dataset.

Domain-specific architectures, like convolutional neural networks (CNNs) or long short-term memory networks (LSTMs), have been derived from the usual architecture of MLPs and suffer from so-called inductive biases that predispose the networks towards a certain output. ViTs stepped in the opposite direction of CNNs and LSTMs and became more general architectures by eliminating inductive biases. A ViT can be seen as a generalization of MLPs because MLPs, after being trained, do not change their weights for different inputs. On the other hand, ViTs compute their attention weights at runtime based on the particular input.

The following detailed description is made with reference to the figures. Example implementations are described to illustrate the technology disclosed, not to limit its scope, which is defined by the claims. Those of ordinary skill in the art will recognize a variety of equivalent variations on the description that follows. Reference will now be made in detail to the exemplary implementations of the present disclosure, examples of which are illustrated in the accompanying drawings. Wherever possible, the same reference numbers will be used throughout the drawings to refer to the same or like parts.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general-purpose signal processor or a block of random-access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

Computer System

Figure 11:
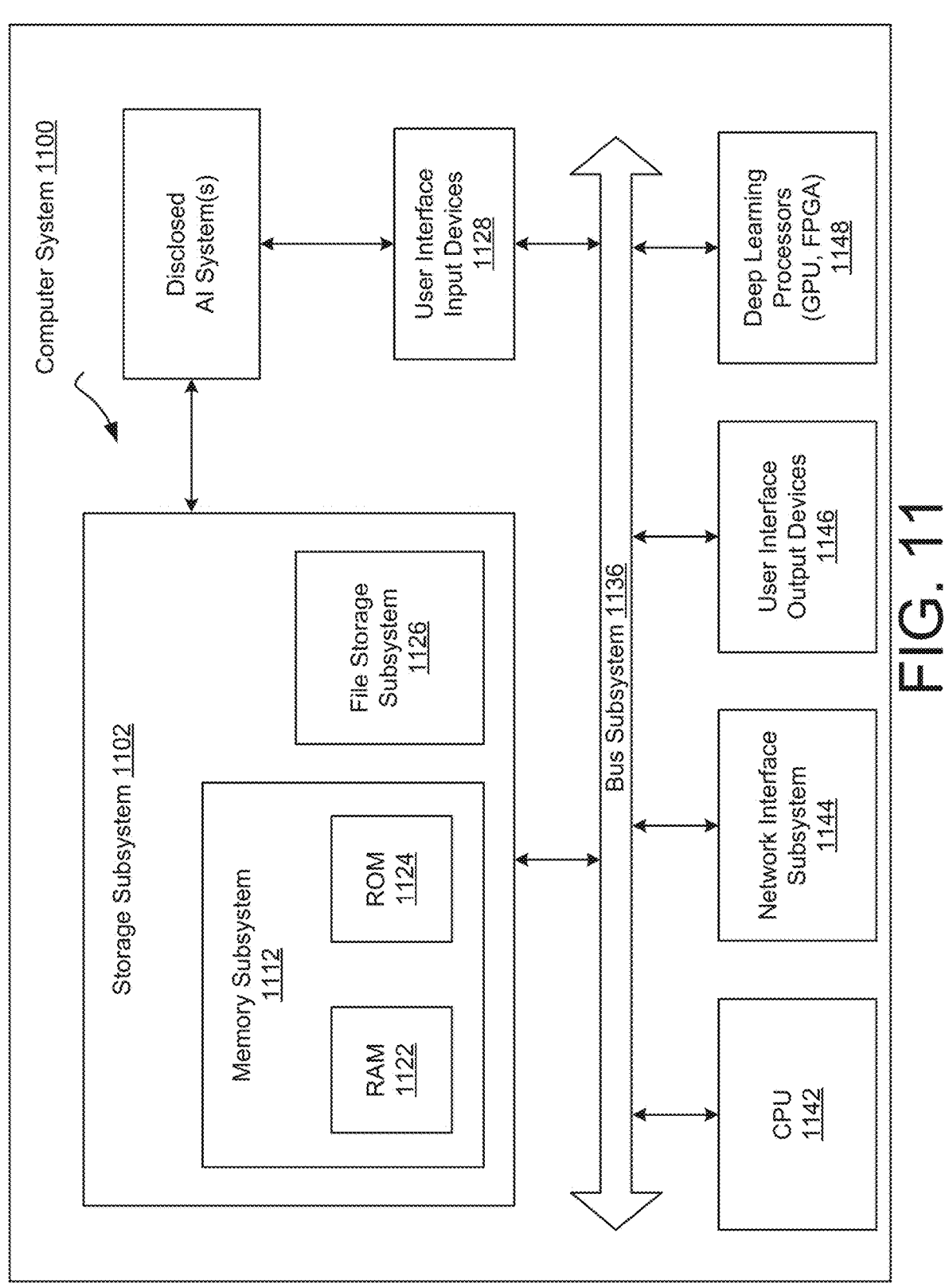
FIG. 11 illustrates an example configuration of a computing device that can be used to implement the systems and techniques described herein.

FIG. 11 shows an example computer system 1100 that can be used to implement the technology disclosed. Computer system 1100 includes at least one central processing unit (CPU) 1142 that communicates with a number of peripheral devices via bus subsystem 1126. These peripheral devices can include a storage subsystem 1102 including, for example, memory devices and a file storage subsystem 1126, user interface input devices 1128, user interface output devices 1146, and a network interface subsystem 1144. The input and output devices allow user interaction with computer system 1100. Network interface subsystem 1144 provides an interface to outside networks, including an interface to corresponding interface devices in other computer systems.

In one implementation, the disclosed AI system(s) are communicably linked to the storage subsystem 1102 and the user interface input devices 1128.

User interface input devices 1128 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1100.

User interface output devices 1146 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1100 to the user or to another machine or computer system.

Storage subsystem 1102 stores programming and data constructs that provide the functionality of some or all of the modules and methods described herein. These software modules are generally executed by processors 1148.

Processors 1148 can be graphics processing units (GPUs), field-programmable gate arrays (FPGAs), application-specific integrated circuits (ASICs), and/or coarse-grained reconfigurable architectures (CGRAs). Processors 1148 can be hosted by a deep learning cloud platform such as Google Cloud Platform™, Xilinx™, and Cirrascale™. Examples of processors 1148 include Google's Tensor Processing Unit (TPU)™, rackmount solutions like GX4 Rackmount Series™, GX13 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1112 used in the storage subsystem 1102 can include a number of memories including a main random access memory (RAM) 1122 for storage of instructions and data during program execution and a read only memory (ROM) 1124 in which fixed instructions are stored. A file storage subsystem 1126 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1126 in the storage subsystem 1102, or in other machines accessible by the processor.

Bus subsystem 1136 provides a mechanism for letting the various components and subsystems of computer system 1100 communicate with each other as intended. Although bus subsystem 1136 is shown schematically as a single bus, alternative implementations of the bus subsystem can use multiple busses.

Computer system 1100 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1100 depicted in FIG. 11 is intended only as a specific example for purposes of illustrating the preferred implementations of the present technology disclosed. Many other configurations of computer system 1100 are possible having more or less components than the computer system depicted in FIG. 11.

In various implementations, a learning system is provided. In some implementations, a feature vector is provided to a learning system. Based on the input features, the learning system generates one or more outputs. In some implementations, the output of the learning system is a feature vector. In some implementations, the learning system comprises an SVM. In other implementations, the learning system comprises an artificial neural network. In some implementations, the learning system is pre-trained using training data. In some implementations training data is retrospective data. In some implementations, the retrospective data is stored in a data store. In some implementations, the learning system may be additionally trained through manual curation of previously generated outputs.

In some implementations, an object detection pipeline is a trained classifier. In some implementations, the trained classifier is a random decision forest. However, it will be appreciated that a variety of other classifiers are suitable for use according to the present disclosure, including linear classifiers, support vector machines (SVM), or neural networks such as recurrent neural networks (RNN).

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

FIG. 11 is a schematic of an exemplary computing node. Computing node 1100 is only one example of a suitable computing node and is not intended to suggest any limitation as to the scope of use or functionality of embodiments described herein. Regardless, computing node 1100 is capable of being implemented and/or performing any of the functionality set forth hereinabove.

In computing node 1100 there is a computer system/ server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed computing environments where tasks are performed by remote processing devices that are linked through a communications network. In a distributed computing environment, program modules may be located in both local and remote computer system storage media including memory storage devices.

As shown in FIG. 11, computer system/server in computing node 1100 is shown in the form of a general-purpose computing device. The components of computer system/server may include, but are not limited to, one or more processors or processing units, a system memory, and a bus that couples various system components including system memory to processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server typically includes a variety of computer system readable media. Such media may be any available media that is accessible by computer system/ server, and it includes both volatile and non-volatile media, removable and non-removable media.

System memory can include computer system readable media in the form of volatile memory, such as random access memory (RAM) and/or cache memory. Algorithm Computer system/server may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces. As will be further depicted and described below, memory may include at least one program product having a set (e.g., at least one) of program modules that are configured to carry out the functions of embodiments of the disclosure.

Program/utility, having a set (at least one) of program modules, may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments as described herein.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Construct Scoring System

Example embodiments of this disclosure describe methods, apparatuses, computer-readable media, and system(s) that may provide construct scoring of constructs of associated constructors based on a plurality of scoring factors and/or that provide construct scores along with information regarding the influence of plurality of factors on the construct score. In some examples, the scoring factors may be indicative of a plurality of popularity or attention indicators, such as an increase in instances of mentions of a construct, its associated constructor, or similar constructs on one or more information networks. In other examples, the scoring factors may be indicative of changes in scores of constructs of the associated constructor or similar constructs of other constructors.

In some examples, a construct scoring system may include a data storage storing mappings between constructs, constructors of the constructs, and/or categories of constructs. For example, the mappings may be stored in a graph database such as a knowledge graph. In some examples, the construct scoring system may further include data storage for storing other information related to construct scoring such as recent and historical score data, images, text, or metadata, from information networks or other data sources and so on.

In some examples, a scraping logic may scrape data from various structured and unstructured sources related to constructs, constructors, construct scoring, instances of mentions of constructs, constructors of the constructs, and/or categories of constructs on information networks and the like. The construct scoring system may process the scraped data for use in scoring constructs. For example, the construct scoring system may utilize natural language processing and computer vision techniques to extract information from unstructured data sources such as text and images. Further, the construct scoring system may maintain and utilize databases including information from structured storage such as past construct scores, data regarding mentions of constructs, and other data that may or may not be represented in the mapping datastore.

The construct scoring system may further include scoring logic which may determine a score for a particular construct of a particular constructor based on the scraped and processed data. As mentioned above, the score for the particular construct may be based on a plurality of scoring factors determined from data related to similar constructs of the particular constructor, similar constructs of other constructors, and/or the categories of the particular construct. For example, the construct scoring system may determine similar constructs to the particular construct of the particular constructor based on the mappings of constructs and associated constructors. The construct scoring system may then determine a plurality of scoring factors including or based on recent scores and historical scores of constructs of the same particular constructor, recent scores and historical scores of similar constructs of the other constructors, a rate of occurrence of instances of information from data sources regarding particular construct, particular constructor, similar constructs of other constructors, or categories of the particular construct. The construct scoring system may further include sentiment logic that may be configured to determine sentiments from the mentions of constructs (e.g., a sentiment that indicates an increase in score based on an increase in instances of mentions of a construct). The scoring logic may utilize those sentiments in determining a score for the particular construct.

In some examples, the scoring logic may further refine the score of the particular construct based on expert rules or other information. For example, the expert rules may operate to account for quirks in scoring for particular constructs, constructors, categories or subsets of constructs that may be known but not captured in the scraped and processed data.

In some examples, a construct scoring system may further include a user interface logic that may allow users to request data from the construct scoring system including construct scores. For example, the user interface logic may receive a request for construct scores from a user and generate a construct scoring data request to the scoring logic. As discussed above, the scoring logic may provide a construct score for the particular construct as well as information regarding the influence of plurality of factors on the construct score. The user interface logic may then present a score presentation interface to the user which may includes the construct score and an explanation of how the plurality of factors influenced the construct score.

As discussed above, the construct scoring system may determine construct scores based on a weighted combination of scoring factors. In some examples, the user interface logic may present the score presentation interface so as to display how the factors were weighted.

The user interface logic may provide other information to the user in addition to particular construct score presentations. For example, the user interface logic may present a construct score history as a line chart visually representing a construct's score history. Additionally or alternatively, the user interface logic may present a constructor score history as a line chart visually representing a history of the constructor's construct's scores based on a combined or composite score value of the constructor's construct. Similarly, the user interface logic may present a construct cluster or category score history as a line chart visually representing a history of the aggregate, combined or composite scores of the constructs of the cluster or category. Moreover, the user interface logic may provide construct scoring for a set of constructs (e.g., an inventory or library of constructs).

In some examples, a construct scoring system may include a scoring logic architecture. Some examples may include one or more of a data ingestion and cleaning logic, a knowledge graph generation logic, a sentiment analysis logic, a baselining logic, an expert knowledge basing logic and/or an explanation logic.

The data ingestion and cleaning logic may ingest structured data and unstructured data identifying constructors, constructs, and categories of constructs, where the constructs are associated with particular constructors and with at least one particular category. The data ingestion and cleaning logic may further clean the ingested structured and unstructured data, for example, to cleanse missing values and outliers.

The knowledge graph generation logic may represent, in a graph, the constructors, the constructs, and the categories as nodes of the graph. The knowledge graph generation logic may further represent, using edges between the nodes of the constructor graph, similarity between constructors of the constructors, similarity between constructs, and influences between categories of the constructs. The knowledge graph generation logic may also identify clusters of nodes in the constructor graph as well as central nodes of the clusters of nodes.

The sentiment analysis logic may use natural language processing or similar processing to detect entries in the cleansed structured data and cleansed unstructured data that identify the constructors, the constructs, and the categories and associated sentiments.

The baselining logic may determine a baseline score indicator for a target construct by a target constructor based on past score records of constructs of the target constructor and constructs of constructors similar to the target constructor. In some examples, the similarity of constructs or constructors may be determined by querying the target construct and the target constructor against the clusters in the constructor graph. Further, the determination of the baseline score indicator may take into account a weighted combination of (i) the past score records of the constructs of the target constructor, (ii) the past score records of the constructs of the constructors similar to the target constructor, and/or (iii) associated sentiments as detected for the target construct, the target constructor, and a category of the target construct and the target constructor.

The expert knowledge basing logic may use expert rule sets to generate a final score indicator based on applying the expert rule sets to the baseline score indicator. In addition, the explanation logic may display the final score indicator in conjunction with a breakdown of application of the weighted combination and the expert rule sets.

In some examples, a construct scoring system may include a data platform architecture which may include a data layer, a processing layer, a serving layer and/or a monitoring layer.

In some examples, the data layer may be configured to use large language models (LLMs) to extract information identifying constructors, constructs, and categories of constructs, Individual constructs may be associated with a particular constructor and associated with at least one particular category of constructs. The data layer may further be configured to store a knowledge graph of the constructors, constructs, and categories in a graph database, store structured data and unstructured data identifying the constructors, the constructs, and the categories in a relational database, and generate and store embeddings for images, texts, and metadata in the structured data and unstructured data in an embeddings database.

Some processing layers may be configured to use data mining pipelines to analyze the structured data and unstructured data and the embeddings to update the knowledge graph. The processing layer may also use a plurality of scoring algorithms to consume the analysis of the data mining pipelines to generate scoring indicators for the constructs and use expert rules encoded in domain-specific languages to update the scoring indicators.

In some examples, a serving layer may be configured to fine tune the updated scoring indicators and periodically write the fine-tuned updated scoring indicators to storage (e.g., unstructured data storage such as blob storage). Further, the serving layer may use application programming interfaces (APIs) to make the fine-tuned updated scoring indicators to end users and to display the fine-tuned updated scoring indicators across end user devices.

The monitoring layer may be configured to generate logs and metrics for performance and data quality of other layers and apply feedback loops to improve data ingestion and model weights of the other layers. Further, the monitoring layer may provide retraining and benchmarking of models in the other layers.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 12 illustrates a schematic diagram of an example environment 1200 with service system(s) 1210, construct system(s) 1220, data storage 1230, information network(s) 1240, other data source(s) 1242, and client device(s) 1250 that may enable construct scoring, in accordance with example embodiments of the disclosure.

The example environment 1200 may include one or more user(s) 1252(1), 1252(2), 1252(3), . . . 1252(N), hereinafter referred to individually or collectively as user(s) 1252, who may interact with respective client device(s) 1250(1), 1250 (2), 1250(3), . . . 1250(N), hereinafter referred to individually or collectively as client device(s) 1250 via respective input device(s).

The client device(s) 1250 may interact with the service system(s) 1210 to request construct scores or similar information to the construct system(s) 1220 of environment 100. For example, the service system(s) 1210 may receive a request for a construct score for a particular construct of a particular constructor from a client device 1250. The service system(s) 1210 may request a construct score or similar information for the particular constructor from the construct system(s) 1220. Additionally or alternatively, the data storage 1230 may store predetermined construct scores such that the service system(s) 1210 may request construct scores from the data storage 1230. In such an example, the service system(s) 1210 may request construct scores from the construct system(s) 1220 when the service system(s) 1210 does not include a construct score of the particular construct or the score stored in the data storage 1230 of the particular construct is stale.

The construct system(s) 1220 may operate to scrape, from information network(s) 1240 and/or other data sources 1242, information regarding constructs associated with constructors, constructors of constructs, categories of construct and so on. The construct system may include or communicate with a data storage 1230 storing mappings between constructs, constructors of the constructs, and/or categories of constructs. For example, the mappings may be stored in a graph database such as a knowledge graph. In some examples, the data storage 1230 may further store other information related to construct scoring such as recent and historical score data, images, text, or metadata, from information networks or other data sources and so on.

In some examples, the information networks 1240 may include unstructured data related to constructs of the construct system. In some examples, the information networks 1240 may include data sources such as news, websites and social media networks. However, this is not a limitation and other types of information networks may be scraped. Additionally or alternatively, the other data source(s) 1242 may include sources of structured data. Depending on the implementation, the type of score, the type of construct, and so on, the structured data may vary. In an example where the score is a price for an artwork, the structured data may include information such as past sales records, auction data, gallery sales data. Similarly, in such an example, the unstructured data may include information regarding the artwork, similar artwork, the artist, the genre or medium and may include information on gallery exhibits, influencer commentary, social media posts commenting on the artwork, the artist and so on.

In some examples, the construct system(s) 1220 may utilize the gathered information from the data storage 1230, information networks 1240, and or the other data sources 1242 to determine a score for the target construct of the request and return the score with information related to the factors that affected the determination of the score to the service system(s) 1210. Then, the service system(s) 1210 may present the score for the target construct of the request and return the score with information related to the factors that affected the determination of the score to the requesting user 1252 via the user's client device 1250.

Additional information regarding the operation of the systems of environment 1200 are provided below.

Figure 13:
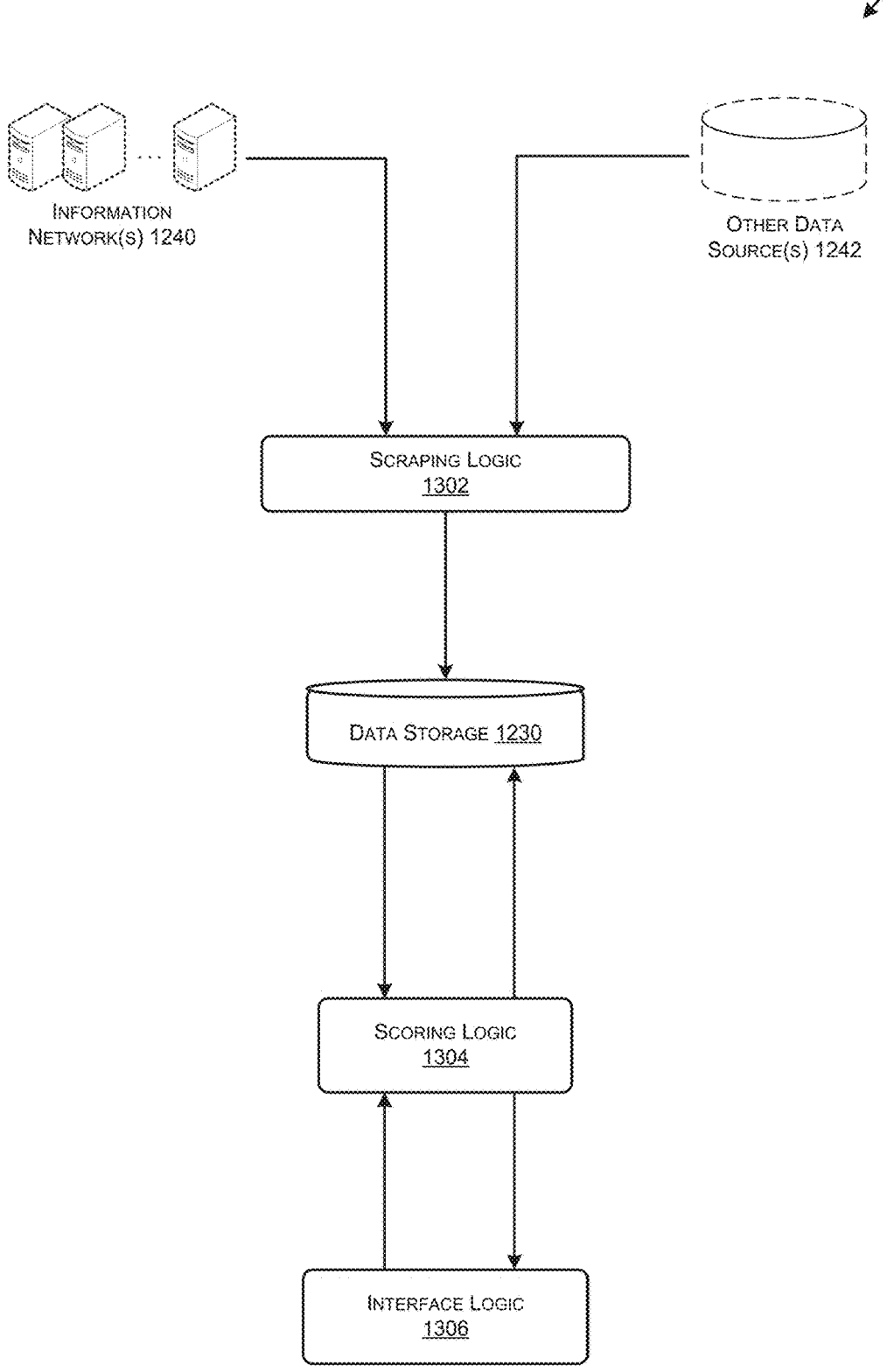
FIG. 13 illustrates a schematic diagram of an example scoring system that may include functionality for determining a score for a construct, in accordance with example embodiments of the disclosure.

FIG. 13 illustrates a schematic diagram of an example scoring system 1300 that may include functionality for determining a score for a construct, in accordance with example embodiments of the disclosure. As illustrated, the scoring system 1300 may include scraping logic 1302, scoring logic 1304 and interface logic 1306.

In operation, the scraping logic 1302 may scrape data from the information network(s) 1240 and other data source(s) 1242. In some examples, the information network(s) 1240 and other data source(s) 1242 may be various structured and unstructured sources related to constructs, constructors, construct scoring, instances of mentions of constructs, constructors of the constructs, and/or categories of constructs on information networks and the like. The scraping logic of the construct scoring system may extract or capture the scraped data for use in scoring constructs. The scraped data may be stored in the data storage 1230.

Though not shown with regard to FIG. 13, in some examples, the scraped data may be subject to various processing for storage in the data storage 1230. For example, the construct scoring system may utilize natural language processing and computer vision techniques to extract information from unstructured data sources such as text and images. In some examples, the data storage 1230 may store mappings between constructs, constructors of the constructs, and/or categories of constructs. For example, the mappings may be stored in a graph database such as a knowledge graph. Further, the construct scoring system may maintain and utilize databases including information from structured storage such as past construct scores, data regarding mentions of constructs, and other data that may or may not be represented in the mapping datastore.

The scoring logic 1304 may determine a score for a particular construct of a particular constructor based on the scraped and processed data, for example, in response to a request from the interface logic 1306. As mentioned above, the score for the particular construct may be based on a plurality of scoring factors determined from data related to similar constructs of the particular constructor, similar constructs of other constructors, and/or the categories of the particular construct. For example, the construct scoring system may determine similar constructs to the particular construct of the particular constructor based on the mappings of constructs and associated constructors. The construct scoring system may then determine a plurality of scoring factors including or based on recent scores and historical scores of constructs of the same particular constructor, recent scores and historical scores of similar constructs of the other constructors, a rate of occurrence of instances of information from data sources regarding particular construct, particular constructor, similar constructs of other constructors, or categories of the particular construct. In some examples, historic scores may be scores in a range of time such as the past two to three years.

In some implementations, the construct scoring system may further include sentiment logic that may be configured to determine sentiments from the mentions of constructs such as sentiments indicative increase in instances of mentions of a construct. The scoring logic 1304 may utilize those sentiments in determining a score for the particular construct.

In some examples, the scoring logic 1304 may further refine the score of the particular construct based on expert rules or other information. For example, the expert rules may operate to account for quirks in scoring for particular constructs, constructors, categories or subsets of constructs that may be known but not captured in the scraped and processed data.

As mentioned above, the interface logic 1306 may receive a request for a score for the particular construct, for example, from a user. The interface logic 1306 may request a score for the construct from the scoring logic 1304. The interface logic 1306 may receive a score from the scoring logic 1304 and provide the score to the requesting device (e.g. the service system(s) 1220 or a client device 1250).

While particular details of a scoring system are provided with regard to FIGS. 12 and 13, one or a skill in the art would understand that additional features and or details as discussed below with regard to other figures may be incorporated into the systems of FIGS. 12 and 13.

FIG. 14 illustrates a flow diagram of an example method 1400 that may provide functionality for determining a score for a construct, in accordance with example embodiments of the disclosure. The method 1400 may be performed by the scoring logic 1304 of the environment 1300 or the scoring system 1210 of FIG. 12.

At block 1402, the scoring system may scrape, from one or more data sources, information regarding constructs associated with constructors. At block 1404, the scoring system may process the scraped information to extract information regarding the constructs associated with constructors.

At block 1406, the scoring system may update mappings and database(s) with extracted information regarding the constructs associated with constructors. At 1408, the scoring system may determine similar constructs to a particular construct of a particular constructor based on the mappings.

Then, at block 1410, the scoring system may determine a score for the particular construct of the particular constructor based on the information regarding the similar constructs and/or constructors.

FIG. 15 illustrates a flow diagram of an example method 1500 that may provide functionality for determining a baseline score for a particular construct, in accordance with example embodiments of the disclosure. The method 1500 may be performed by the scoring logic 1304 of the environment 1300 or the scoring system 1210 of FIG. 12.

At block 1502, the scoring system may determine first score indicators based on recent scores and historical scores of constructs of the same particular constructor and recent scores and historical scores of similar constructs of other constructors. For example, an indicator may be determined based on a percentage change between detected recent crowd sourced scores of the constructs of the particular constructor and historical crowd sourced scores of the constructs of the particular constructor. If the percentage change is positive, it may indicate an upward score pressure and indicate an increased score. Similarly, if the percentage change is positive, it may indicate an upward score pressure and indicate an increased score should be determined. Similar indicators may be determined a negative percentage change and for the scores of other constructor's constructs.

Similarly, at block 1504, the scoring system may determine second score indicators based on rate(s) of occurrence of instances of information from data sources regarding the particular construct, its particular constructor, similar constructs and constructors, and categories of the particular construct, particular constructor and/or a sentiment analysis of those instances.

Then, at block 1506, the scoring system may determine a baseline score for the particular construct of the particular constructor based on a weighted combination of the first score indicators and the second score indicators.

It should be noted that some of the operations of methods 1400-1500 and the other methods below may be performed out of the order presented (e.g., block 1502 could be performed before block 1504 in some embodiments), with additional elements, and/or without some elements. Some of the operations of methods 1400 and 1500 may further take place substantially concurrently and, therefore, may conclude in an order different from the order of operations shown above.

Figure 16:
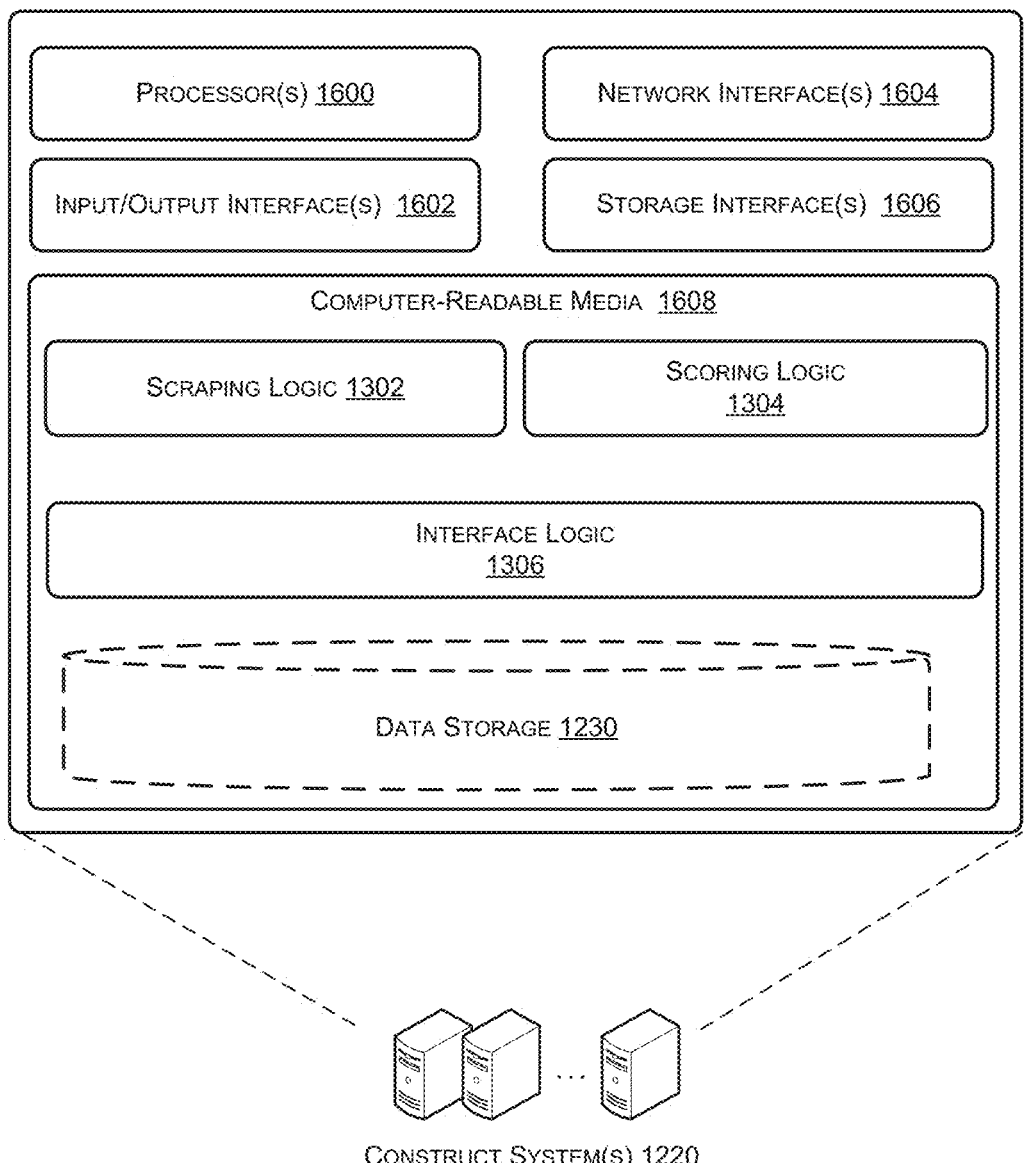
FIG. 16 illustrates a block diagram of example construct system(s) that may provide for determining a score for a construct, in accordance with examples of the disclosure.

FIG. 16 illustrates a block diagram of example construct system(s) 1220 that may provide for determining a score for a construct, in accordance with examples of the disclosure. The construct system(s) 1220 may include one or more processor(s) 1600, one or more input/output (I/O)

interface(s) 1602, one or more network interface(s) 1604, one or more storage interface(s) 1606, and computer-readable media 1608.

In some implementations, the processor(s) 1600 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 1600 may possess its own local memory, which also may store program modules, program data, and/or one or more operating system(s). The one or more processor(s) 1600 may include one or more cores.

The one or more input/output (I/O) interface(s) 1602 may enable the construct system(s) 1220 to detect interaction with a user and/or other system(s), such as one or more service system(s) 1210. The I/O interface(s) 1602 may include a combination of hardware, software, and/or firmware and may include software drivers for enabling the operation of any variety of/O device(s) integrated on the construct system(s) 1220 or with which the construct system(s) 1220 interacts, such as displays, microphones, speakers, cameras, switches, and any other variety of sensors, or the like.

The network interface(s) 1604 may enable the construct system(s) 1220 to communicate via the one or more network(s). The network interface(s) 1604 may include a combination of hardware, software, and/or firmware and may include software drivers for enabling any variety of protocol-based communications, and any variety of wireline and/or wireless ports/antennas. For example, the network interface(s) 1604 may comprise one or more of a cellular radio, a wireless (e.g., IEEE 802.1x-based) interface, a Bluetooth® interface, and the like. In some embodiments, the network interface(s) 1604 may include radio frequency (RF) circuitry that allows the construct system(s) 1220 to transition between various standards. The network interface(s) 1604 may further enable the construct system(s) 1220 to communicate over circuit-switch domains and/or packet-switch domains.

The storage interface(s) 1606 may enable the processor(s) 1600 to interface and exchange data with the computer-readable medium 1608, as well as any storage device(s) external to the construct system(s) 1220.

The computer-readable media 1608 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 1608 may be implemented as computer-readable storage media (CRSM), which may be any available physical media accessible by the processor(s) 1600 to execute instructions stored on the computer readable media 1608. In one basic implementation, CRSM may include RAM and Flash memory. In other implementations, CRSM may include, but is not limited to, ROM, EEPROM, or any other tangible medium which can be used to store the desired information and which can be accessed by the processor(s) 1600. The computer-readable media 1608 may have an operating system (OS) and/or a variety of suitable applications stored thereon. The OS, when executed by the processor(s) 1600 may enable management of hardware and/or software resources of the construct system(s) 1220.

Several functional blocks having instruction, data stores, and so forth may be stored within the computer-readable media 1608 and configured to execute on the processor(s) 1600. The computer readable media 1608 may have stored thereon a scraping logic 1302, scoring logic 1304 and interface logic 1306. It will be appreciated that each of the functional blocks 1302-1306 may have instructions stored therein that, when executed by the processor(s) 1600, may enable various functions pertaining to the operations of the construct system(s) 1220.

FIG. 17 illustrates a flow diagram of an example method 1700 that may provide functionality for determining a score for a construct and providing the score with an explanation of factors used in its determination, in accordance with example embodiments of the disclosure. The method 1700 may be performed by service system 1210 and/or the scoring system 1220 of FIG. 12.

At block 1702, the construct scoring system may receive a query for a score for a particular construct. At block 1704, the construct scoring system may determine similar constructs to the particular construct of the particular constructor based on mappings of constructs and associated constructors.

At block 1706, the construct scoring system may determine a plurality of current popularity indicators of the particular construct including or based on recent scores and historical scores of constructs of the same particular constructor, recent scores and historical scores of similar constructs of other constructors, a rate of occurrence of instances of information from data sources regarding particular construct, particular constructor, similar constructs, similar constructors, or categories of the particular construct, particular constructor and/or sentiment analyses of those instances. The construct scoring system may then determine a score for the particular construct using the plurality of current popularity indicators of the particular construct at block 1708.

The construct scoring system may display the score of the particular construct of the particular constructor, for example, as part of a score presentation user interface at block 1712. In addition, the construct scoring system may display the plurality of current popularity indicators with the score in the score presentation user interface at block 1714. For example, the display of the plurality of current popularity indicators with the score may include an explanation of how the plurality of current popularity indicators influenced the determination of the score.

Figure 18:
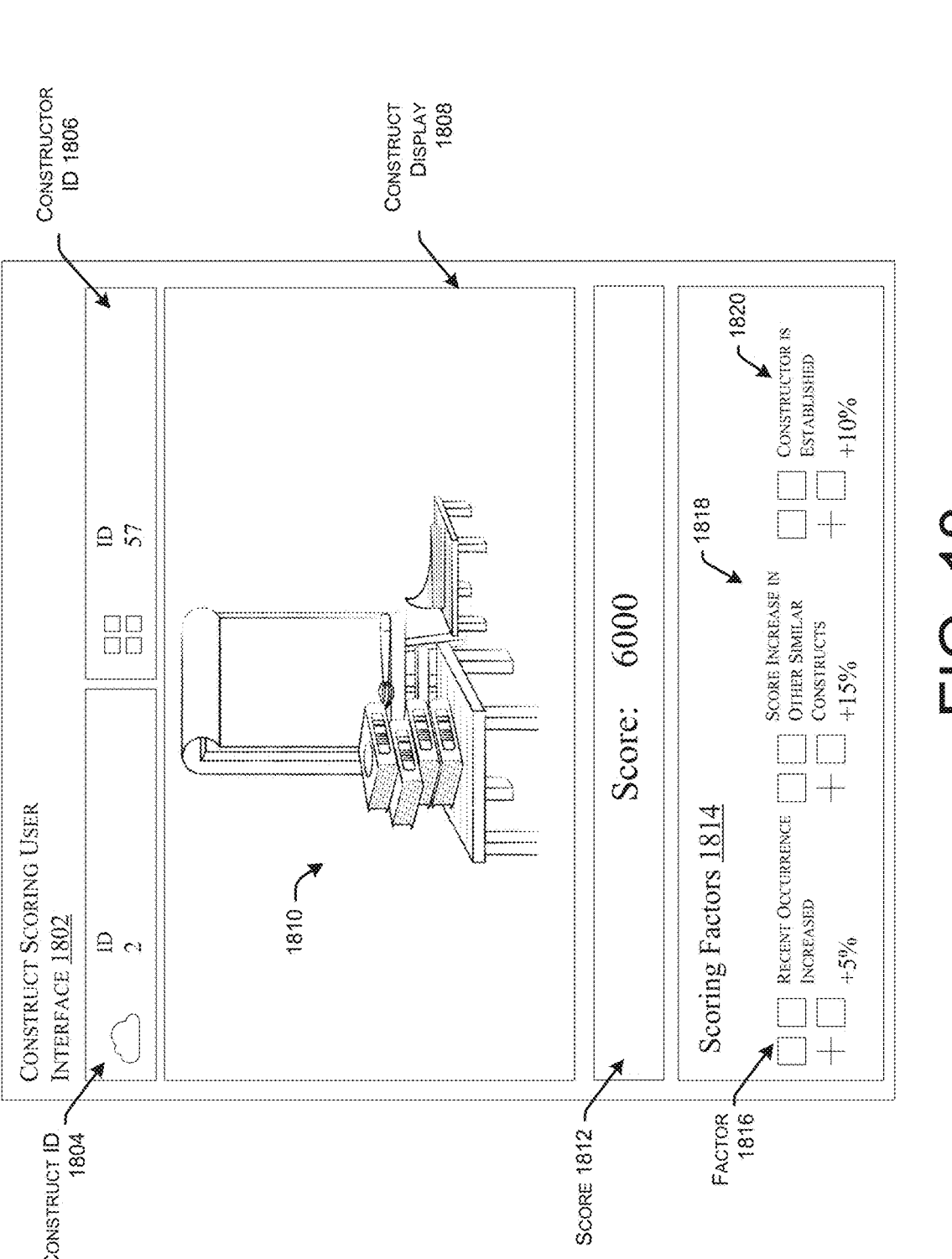
FIG. 18 illustrates an example view of a construct scoring user interface that may be presented to a user requesting a score for particular construct, in accordance with example embodiments of the disclosure.

FIG. 18 illustrates an example view 1800 of a construct scoring user interface 1802 that may be presented to a user requesting a score for particular construct, in accordance with example embodiments of the disclosure. In some examples, the examples, construct scoring user interface 1802 illustrated in FIG. 18 may be generated and presented to a client by the service system(s) 1210.

As illustrated, the construct scoring user interface 1802 includes fields or areas for an identification of the construct 1804 and an identifier of the associated constructor 1806. Below the ID areas, the construct scoring user interface 1802 may include a construct display area 1808 which includes an image 1810 or other recognizable visual of the construct being scored. As illustrated, the construct being scored is an artwork and the constructor is an artist who made the artwork.

The construct scoring user interface further includes areas for the construct score 1812 and scoring factors 1814 that affected the determination of the score. In the illustrated example, the score 1812 is 6000. However, in other examples, the score may be a value with units such as a monetary value, price, quality score, skill score or other measurement of the score or value.

In the example of FIG. 18, the factors 1814 include a first factor that increase the score by 5% due to an increase in occurrences of mentions of the construct or the associated constructor scraped from information networks, such as digital and/or social media platforms. For example, factor 1816 may indicate that the artist who made the construct 1810, the artist's portfolio, or the artwork 1810 have been hot topics of conversation on a social media, news media, discussion boards, recent art books or magazines, and so on. Similarly, the second factor 1818 indicates that the score was increased by 15% because the scoring system determined that the scores of other constructs that are similar to the particular construct have been increasing. Such similarity may be based on the category, form, similarity of constructor, or many other factors. For example, the second factor 1818 may represent an increase in the scores of other artwork of artists similar to the artist who made construct 1810, artworks of the same art form and/or medium or artworks of the same genre or category. Finally, the scoring factor 1820 indicates that the score was increased by 10% because the constructor associated with the particular construct is established. For example, the scoring factor may be based on whether the artist is new or developing, mid-career or developed, or established or well-known.

The particular information displayed by the construct scoring system may vary from example to example. Some additional variations are shown in FIGS. 19 and 20.

Figure 19:
FIG. 19 illustrates an example view of a construct score history user interface that may be presented to a user requesting a score history for a particular construct, in accordance with example embodiments of the disclosure.

More particularly, FIG. 19 illustrates an example view 1900 of a construct score history user interface 1902 that may be presented to a user requesting a score history for a particular construct, in accordance with example embodiments of the disclosure.

As illustrated, the construct score history user interface 1902 includes fields or areas for an identification of the construct 1904 and an identifier of the associated constructor 1906. Below the ID areas, the construct score history user interface 1902 may include a construct score history display area 1908 which may include a line graph 1910 that shows the increase or decrease of the construct score (e.g., on the vertical direction or Y axis) over time (e.g., the horizontal direction or X axis) for a time period selected by choosing a time range option in the time range area 1914.

The construct scoring user interface further includes an area for the current construct score 1912. In the illustrated example, the score 1912 is 6000.

FIG. 20 illustrates an example view 2000 of a constructor combined popularity factor history user interface 2002 that may be presented to a user requesting to know the history of the popularity for a particular constructor, in accordance with example embodiments of the disclosure.

As illustrated, the constructor combined popularity factor history user interface 2002 includes fields or areas for an identification of a construct 2004 and/or an identifier of the constructor 2006. For example, the constructor combined popularity factor user interface may be requested for the constructor of an identified construct or based on the identification of the constructor. In the illustrated example of FIG. 20, a constructor is directly identified without a particular construct. Below the ID areas, the constructor combined popularity factor history user interface 2002 may include a constructor combined popularity factor history display area 2008 which may include a line graph 2010 that shows the increase or decrease of the constructor combined popularity factor (e.g., the vertical direction or Y axis) over time (e.g., the horizontal direction or X axis) for a time period selected by choosing a time range option in the time range area 2012.

While FIGS. 18-20 illustrate example construct score and related presentations, examples are not so limited and may include any number of variations, aggregations, combinations, and so on of data related to scoring constructs. For example, a score history user interface could be presented which includes an average score history for the set of constructs associated with a particular constructor. Continuing the artist artwork example discussed above with respect to FIG. 18, the score history user interface could be an average score history for the portfolio of an artist.

Figure 21:
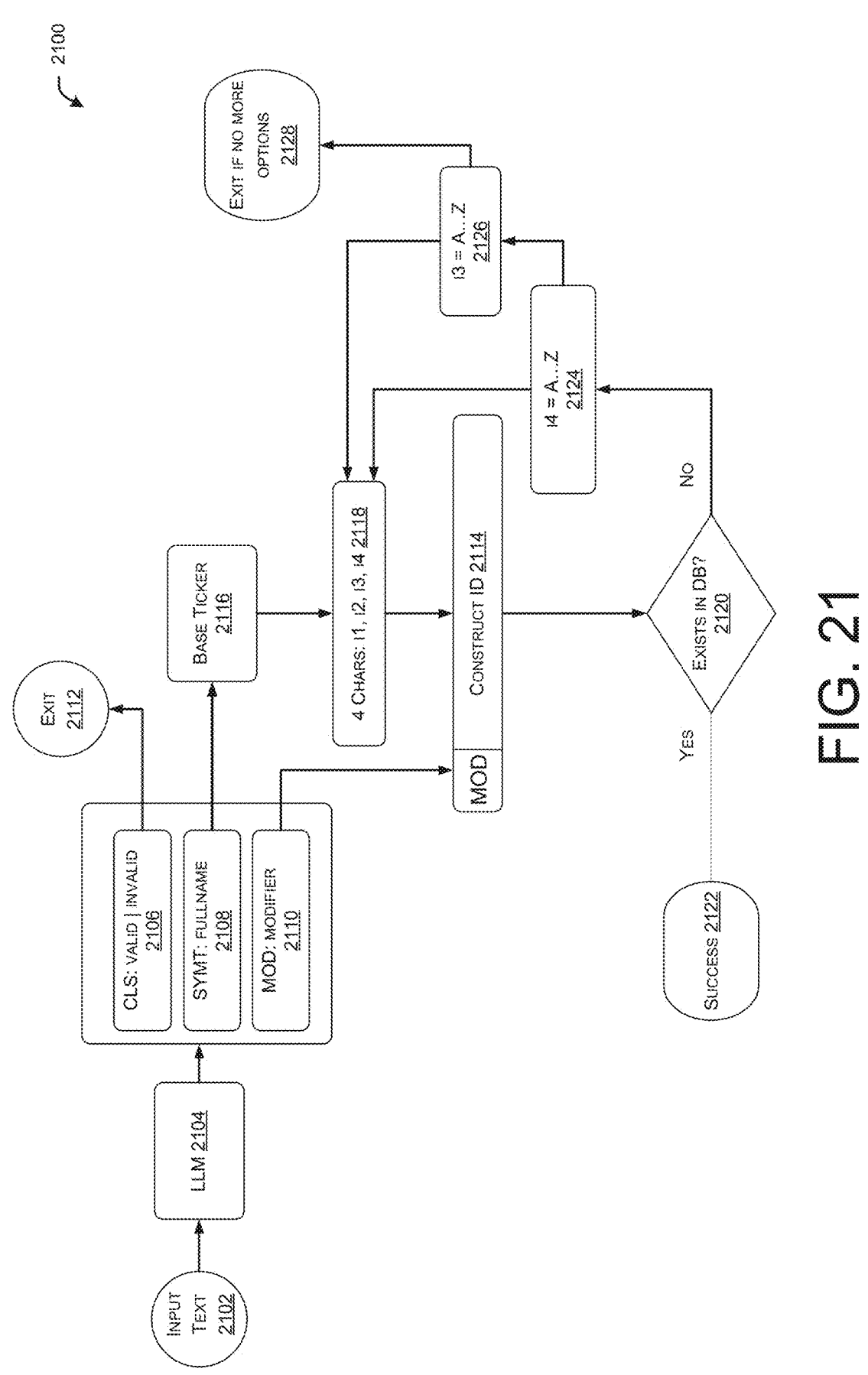
FIG. 21 illustrates an example data flow diagram that may be utilized to determine an identifier for constructs, in accordance with example embodiments of the disclosure.

FIG. 21 illustrates an example data flow diagram 2100 that may be utilized to determine an identifier for constructs, in accordance with example embodiments of the disclosure. In some examples, the identifier may be utilized with the display of construct scores or information related to construct scores.

As illustrated, input text 2102 may be provided to a large language model (LLM) 2104 such as open AI and/or Llama2. The LLM 2104 may be configured to accept the input text 2102 and generate a valid invalid indicator 2106 based on whether a valid identifier can be generated for the input text 2102. If not, the process flow may exit at 2112 because no valid ID can be created. Otherwise, the LLM 2104 may utilize the full name 2108 of the construct to generate a base ticker 2116 from the full name and/or other data. The LLM 2104 may further generate a mod value 2110.

At block 2118, the base ticker 2116 may be converted into a four characters string 2116 (e.g., i1, i2, i3, and i4). A construct ID may then be created from the mod value 2108 and the current four characters of 2116 at 2114.

At 2120, the construct ID is checked for existence in the database. If it exists in the database, the data flow proceeds to 2122 with success. Otherwise, the data flow proceeds to 2124 and attempts different characters for i4 of the 4 characters (e.g., i1, i2, i3, and i4). A new four character string is generated at 2118 based on the new i4 and a new construct ID is generated at 2114 and checked again at 2120. The cycle may repeat until success is achieved or additional characters are unavailable at 2122 for i4 (e.g., A-Z have been tried). If that occurs, process may continue to 2126 and attempt to try different characters for i3 and i4. If the cycle still fails to produce a match, the process may exit at 2128 due to having no more options.

A similar process could be performed for the constructor ID.

In this way, construct IDs and/or constructor IDs may be generated for use in the data storage and are displaying of construct scores and related information.

Figure 22:
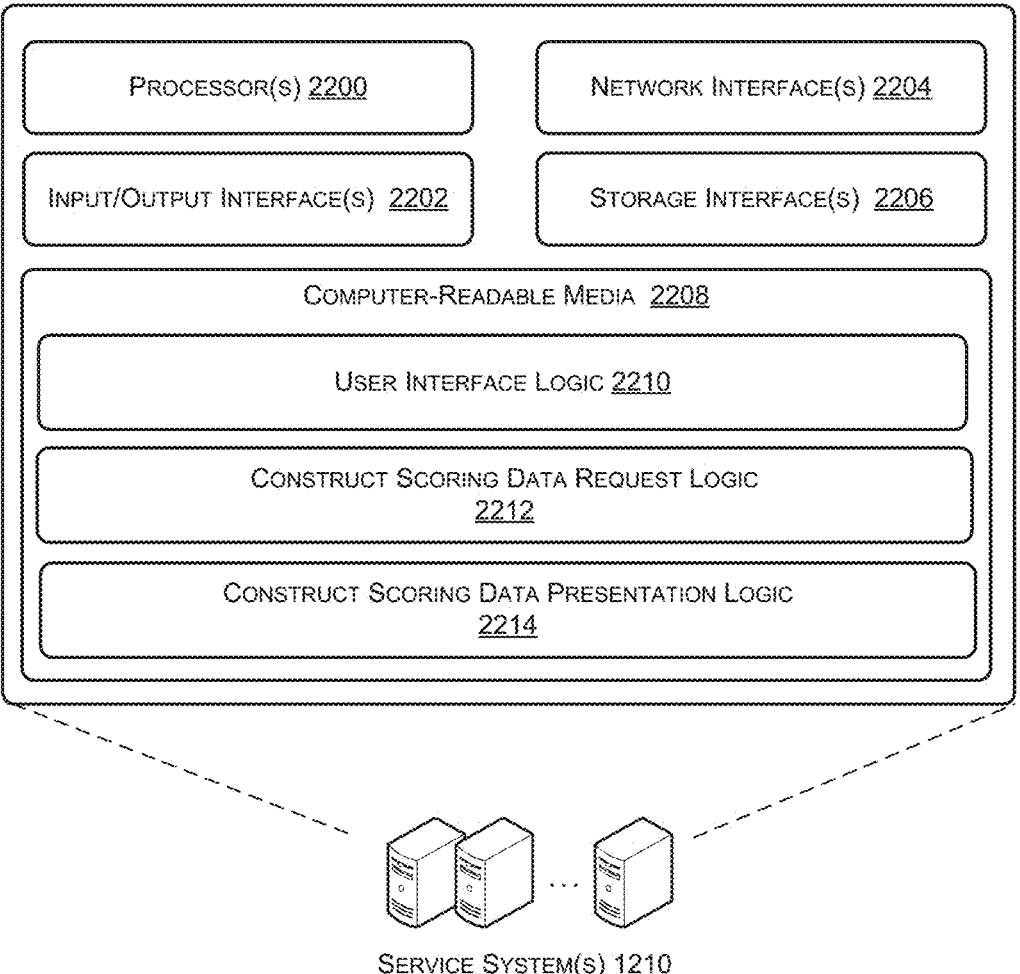
FIG. 22 illustrates a block diagram of example service system(s) that may provide a construct score with an explanation of factors used in its determination, in accordance with examples of the disclosure.

FIG. 22 illustrates a block diagram of an example service system(s) 1210 that may provide a construct score with an explanation of factors used in its determination, in accordance with examples of the disclosure. The service system(s) 1210 may include one or more processor(s) 2200, one or more input/output (I/O) interface(s) 2202, one or more network interface(s) 2204, one or more storage interface(s) 2206, and computer-readable media 2208.

In some implementations, the processor(s) 2200 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 2200 may possess its own local memory, which also may store program modules, program data, and/or one or more operating system(s). The one or more processor(s) 2200 may include one or more cores.

The one or more input/output (I/O) interface(s) 2202 may enable the service system(s) 1210 to detect interaction with a user and/or other system(s), such as one or more service system(s) 1210. The I/O interface(s) 2202 may include a combination of hardware, software, and/or firmware and may include software drivers for enabling the operation of any variety of I/O device(s) integrated on the service system(s) 1210 or with which the service system(s) 1210 interacts, such as displays, microphones, speakers, cameras, switches, and any other variety of sensors, or the like.

The network interface(s) 2204 may enable the service system(s) 1210 to communicate via the one or more network(s). The network interface(s) 2204 may include a combination of hardware, software, and/or firmware and may include software drivers for enabling any variety of protocol-based communications, and any variety of wireline and/or wireless ports/antennas. For example, the network interface(s) 2204 may comprise one or more of a cellular radio, a wireless (e.g., IEEE 802.1x-based) interface, a Bluetooth® interface, and the like. In some embodiments, the network interface(s) 2204 may include radio frequency (RF) circuitry that allows the service system(s) 1210 to transition between various standards. The network interface(s) 2204 may further enable the service system(s) 1210 to communicate over circuit-switch domains and/or packet-switch domains.

The storage interface(s) 2206 may enable the processor(s) 2200 to interface and exchange data with the computer-readable medium 2208, as well as any storage device(s) external to the service system(s) 1210.

The computer-readable media 2208 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 2208 may be implemented as computer-readable storage media (CRSM), which may be any available physical media accessible by the processor(s) 2200 to execute instructions stored on the computer readable media 2208. In one basic implementation, CRSM may include RAM and Flash memory. In other implementations, CRSM may include, but is not limited to, ROM, EEPROM, or any other tangible medium which can be used to store the desired information and which can be accessed by the processor(s) 2200. The computer-readable media 2208 may have an operating system (OS) and/or a variety of suitable applications stored thereon. The OS, when executed by the processor(s) 2200 may enable management of hardware and/or software resources of the service system(s) 1210.

Several functional blocks having instruction, data stores, and so forth may be stored within the computer-readable media 2208 and configured to execute on the processor(s) 2200. The computer readable media 2208 may have stored thereon a user interface logic 2210, construct scoring data request logic 2212, and a construct scoring data presentation logic scraping logic 2214. It will be appreciated that each of the functional blocks 2210-2214 may have instructions stored therein that, when executed by the processor(s) 2200, may enable various functions pertaining to the operations of the service system(s) 1210.

Figure 23:
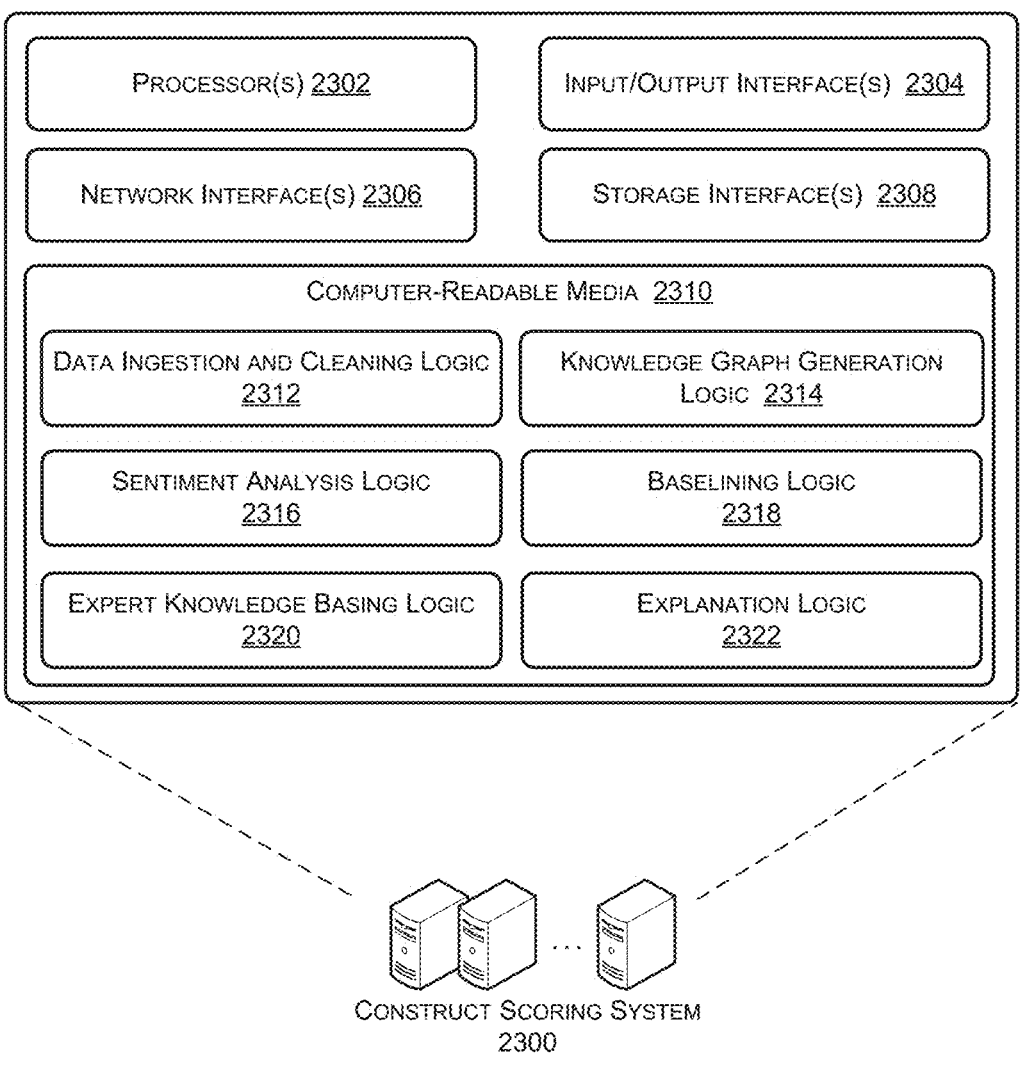
FIG. 23 illustrates a block diagram of example construct scoring system that may include a scoring logic architecture, in accordance with examples of the disclosure.

FIG. 23 illustrates a block diagram of example construct scoring system 2300 that may include a scoring logic architecture, in accordance with examples of the disclosure. The construct scoring system 2300 may include one or more processor(s) 2302, one or more input/output (I/O) interface(s) 2304, one or more network interface(s) 2306, one or more storage interface(s) 2308, and computer-readable media 2310.

In some implementations, the processor(s) 2302 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 2302 may possess its own local memory, which also may store program modules, program data, and/or one or more operating system(s). The one or more processor(s) 2302 may include one or more cores.

The one or more input/output (I/O) interface(s) 2304 may enable the construct scoring system 2300 to detect interaction with a user and/or other system(s), such as one or more construct scoring system 2300. The I/O interface(s) 2304 may include a combination of hardware, software, and/or firmware and may include software drivers for enabling the operation of any variety of I/O device(s) integrated on the construct scoring system 2300 or with which the construct scoring system 2300 interacts, such as displays, microphones, speakers, cameras, switches, and any other variety of sensors, or the like.

The network interface(s) 2306 may enable the construct scoring system 2300 to communicate via the one or more network(s). The network interface(s) 2306 may include a combination of hardware, software, and/or firmware and may include software drivers for enabling any variety of protocol-based communications, and any variety of wireline and/or wireless ports/antennas. For example, the network interface(s) 2306 may comprise one or more of a cellular radio, a wireless (e.g., IEEE 802.1x-based) interface, a Bluetooth® interface, and the like. In some embodiments, the network interface(s) 2306 may include radio frequency (RF) circuitry that allows the construct scoring system 2300 to transition between various standards. The network interface(s) 2306 may further enable the construct scoring system 2300 to communicate over circuit-switch domains and/or packet-switch domains.

The storage interface(s) 2308 may enable the processor(s) 2302 to interface and exchange data with the computer-readable medium 2310, as well as any storage device(s) external to the construct scoring system 2300.

The computer-readable media 2310 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 2310 may be implemented as computer-readable storage media (CRSM), which may be any available physical media accessible by the processor(s) 2302 to execute instructions stored on the computer readable media 2310. In one basic implementation, CRSM may include RAM and Flash memory. In other implementations, CRSM may include, but is not limited to, ROM, EEPROM, or any other tangible medium which can be used to store the desired information and which can be accessed by the processor(s) 2302. The computer-readable media 2310 may have an operating system (OS) and/or a variety of suitable applications stored thereon. The OS, when executed by the processor(s) 2302 may enable management of hardware and/or software resources of the construct scoring system 2300.

Several functional blocks having instruction, data stores, and so forth may be stored within the computer-readable media 2310 and configured to execute on the processor(s) 2302.

As mentioned above, a construct scoring system 2300 may include a scoring logic architecture. As illustrated, the construct scoring system 2300 may include the computer readable media 2310 that may have stored thereon one or more of a data ingestion and cleaning logic 2312, a knowledge graph generation logic 2314, a sentiment analysis logic 2316, a baselining logic 2318, an expert knowledge basing logic 2320 and/or an explanation logic 2322. It will be appreciated that each of the functional blocks 2312-2322 may have instructions stored therein that, when executed by the processor(s) 2302, may enable various functions pertaining to the operations of the construct scoring system 2300.

For example, the data ingestion and cleaning logic 2312 may ingest structured data and unstructured data identifying constructors, constructs, and categories of constructs, where the constructs are associated with particular constructors and with at least one particular category.

For example, the data ingestion and cleaning logic 2312 may utilize natural language processing and computer vision techniques to extract information from unstructured data sources such as text and images.

The data ingestion and cleaning logic 2312 may further clean the ingested structured and unstructured data, for example, to cleanse missing values and outliers.

The knowledge graph generation logic 2314 may represent, in a graph, the constructors, the constructs, and the categories as nodes of the graph. The knowledge graph generation logic 2314 may further represent, using edges between the nodes of the constructor graph, similarity between constructors of the constructors, similarity between constructs, and influences between categories of the constructs. In some examples, the edge generation may utilize similarity models such as Convolutional Neural Network (CNN) embeddings and Word2Vec embeddings. CNN embeddings may operate to learn visual features from images to find similar categories and forms which may be useful for comparing visual constructs. Word2Vec embeddings may operate to learn vector representations of words and phrases which may be useful for finding between construct titles and descriptions.

The knowledge graph generation logic 2314 may also identify clusters of nodes in the constructor graph as well as central nodes of the clusters of nodes. For example, the knowledge graph generation logic 2314 may utilize a graph community detection algorithms to identify clusters of related nodes in knowledge graph. In some examples, this may allow for the clusters to identify similar constructors or category for the constructs.

The sentiment analysis logic 2316 may use natural language processing or similar processing to detect entries in the cleansed structured data and cleansed unstructured data that identify the constructors, the constructs, and the categories and associated sentiments. In some examples, the sentiment analysis logic 2316 may extract key phrases, entities, and sentiments expressed from the unstructured data. Depending on the example, the sentiment analysis logic 2316 may give weight to influential sources based on metrics like authority, reach, and similar considerations. In some examples, the determination of whether sources are influential are not may based on an analysis, based on specifications stored in the computer readable medium 2310, or in similar ways.

The baselining logic 2318 may determine a baseline score indicator for a target construct by a target constructor based on past score records of constructs of the target constructor and constructs of constructors similar to the target constructor. In some examples, the similarity of constructs or constructors may be determined by querying the target construct and the target constructor against the clusters in the constructor graph. Further, the determination of the baseline score indicator may take into account a weighted combination of (i) the past score records of the constructs of the target constructor, (ii) the past score records of the constructs of the constructors similar to the target constructor, and/or (iii) associated sentiments as detected for the target construct, the target constructor, and a category of the target construct and the target constructor. In some examples, the past score records may be adjusted for score scale drift.

The expert knowledge basing logic 2320 may use expert rule sets to generate a final score indicator based on applying the expert rule sets to the baseline score indicator. In some examples, the expert knowledge basing logic 2320 may utilize a markup language that is generate based on expert opinion. In some examples, the weighting utilized throughout the system may be based on the expert rules and feedback. An example process for developing a markup language for expert rules follows.

In some examples, data may be collected from experts regarding factors and relationships that can affect scoring. For example, experts in the scoring of a type of construct, experts in the constructor of a particular construct or a set of constructs, and experts in a type of scoring may be used as sources in gathering the data on factors and relationships that can affect scoring.

The construct scoring system may then utilize large language model (LLM) or similar tools to analyze the collected data (e.g., transcripts or written responses) and generate a formal grammar for the markup language. The LLM may also be used to derive statements about weighting different data sources, adjusting scores, specifying conditions, etc.

Once a formal grammar has been developed for the markup language, the initial grammar and syntax may be refined through an iterative process of having experts write sample rules using the markup language, gathering feedback on expressiveness, clarity, and ease of use, and then updating the grammar using the LLM to incorporate the feedback.

In an example, the expert rules written in an example markup language for scoring rules for artwork constructs could have the following form:

```
...
IF artist = "Picasso" AND year > 1907 AND style ~= "Cubism"
    INCREASE score BY 20%
IF sentiment FOR artist < 0
    DECREASEscore BY 10%
DECREASE weight OF crowd_sourced scores BY 50%
INCREASE weight OF accepted_scores BY 50%
...
```

An interpreter or compiler may be utilized to converts the expert rules into executable code that can adjust the weights applied to different input factors, increase or decrease the baseline scoring of a construct, or apply conditional logic based on the constructor, category, form, sentiment, etc.

In some examples, updates may be performed to expert rules throughout the operation of the construct scoring system. For example, testing of simulated scoring may be performed by experts based on feedback from a monitoring system or the users of the construct scoring system.

The testing of the simulated scoring may include: running indicators on a validation set with and without a proposed rule change; verifying the impact on predictive accuracy, explainability, etc.; and refining rules until the desired scoring behaviors are achieved.

Developing expert rules in this or a similar manner may allow for the translating of expert domain knowledge into an automated, auditable and testable system for adjusting the scoring of constructs by the construct scoring system.

The explanation logic 2322 may display the final score indicator in conjunction with a breakdown of the application of the weighted combination and the expert rule sets. For example, the explanation logic 2322 may provide a breakdown of the contribution from different data signals provided to allow the users to understand how various factors affected the score.

FIG. 24 illustrates a flow diagram of an example method 2400 that may provide functionality for determining a score for a construct and providing the score with an explanation of factors used in its determination, in accordance with example embodiments of the disclosure. The method 2400 may be performed by the scoring logic architecture of the construct scoring system 2300 of FIG. 23.

At block 2402, the data ingestion and cleaning logic 2312 may ingest structured data and unstructured data identifying constructors, constructs, and categories of constructs. At block 2404, the data ingestion and cleaning logic 2312 may clean the ingested structured and unstructured data to generate cleansed structured data and cleansed unstructured data.

At block 2406, the knowledge graph generation logic 2314 may represent, in a constructor graph, the constructors, the constructs, and the categories as nodes of the constructor graph. Further, at block 2408, the knowledge graph generation logic 2314 may represent, using edges between the nodes of the constructor graph, similarity between constructors of the constructors, similarity between constructs of the constructs, and influences between the categories of constructs. Then, at block 2410, the knowledge graph generation logic 2314 may identify clusters of nodes in the constructor graph and central nodes of the clusters of nodes.

At block 2412, the sentiment analysis logic 2316 may use natural language processing to detect entries in the cleansed structured data and cleansed unstructured data that identify the constructors, the constructs, and the categories and associated sentiments.

Then, at block 2414, the baselining logic 2418 may determine, from past score records of constructs of a target constructor and of constructors similar to the target constructor, a baseline score indicator for a target construct by the target constructor.

At block 2416, the expert knowledge basing logic 2320 may use expert rule sets to generate a final score indicator based on applying the expert rule sets to the baseline score indicator The explanation logic 2322 may then display the final score indicator in conjunction with a breakdown of the application of the weighted combination and the expert rule sets at block 2418.

Figure 25:
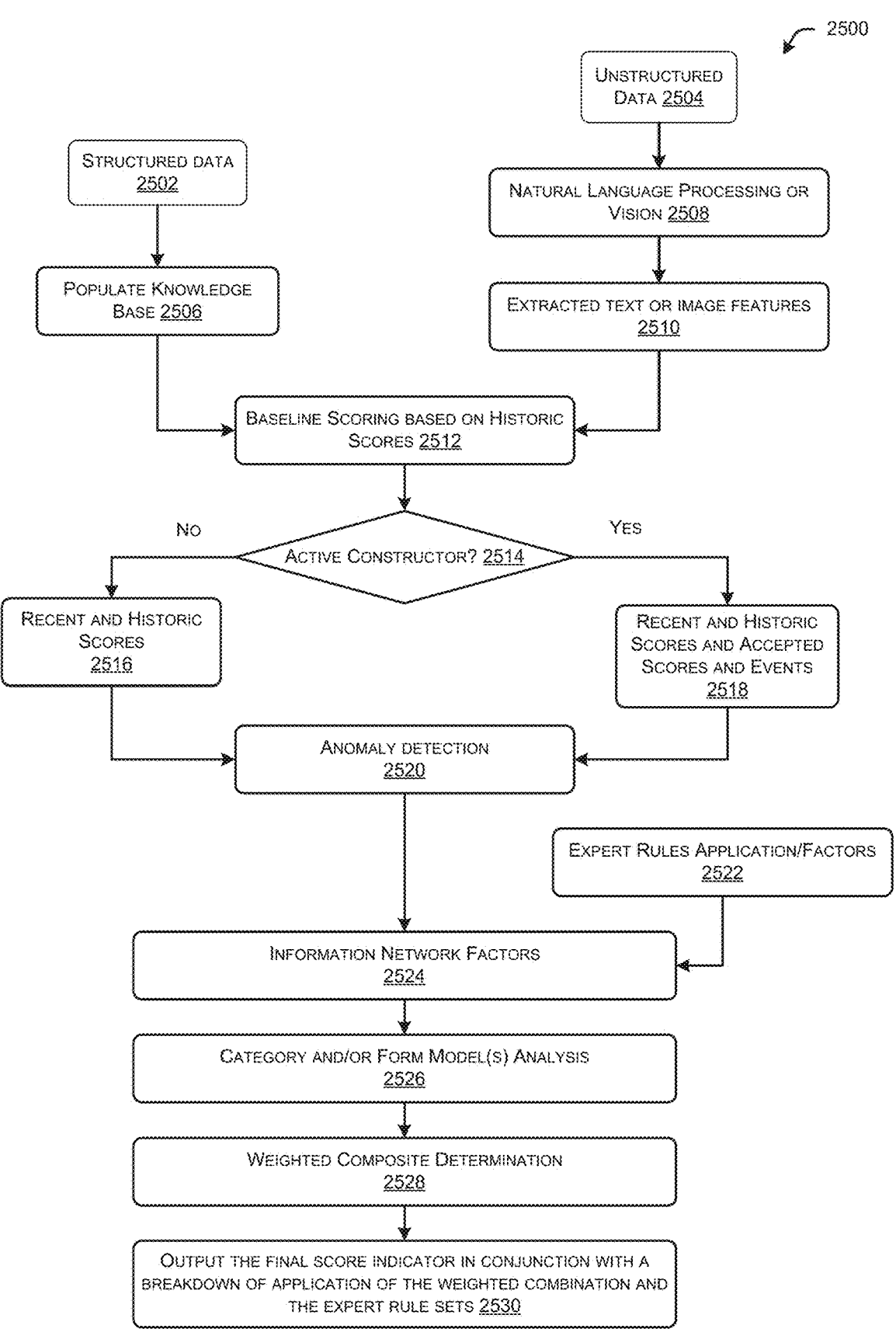
FIG. 25 illustrates a data flow diagram of an example process that may provide functionality for determining a score for a construct and providing the score with an explanation of factors used in its determination, in accordance with example embodiments of the disclosure.

FIG. 25 illustrates a data flow diagram of an example process 2500 that may provide functionality for determining a score for a construct and providing the score with an explanation of factors used in its determination, in accordance with example embodiments of the disclosure. The process 2500 may be performed by the systems of FIGS. 12, 13, 16, 22, and/or 23.

As illustrated, the construct scoring system may process structured data 2502 for addition to knowledge base(s) 2506 such as databases including information from structured storage (e.g., past construct scores, data regarding mentions of constructs, and other data that may or may not be represented in the mapping datastore). The knowledge base(s) 2506 may further include mappings between constructs, constructors of the constructs, and/or categories of constructs. For example, the mappings may be stored in a graph database such as a knowledge graph. The construct scoring system may further process unstructured data 2504 such as such as text and images using natural language processing or vision processing 2508 or similar processes to extract information from the unstructured data such as extracted text or image features 2510.

The construct scoring system may then determine the baseline scoring 2512 based on historical scores of the constructs (e.g. construct considered to be similar or pertinent to a target construct) and/or other the information in the knowledge base and the featured extracted from the unstructured data. In some examples, the historic scores of the constructs may be adjusted for score scale drift or differences in the objective score due to different ages of the scores. For example, in the case of a price type score, the score scale drift may be caused by inflation or differences in currency exchange rates.

Next, the construct scoring system may determine whether a constructor of a similar construct for which construct information is to be considered to determine the score of the target construct is an active constructor at 2514. A constructor may be active if the constructor is still producing constructs or able to make an impact through recent actions. For example, a human constructor may be active if the constructor is living, non-retired, or being actively involved in the industry or context of the constructs. In other words, an artist making new artworks and hosting new gallery events or the like may have different factors involved in scoring active artist's artwork from factors involved in scoring artwork of a dead artist.

If the constructor is active, subsequent operations for the similar construct may consider accepted scores and use event information regarding the similar construct in addition to recent and historical scores 2518. Returning to the example of living artists as active constructors, the accepted scores may represent gallery sale prices and/or gallery listing prices and events may refer to gallery shows or exhibitions.

Otherwise, subsequent operations may consider the recent and historical scores 2516. In some examples, recent and historic scores may include crowd sourced scores. In an artist-artwork example, a crowd sourced score may be an auction sales price. At 2520, anomaly detection may be performed at least in part based on a comparison of the accepted, recent and historic score information against the baseline scoring of the construct.

Following the anomaly detection, the construct scoring system may determine scoring factors for the final score indicator based on data extracted from information networks 2524 or other data sources. Similarly, expert rules 2522 may be applied which include manual rules and tuning based on expertise in scoring constructs to account for quirks that are not captured by the structured and unstructured data.

The construct scoring system may perform processing to ensure that the different forms and categories 2526 of constructs are considered differently in the final score indicator generation. For example, different forms or categories the constructs may be evaluated separately and then combined into an overall final indicator. If a constructor is associated with constructs of different forms or categories, the constructs may be weighted based on which category or form the constructor is best known for. In some examples, once the separate indicators are generated for the different forms and/or categories of constructs, the separate indicators may be combine into composite indicators (e.g., per constructor and then weighted based on which category or form the particular constructor is best known for).

Then, at 2528, the construct scoring system may perform a weighted composite determination based on the factors determined at 2522, 2524, and 2526 for the data 2516 or 2518.

Various models and analytics may be utilized to generate indicators based on the determinations at and during 2524-2528. These models may include similarity models, prediction models, and analytic models. Similarity models may include Convolutional Neural Network (CNN) embeddings which may learns visual features from images to find similar styles and themes, Word2Vec embeddings which may learn vector representations of words and phrases, and graph community detection algorithms which may identify clusters of related nodes in knowledge graph. Prediction models may include Long Short Term Memory (LSTM) networks which may provide temporal sequence models that are good for time series forecasting and score prediction based on historic record data, random forest model which may be ensemble tree-based models useful for regression and classification, and Bayesian Networks that may be probabilistic graphical models that capture correlations and causality and may help model influence relationships. Analytic models may include Analysis of Variance (ANOVA) models that may analyze variation in scores due to different factors like size, form, constructor, etc., network centrality metrics models such as PageRank which may provide betweenness centrality to find influential nodes in the knowledge graph to identify influential sources of data for weighting, sentiment analysis models which may provide a text classification and scoring model to extract sentiment from unstructured text such as news, expert interview transcripts and so on, Hedonic Regression models which may be used as a benchmark method to develop a more traditional score prediction model (p^HR), a Probit Regression model, and OLS Regression models which may be used in several analyses to relate realized some types of scores to the different predictions.

The construct scoring system may then output the final score indicator 2530 in conjunction with a breakdown of the application of the weighted combination and the expert rule sets.

In a first example, the data sources for a particular constructor, Andy Warhol, of a particular construct to be scored may include news articles and social media posts related to Andy Warhol over past 6 months, crowd sourced scores for Warhol's constructs and data regarding how many recent scores have occurred for Warhol, and art historical database information on Warhol's styles (e.g., category and form), time periods, and similarity to other constructors.

The resulting scoring indicators may include an output of a sentiment analysis model that processed information network data related to Warhol to reveal stable or slightly increasing interest in Warhol, an output of a LSTM model that forecasts scores using Warhol's past scores and that predicts a slightly increasing score trend, a logistic regression model that estimates scores based on scores of similar constructs which may provide a base score, and a set of expert rules which specify an 80% weight to the sentiment analysis, a 10% weight to the LSTM, and a 10% weight to the regression output due to family ownership of the construct.

These indicators may be combined with the baseline score and the resulting final score may be output with an explanation of the determination above.

In a second example, the data sources for a particular constructor, Hilary Pecis, of a particular construct to be scored may include: crowd sourced scores and accepted scores for constructs of Pecis, museum exhibitions and collections of constructs related to Pecis, and art historical context on new artists and scoring dynamics.

The resulting scoring indicators may include an output of a linear model predicts 10% higher scores for secondary scores based on accepted scores, the output of a BERT sentiment analysis on news and reviews that indicates a growing interest and acclaim for Pecis, the output of a network analysis that shows a proximity to influential constructors that may boosts prestige of Pecis. Further, expert rules may be used for new constructors to adjust baseline scores from standard scores.

These indicators may be combined with the baseline score and +10% adjustment and the resulting final score may be output with an explanation of the determination above.

These examples illustrate how different data sources, models, and expert knowledge are synthesized in a manner to generate scoring indicators adapted to each construct's unique context and history and in a manner that may be explained to the user.

FIG. 26 illustrates a data flow diagram of an example process 2600 that may provide functionality for determining a score for a construct and providing the score with an explanation of factors used in its determination, in accordance with example embodiments of the disclosure. The process 2600 may be performed by the systems of FIGS. 12, 13, 16, 22, and/or 23.

As illustrated, the construct scoring system may process structured data 2602 for addition to knowledge base(s) 2606 such as databases including information from structured data or unstructured data (e.g., past construct scores, data regarding mentions of constructs, text segments, and other data that may or may not be represented in the mapping datastore). The knowledge base(s) 2606 may further include mappings between constructs, constructors of the constructs, and/or categories of constructs. For example, the mappings may be stored in a graph database such as a knowledge graph. The construct scoring system may further process unstructured data 2604 such as such as text and images using natural language processing or vision processing 2608 or similar processes to extract information from the unstructured data such as extracted text or image features 2610.

The construct scoring system may then determine the baseline scoring 2612 based on historical scores of the constructs (e.g., constructs considered to be similar or pertinent to a target construct) and/or other the information in the knowledge base and the featured extracted from the unstructured data. In some examples, the historic scores of the constructs may be adjusted for score drift or differences in the objective score due to different ages of the scores.

Next, the construct scoring system may determine whether the constructs whose data is to be used in determining the final score indicator are constructs of different subclasses (e.g., different categories or different forms) at 2614.

If so, the processing may continue to 2618 and the construct scoring system may perform processing to ensure that the different forms and categories of constructs are considered differently in the final score indicator generation. For example, different forms or categories the constructs may be evaluated separately and then combined into an overall final indicator. If a constructor is associated with constructs of different forms or categories, the constructs may be weighted based on which category or form the constructor is best known for. For example, once the separate indicators are generated for the different forms and/or categories of constructs, the separate indicators may be combined into composite indicators (e.g., per constructor and then weighted based on which category or form the particular constructor is best known for).

Then, at 2620, the construct scoring system may determine a final score indicator from the composite scoring indicators by generating a weighted combination of the composite indicators.

Though not shown, the scoring process of FIG. 26 may utilize similar composite indicator determinations as discussed above with respect to FIG. 25. For example, the composite indicator determination may consider different sets of score data depending on if the constructor is still active. Further, the scoring process of FIG. 26 may further consider information network derived indicators and/or perform anomaly detection as discussed above.

The construct scoring system may determine scoring factors for the final score indicator based on data extracted from information networks 2624 or other data sources. Similarly, expert rules 2622 may be applied which include manual rules and tuning based on expertise in scoring constructs to account for quirks that are not captured by the structured and unstructured data.

The construct scoring system may output the final score indicator 2622 in conjunction with a breakdown of the application of the weighted combination and the expert rule sets.

FIG. 27 illustrates a flow diagram of an example method 2700 that may provide functionality for determining a baseline score for a construct and providing the baseline score with an explanation of factors used in its determination, in accordance with example embodiments of the disclosure. The method 2700 may be performed by the scoring logic architecture of the construct scoring system 2300 of FIG. 23.

At block 2702, the data ingestion and cleaning logic 2312 may ingest structured data and unstructured data identifying constructors, constructs, and categories of constructs At block 2704, the knowledge graph generation logic 2314 may represent in a constructor scoring graph the constructors, the constructs, and the categories as nodes of the constructor graph. Further, at block 2706, the knowledge graph generation logic 2314 may represent, using edges between the nodes of the constructor graph, similarity between constructors of the constructors, similarity between constructs of the constructs, and influences between the categories of constructs, similarity in historical scoring of constructs over time.

In some examples, some edges may represent correlations between construct scores based on historical data. Constructs whose scores have historically moved together may have weighted correlation edges. Further some edges may be causal edges that represent presumed driver-driven relationships. For example, the score of a particular collectible construct may influence scores for other related constructs (e.g., comic book issues in a same series).

At block 2708, the baselining logic 2418 may perform path analysis and weighted edge traversal of the constructor scoring graph to identify chains of correlation and causation between constructs and represent chains of correlations and causations as causal edges that represent driver-driven relationships between scores of related or similar constructs. This may produce insights like "if construct X's score increases, it tends to drive up scores for constructs A, B and C".

At block 2710, the baselining logic 2418 may identify clusters of nodes in the constructor scoring graph and utilize centrality measures to determine central nodes of the clusters of nodes as the most influential constructs of the clusters. The scores of these central nodes may cause changes in scores to propagate through the graph. In some examples, New structural relationships and weighted edges may emerge organically over time as new data is added to the knowledge graph.

At block 2712, the baselining logic 2418 may generate or validate construct scoring indicators based on adjacent correlated construct and causal relationships. The construct scoring indicators may be utilized as discussed above to determine a final construct score and to prepare an output explanations of different factors that impact the final score indicator.

FIG. 28 illustrates a block diagram of an example system architecture 2800 that may provide a construct score with an explanation of factors used in its determination, in accordance with examples of the disclosure. The system architecture 2800 may include a data layer 2802, a processing layer 2804, a serving later 2806 and a monitoring layer 2808. Each aware of the system architecture 2000 may include one or more software components that when operated in conjunction with hardware labor by one or more functions of the system. In some examples, the system architecture 2800 may operate on or as part of systems of FIGS. 12, 13, 16, 22, and/or 23.

The data layer 2802 may perform ingestion, cleaning and storage operations. Components in the data layer may serve the function of connecting source systems to the construct scoring system and ingesting data from those systems into storage of the construct scoring system. Data normalization and transformations can be applied in the data layer or the data may be left in its raw format so it can be analyzed in different and novel ways without having to ingest it from the source again. Raw data may pass through the data ingest layer and land to the data storage of the construct scoring system. In some examples, the data layer may be a data ingestion layer and a data storage layer.

As discussed above, the data layer may be configured to use large language models (LLMs) to extract information identifying constructors, constructs, and categories of constructs, Individual constructs may be associated with a particular constructor and associated with at least one particular category of constructs. The data layer may further be configured to store a knowledge graph of the constructors, constructs, and categories in a graph database, store structured data and unstructured data identifying the constructors, the constructs, and the categories in a relational database, and generate and store embeddings for images, texts, and metadata in the structured data and unstructured data in an embeddings database.

The processing layer 2804 may read data from storage and apply normalization techniques, transformations, and other logic that converts the raw data into structured, useful, and meaningful information for downstream consumption. For example, some processing layers may be configured to use data mining pipelines to analyze the structured data and unstructured data and the embeddings to update the knowledge graph. The processing layer may also use a plurality of scoring algorithms to consume the analysis of the data mining pipelines to generate scoring indicators for the constructs and use expert rules encoded in domain-specific languages to update the scoring indicators.

The serving layer 2806 may function by delivering the output of the data analytics/processing layer to downstream data consumers. In the example of FIG. 28, the serving layer may be configured to fine tune the updated scoring indicators and periodically write the fine-tuned updated scoring indicators to storage (e.g., unstructured data storage such as blob storage). Further, the serving layer may use application programming interfaces (APIs) to make the fine-tuned updated scoring indicators to end users and to display the fine-tuned updated scoring indicators across end user devices.

The monitoring layer 2808 may be configured to generate logs and metrics for performance and data quality of other layers and apply feedback loops to improve data ingestion and model weights of the other layers. Further, the monitoring layer may provide retraining and benchmarking of models in the other layers.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed, or elements thereof can be implemented in the form of a computer product, including a non-transitory computer readable storage medium with computer usable program code for performing the method steps indicated. Furthermore, one or more implementations and clauses of the technology disclosed, or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:

Clause Set 1

1. A system, comprising:
    memory storing constructor-to-construct mappings that map constructors to corresponding sets of one or more constructs associated with particular constructors;
    scraping logic, having access to the memory, and configured to periodically scrape, from one or more information networks, instances of mentions of the constructors and constructs of the corresponding sets of one or more constructs on the one or more information networks, and to store the scraped instances of the mentions in the memory; and
    scoring logic, having access to the memory, and configured to determine a score of a particular construct by a particular constructor based on scraped instances of mentions on the one or more information networks of intra-constructor constructs by the particular constructor,
        wherein the intra-constructor constructs are similar to the particular construct.
2. The system of clause 1, wherein the scraped instances of the mentions of the intra-constructor constructs include text features.
3. The system of clause 2, wherein the scraped instances of the mentions of the intra-constructor constructs include image features.
4. The system of clause 1, wherein the scoring logic is further configured to comprise natural language processing or image processing engines that are configured to process the scraped instances of the mentions of the intra-constructor constructs, and detect recent crowd sourced scores of the intra-constructor constructs.
5. The system of clause 4, wherein the scoring logic is further configured to determine the score of the particular construct based on the detected recent crowd sourced scores of the intra-constructor constructs.
6. The system of clause 4, wherein the memory is further configured to store a historical score of the intra-constructor constructs.
7. The system of clause 6, wherein the historical score of the intra-constructor constructs is based on historical crowd sourced scores of the intra-constructor constructs.
8. The system of clause 7, wherein the historical crowd sourced scores of the intra-constructor constructs are restricted to a time window.
9. The system of clause 7, wherein the historical crowd sourced scores of the intra-constructor constructs are adjusted for score scale drift.
10. The system of clause 4, wherein the scoring logic is further configured to determine the score of the particular construct based on a percentage change between the detected recent crowd sourced scores of the intra-constructor constructs and historical crowd sourced scores of the intra-constructor constructs.
11. The system of clause 10, wherein the scoring logic is further configured to determine the score of the particular construct based on an upward score pressure when the percentage change is positive.
12. The system of clause 11, wherein the scoring logic is further configured to determine the score of the particular construct based on a downward score pressure when the percentage change is negative.

13. The system of clause 1, wherein the memory is further configured to store constructor clusters that group similar constructors.
14. The system of clause 13, wherein the constructor clusters are based on shared forms.
15. The system of clause 13, wherein the constructor clusters are further based on shared categories.
16. The system of clause 13, wherein constructors in a particular constructor cluster are ranked as emerging, developed, and established.
17. The system of clause 1, wherein the scoring logic is further configured to determine the score of the particular construct based on scraped instances of mentions on the one or more information networks of inter-constructor constructs by other constructors similar to the particular constructor.
18. The system of clause 17, wherein the inter-constructor constructs by the other constructors are similar to the particular construct.
19. The system of clause 17, wherein the other constructors are selected based on sharing a same constructor cluster with the particular constructor.
20. The system of clause 17, wherein the other constructors are selected based on being established.
21. The system of clause 1, wherein the scoring logic is further configured to comprise natural language processing or image processing engines that are configured to process the scraped instances of the mentions of inter-constructor constructs, and detect recent crowd sourced scores of the inter-constructor constructs, wherein the inter-constructor constructs by the other constructors are similar to the particular construct.
22. The system of clause 21, wherein the scoring logic is further configured to determine the score of the particular construct based on the detected recent crowd sourced scores of the inter-constructor constructs.
23. The system of clause 1, wherein the scoring logic is further configured to comprise natural language processing or image processing engines that are configured to process the scraped instances of the mentions of the intra-constructor constructs, and detect recent increased interest in the intra-constructor constructs and associated sentiments.
24. The system of clause 23, wherein the scoring logic is further configured to determine the score of the particular construct based on the detected recent increased interest in the intra-constructor constructs and the associated sentiments.
25. The system of clause 1, wherein the scoring logic is further configured to comprise natural language processing or image processing engines that are configured to process the scraped instances of the mentions of the particular constructor, and detect recent increased interest in the particular constructor and associated sentiments.
26. The system of clause 25, wherein the scoring logic is further configured to determine the score of the particular construct based on the detected recent increased interest in the particular constructor and the associated sentiments.
27. The system of clause 1, wherein the scoring logic is further configured to comprise natural language processing or image processing engines that are configured to process the scraped instances of the mentions of categories related to the particular construct, and detect recent increased interest in the related categories and associated sentiments.

28. The system of clause 27, wherein the scoring logic is further configured to determine the score of the particular construct based on the detected recent increased interest in the related categories and the associated sentiments.

29. The system of clause 28, wherein the scoring logic is further configured to determine the score of the particular construct based on a weighted combination of a plurality of current popularity indicators, wherein the current popularity indicators include a percentage change between detected recent crowd sourced scores of the intra-constructor constructs and historical crowd sourced scores of the intra-constructor constructs, detected recent crowd sourced scores of inter-constructor constructs, detected recent increased interest in the intra-constructor constructs and associated sentiments, detected recent increased interest in the particular constructor and associated sentiments, the detected recent increased interest in the related categories and the associated sentiments, the intra-constructor constructs are other constructs of the particular constructor that are similar to the particular construct, and the inter-constructor constructs are constructs of the other constructors that are similar to the particular construct.

30. The system of clause 29, wherein the percentage change between the detected recent crowd sourced scores of the intra-constructor constructs and the historical crowd sourced scores of the intra-constructor constructs is weighted the most, followed by the detected recent crowd sourced scores of the inter-constructor constructs, followed by the detected recent increased interest in the intra-constructor constructs and the associated sentiments, followed by the detected recent increased interest in the particular constructor and the associated sentiments, and followed by the detected recent increased interest in the related categories and the associated sentiments.

31. The system of clause 30, wherein the memory is further configured to store a specification of influential sources.

32. The system of clause 31, wherein those ones of the scraped instances of the mentions that are made by the influential sources are weighted more.

33. The system of clause 29, wherein the weighted combination is modifiable based on human input.

34. The system of clause 1, wherein the scoring logic is further configured to determine the score of the particular construct based on using one or more of statistical analysis, machine learning analysis, or deep learning analysis.

35. The system of clause 1, wherein the scoring logic is further configured to comprise natural language processing or image processing engines that use one or more of statistical analysis, machine learning analysis, or deep learning analysis to process the scraped instances of the mentions of the intra-constructor constructs or inter-constructor constructs that are constructs of the other constructors that are similar to the particular construct.

36. The system of clause 1, wherein the scoring logic is further configured to comprise natural language processing or image processing engines that are configured to process the scraped instances of the mentions of the intra-constructor constructs, and detect recent accepted scores of the intra-constructor constructs.

37. The system of clause 36, wherein the scoring logic is further configured to determine the score of the particular construct based on the detected recent accepted scores of the intra-constructor constructs when the particular constructor is an active constructor.

38. The system of clause 37, wherein the scoring logic is further configured to determine the score of the particular construct based on weighting the detected recent accepted scores of the intra-constructor constructs less than detected recent crowd sourced scores of the intra-constructor constructs.

39. The system of clause 1, wherein the intra-constructor constructs by the particular constructor span multiple forms and multiple categories.

40. The system of clause 39, wherein the scoring logic is further configured to determine the score of the particular construct based on segmenting processing of the scraped instances of the mentions across the multiple forms and the multiple categories, and generating the plurality of current popularity indicators across the multiple forms and the multiple categories.

41. The system of clause 40, wherein the scoring logic is further configured to determine the score of the particular construct based on weighting more the plurality of current popularity indicators for those forms and categories for which the particular constructor is best known for.

42. The system of clause 1, wherein the scoring logic is further configured to determine the score of the particular construct based on a weighted combination of a plurality of current popularity indicators, and the system is further configured to display across a user interface the score of the particular construct along with the plurality of current popularity indicators and associated weights used in the weighted combination.

Clause Set 2

1. A computer-implemented method, including:
displaying a score of a particular construct by a particular constructor, wherein the score is determined using a plurality of current popularity indicators of the particular construct; and
displaying the plurality of current popularity indicators.

2. The computer-implemented method of clause 1, wherein the score is determined by using a weighted combination of the plurality of current popularity indicators.

3. The computer-implemented method of clause 2, further including displaying weights used in the weighted combination.

4. The computer-implemented method of clause 3, further including displaying respective application of the weights to respective current popularity indicators in the plurality of current popularity indicators.

5. The computer-implemented method of clause 1, further including:
storing constructor-to-construct mappings that map constructors to corresponding sets of one or more associated constructs;
periodically scraping, from one or more information networks, instances of mentions of the constructors or constructs of the corresponding sets of one or more associated constructs on the one or more information networks, and storing the scraped instances of the mentions; and
determining the score of the particular construct based on scraped instances of mentions on the one or more information networks of intra-constructor constructs by the particular constructor, wherein the intra-constructor constructs are similar to the particular construct.

6. The computer-implemented method of clause 5, wherein the scraped instances of the mentions of the intra-constructor constructs include text features.

7. The computer-implemented method of clause 6, wherein the scraped instances of the mentions of the intra-constructor constructs include image features.

8. The computer-implemented method of clause 5, further including using natural language processing or image processing engines to process the scraped instances of the mentions of the intra-constructor constructs, and to detect recent crowd sourced scores of the intra-constructor constructs.

9. The computer-implemented method of clause 8, further including determining the score of the particular construct based on the detected recent crowd sourced scores of the intra-constructor constructs.

10. The computer-implemented method of clause 8, further including storing a historical score of the intra-constructor constructs.

11. The computer-implemented method of clause 10, wherein the historical score of the intra-constructor constructs is based on historical crowd sourced scores of the intra-constructor constructs.

12. The computer-implemented method of clause 11, wherein the historical crowd sourced scores of the intra-constructor constructs are restricted to a time window.

13. The computer-implemented method of clause 11, wherein the historical crowd sourced scores of the intra-constructor constructs are adjusted for score scale drift.

14. The computer-implemented method of clause 8, further including determining the score of the particular construct based on a percentage change between the detected recent crowd sourced scores of the intra-constructor constructs and historical crowd sourced scores of the intra-constructor constructs.

15. The computer-implemented method of clause 14, further including determining the score of the particular construct based on an upward score pressure when the percentage change is positive.

16. The computer-implemented method of clause 15, further including determining the score of the particular construct based on a downward score pressure when the percentage change is negative.

17. The computer-implemented method of clause 5, wherein further including storing constructor clusters that group similar constructors.

18. The computer-implemented method of clause 17, wherein the constructor clusters are based on shared forms.

19. The computer-implemented method of clause 17, wherein the constructor clusters are further based on shared categories.

20. The computer-implemented method of clause 17, wherein constructors in a particular constructor cluster are ranked as emerging, developed, and established.

21. The computer-implemented method of clause 5, further including determining the score of the particular construct based on scraped instances of mentions on the one or more information networks of inter-constructor constructs by other constructors similar to the particular constructor.

22. The computer-implemented method of clause 21, wherein the inter-constructor constructs by the other constructors are similar to the particular construct.

23. The computer-implemented method of clause 22, wherein the other constructors are selected based on sharing a same constructor cluster with the particular constructor.

24. The computer-implemented method of clause 21, wherein the other constructors are selected based on being established.

25. The computer-implemented method of clause 5, further including using natural language processing or image processing engines to process the scraped instances of the mentions of inter-constructor constructs, and to detect recent crowd sourced scores of the inter-constructor constructs, wherein the inter-constructor constructs by the other constructors are similar to the particular construct.

26. The computer-implemented method of clause 24, further including determining the score of the particular construct based on the detected recent crowd sourced scores of the inter-constructor constructs.

27. The computer-implemented method of clause 5, further including using natural language processing or image processing engines to process the scraped instances of the mentions of the intra-constructor constructs, and to detect recent increased interest in the intra-constructor constructs and associated sentiments.

28. The computer-implemented method of clause 27, further including determining the score of the particular construct based on the detected recent increased interest in the intra-constructor constructs and the associated sentiments.

29. The computer-implemented method of clause 5, further including using natural language processing or image processing engines to process the scraped instances of the mentions of the particular constructor, and to detect recent increased interest in the particular constructor and associated sentiments.

30. The computer-implemented method of clause 29, further including determining the score of the particular construct based on the detected recent increased interest in the particular constructor and the associated sentiments.

31. The computer-implemented method of clause 5, further including using natural language processing or image processing engines to process the scraped instances of the mentions of categories related to the particular construct, and to detect recent increased interest in the related categories and associated sentiments.

32. The computer-implemented method of clause 31, further including determining the score of the particular construct based on the detected recent increased interest in the related categories and the associated sentiments.

33. The computer-implemented method of clause 32, wherein the plurality of current popularity indicators includes a percentage change between detected recent crowd sourced scores of the intra-constructor constructs and historical crowd sourced scores of the intra-constructor constructs, detected recent crowd sourced scores of inter-constructor constructs, detected recent increased interest in the intra-constructor constructs and associated sentiments, detected recent increased interest in the particular constructor and associated sentiments, the detected recent increased interest in the related categories and the associated sentiments, the intra-constructor constructs are other constructs of the particular constructor that are similar to the particular construct, and the inter-constructor constructs are constructs of the other constructors that are similar to the particular construct.

34. The computer-implemented method of clause 33, wherein the percentage change between the detected recent crowd sourced scores of the intra-constructor constructs and the historical crowd sourced scores of the intra-constructor constructs is weighted the most, followed by the detected recent crowd sourced scores of the inter-constructor constructs, followed by the detected recent increased interest in the intra-constructor constructs and the associated sentiments, followed by the detected recent increased interest in the particular constructor and the associated sentiments, and followed by the detected recent increased interest in the related categories and the associated sentiments.

35. The computer-implemented method of clause 34, further including storing a specification of influential sources.

36. The computer-implemented method of clause 35, wherein those ones of the scraped instances of the mentions that are made by the influential sources are weighted more.

37. The computer-implemented method of clause 5, wherein the score is determined by using a weighted combination of the plurality of current popularity indicators and the weighted combination is modifiable based on human input.

38. The computer-implemented method of clause 5, further including determining the score of the particular construct based on using one or more of statistical analysis, machine learning analysis, or deep learning analysis.

39. The computer-implemented method of clause 5, further including using natural language processing or image processing engines that use one or more of statistical analysis, machine learning analysis, or deep learning analysis to process the scraped instances of the mentions of the intra-constructor constructs or inter-constructor constructs, the intra-constructor constructs are other constructs of the particular constructor that are similar to the particular construct, and the inter-constructor constructs are constructs of the other constructors that are similar to the particular construct.

40. The computer-implemented method of clause 5, further including using natural language processing or image processing engines to process the scraped instances of the mentions of the intra-constructor constructs, and to detect recent accepted scores of the intra-constructor constructs.

41. The computer-implemented method of clause 40, further including determining the score of the particular construct based on the detected recent accepted scores of the intra-constructor constructs when the particular constructor is an active constructor.

42. The computer-implemented method of clause 41, further including determining the score of the particular construct based on weighting the detected recent accepted scores of the intra-constructor constructs less than the detected recent crowd sourced scores of the intra-constructor constructs.

43. The computer-implemented method of clause 5, wherein the intra-constructor constructs by the particular constructor span multiple forms and multiple categories.

44. The computer-implemented method of clause 5, further including determining the score of the particular construct based on segmenting processing of the scraped instances of the mentions across the multiple forms and the multiple categories, and generating the plurality of current popularity indicators across the multiple forms and the multiple categories and wherein the scoring logic is further configured to determine the score of the particular construct based on a weighted combination of the plurality of current popularity indicators.

45. The computer-implemented method of clause 44, wherein the scoring logic is further configured to determine the score of the particular construct based on weighting more the plurality of current popularity indicators for those forms and categories for which the particular constructor is best known for.

Clause Set 3

1. A system, comprising:
   data ingestion and cleaning logic configured to:
      ingest structured data and unstructured data identifying one or more constructors, one or more constructs, and one or more categories of constructs, wherein individual constructs of the one or more constructs are:
         associated with at least one particular constructor of the one or more constructors; and
         associated with at least one particular category of the one or more categories of constructs; and
      clean the ingested structured and unstructured data to generate cleansed structured data and cleansed unstructured data;
   knowledge graph generation logic configured to:
      represent in a constructor graph the one or more constructors, the one or more constructs, and the one or more categories as nodes of the constructor graph;
      represent, using edges between the nodes of the constructor graph:
         similarity between constructors of the one or more constructors;
         similarity between constructs of the one or more constructs; and
         influences between the categories of the one or more categories of constructs; and
      identify clusters of nodes in the constructor graph and central nodes of the clusters of nodes;
   sentiment analysis logic configured to use natural language processing to detect entries in the cleansed structured data and cleansed unstructured data that identify the one or more constructors, the one or more constructs, and the one or more categories and associated sentiments;
   baselining logic configured to:
      determine from past score records of constructs of a target constructor and of constructors similar to the target constructor, a baseline score indicator for a target construct by the target constructor, wherein constructor similarity is determined by querying the target construct and the target constructor against the clusters in the constructor graph, and wherein the determination of the baseline score indicator takes into account a weighted combination of (i) the past score records of the constructs of the target constructor, (ii) the past score records of the constructs of the constructors similar to the target constructor, and (iii) the associated sentiments as detected for the target construct, the target constructor, and a category of the target construct and the target constructor;

expert knowledge basing logic configured to use expert rule sets to generate a final score indicator based on applying the expert rule sets to the baseline score indicator; and explanation logic configured to display the final score indicator in conjunction with a breakdown of application of the weighted combination and the expert rule sets.

2. The system of clause 1, wherein the structured data includes past score records and crowd sourced score data.

3. The system of clause 1, wherein the unstructured data includes data from one or more of one or more information networks.

4. The system of clause 1, wherein the data ingestion and cleaning logic is configured to clean the ingested structured and unstructured data to cleanse missing values and outliers.

5. The system of clause 1, wherein the clusters of nodes and the central nodes of the clusters in the constructor graph are identified using graph analytics.

6. The system of clause 1, wherein the structured data and unstructured data identifying the one or more constructors, the one or more constructs, and the one or more categories include text features.

7. The system of clause 1, wherein the structured data and unstructured data identifying the one or more constructors, the one or more constructs, and the one or more categories include image features.

8. The system of clause 1, wherein the past score records include recent crowd sourced scores of intra-constructor constructs and the data ingestion and cleaning logic is further configured to use natural language processing or image processing engines that are configured to process the structured data and unstructured data and detect the recent crowd sourced scores of the intra-constructor constructs, and the intra-constructor constructs are similar to the target construct.

9. The system of clause 8, wherein the baselining logic is further configured to determine the baseline score indicator of the target construct based on the detected recent crowd sourced scores of intra-constructor constructs.

10. The system of clause 8, further comprising a memory is configured to store a historical score of the intra-constructor constructs.

11. The system of clause 10, wherein the historical score of the intra-constructor constructs is based on historical crowd sourced scores of the intra-constructor constructs.

12. The system of clause 11, wherein the historical crowd sourced scores of the intra-constructor constructs are restricted to a time window.

13. The system of clause 11, wherein the historical crowd sourced scores of the intra-constructor constructs are adjusted for score scale drift.

14. The system of clause 8, wherein the baselining logic is further configured to determine the baseline score indicator of the particular construct based on a percentage change between the detected recent crowd sourced scores of the intra-constructor constructs and historical crowd sourced scores of the intra-constructor constructs.

15. The system of clause 14, wherein the baselining logic is further configured to determine the baseline score indicator of the particular construct based on an upward score pressure when the percentage change is positive.

16. The system of clause 15, wherein the baselining logic is further configured to determine the baseline score indicator of the particular construct based on a downward score pressure when the percentage change is negative.

17. The system of clause 1, wherein one or more of the clusters of nodes are constructor clusters that group similar constructors.

18. The system of clause 17, wherein the constructor clusters are based on shared forms.

19. The system of clause 17, wherein the constructor clusters are based on shared categories.

20. The system of clause 17, wherein constructors in a particular constructor cluster are ranked as emerging, developed, and established.

21. The system of clause 1, wherein the baselining logic is further configured to determine the baseline score indicator of the target construct based on data from one or more of one or more information networks of inter-constructor constructs by other constructors similar to the target constructor.

22. The system of clause 21, wherein the inter-constructor constructs by the other constructors are similar to the target construct.

23. The system of clause 21, wherein the other constructors are selected based on sharing a same cluster with the target constructor.

24. The system of clause 21, wherein the other constructors are selected based on being established.

25. The system of clause 1, wherein the past score records include recent crowd sourced scores of inter-constructor constructs and the data ingestion and cleaning logic is configured to use natural language processing or image processing engines that are further configured to process the structured data and the unstructured data and detect recent crowd sourced scores of the inter-constructor constructs, and the inter-constructor constructs are similar to the target construct.

26. The system of clause 25, wherein the baselining logic is further configured to determine the baseline score indicator of the target construct based on the detected recent crowd sourced scores of the inter-constructor constructs.

27. The system of clause 1, wherein the data ingestion and cleaning logic is further configured to use natural language processing or image processing engines that are configured to process the structured data and unstructured data identifying the one or more constructors, the one or more constructs, and the one or more categories and detect recent increased interest in intra-constructor constructs and associated sentiments, and the intra-constructor constructs are similar to the target construct.

28. The system of clause 27, wherein the baselining logic is further configured to determine the baseline score indicator of the target construct based on the detected recent increased interest in the intra-constructor constructs and the associated sentiments.

29. The system of clause 1, wherein the data ingestion and cleaning logic is further configured to use natural language processing or image processing engines that are configured to process at least a portion of the structured data and unstructured data identifying the target constructor and detect recent increased interest in the target constructor and associated sentiments.

30. The system of clause 29, wherein the baselining logic is further configured to determine the baseline score indicator of the target construct based on the detected recent increased interest in the target constructor and the associated sentiments.

31. The system of clause 1, wherein the data ingestion and cleaning logic is further configured to use natural language processing or image processing engines that are configured to process at least a portion of the structured data and unstructured data identifying one or more categories related to the target construct and detect recent increased interest in the related categories and associated sentiments.

32. The system of clause 31, wherein the baselining logic is further configured to determine the baseline score indicator of the target construct based on the detected recent increased interest in the related categories and the associated sentiments.

33. The system of clause 32, wherein the baselining logic is further configured to determine the baseline score indicator of the target construct based on a weighted combination of a plurality of current popularity indicators, wherein the current popularity indicators include a percentage change between a detected recent crowd sourced scores of the intra-constructor constructs and historical crowd sourced scores of the intra-constructor constructs, a detected recent crowd sourced scores of inter-constructor constructs, a detected recent increased interest in intra-constructor constructs and associated sentiments, a detected recent increased interest in the target constructor and associated sentiments, and the detected recent increased interest in the related categories and the associated sentiments, and the intra-constructor constructs are other constructs of the target constructor that are similar to the target construct and the inter-constructor constructs are constructs of the other constructors that are similar to the target construct.

34. The system of clause 33, wherein the percentage change between the detected recent crowd sourced scores of the intra-constructor constructs and the historical crowd sourced scores of the intra-constructor constructs is weighted the most, followed by the detected recent crowd sourced scores of the inter-constructor constructs, followed by the detected recent increased interest in the intra-constructor constructs and the associated sentiments, followed by the detected recent increased interest in the particular constructor and the associated sentiments, and followed by the detected recent increased interest in the related categories and the associated sentiments.

35. The system of clause 34, wherein a memory is further configured to store a specification of influential sources.

36. The system of clause 35, wherein at least another portion of the structured data and unstructured data from the influential sources is weighted more.

37. The system of clause 33, wherein the weighted combination is modifiable based on human input.

38. The system of clause 1, wherein the baselining logic is further configured to determine the baseline score indicator of the target construct at least in part using statistical analysis, machine learning analysis, or deep learning analysis.

39. The system of clause 1, wherein the data ingestion and cleaning logic is further configured to use natural language processing or image processing engines that use statistical analysis, machine learning analysis, or deep learning analysis to process the structured data and unstructured data identifying intra-constructor constructs or the inter-constructor constructs and the intra-constructor constructs are other constructs of the target constructor that are similar to the target construct and the inter-constructor constructs are constructs of the other constructors that are similar to the target construct.

40. The system of clause 1, wherein the past score records include recent accepted scores of intra-constructor constructs and the data ingestion and cleaning logic is configured to use natural language processing or image processing engines that are configured to process the structured data and unstructured data and detect the recent accepted scores of the intra-constructor constructs, and the intra-constructor constructs are similar to the target construct.

41. The system of clause 40, wherein the baselining logic is further configured to determine the baseline score indicator of the target construct based on the detected recent accepted scores of the intra-constructor constructs when the particular constructor is an active constructor.

42. The system of clause 41, wherein the baselining logic is further configured to determine the baseline score indicator of the target construct based on weighting the detected recent accepted scores of the intra-constructor constructs less than detected recent crowd sourced scores of the intra-constructor constructs.

43. The system of clause 1, wherein the constructs of the target constructor span multiple forms and multiple categories.

44. The system of clause 43, wherein the baselining logic is further configured to determine the baseline score indicator of the target construct based on segmenting processing of the at least a portion of the structured data and unstructured data identifying the multiple forms and the multiple categories, and generate a plurality of current popularity indicators across the multiple forms and the multiple categories and wherein the baselining logic is further configured to determine the baseline score indicator of the target construct based on a weighted combination of a plurality of current popularity indicators.

45. The system of clause 44, wherein the baselining logic is further configured to determine the baseline score indicator of the target construct based on weighting more the plurality of current popularity indicators for those forms and categories which the target constructor is most associated with.

46. The system of clause 5, wherein the baselining logic is further configured to determine the baseline score indicator of the target construct based on a weighted combination of a plurality of current popularity indicators and the explanation logic further displays across the user interface the plurality of current popularity indicators and associated weights used in the weighted combination of the plurality of current popularity indicators.

Clause Set 4

1. A system, comprising:
   a data layer configured to:
      use large language models (LLMs) to extract information identifying one or more constructors, one or more constructs, and one or more categories of constructs, wherein individual constructs of the one or more constructs are:
         associated with at least one particular constructor of the one or more constructors; and
         associated with at least one particular category of the one or more categories of constructs;
      store a knowledge graph of the constructors, constructs, and categories in a graph database;
      store structured data and unstructured data identifying the constructors, the constructs, and the categories in a relational database; and
      generate and store embeddings for images, texts, and metadata in the structured data and unstructured data in an embeddings database;
   a processing layer configured to:
      use data mining pipelines to analyze the structured data and unstructured data and the embeddings to update the knowledge graph;
      use a plurality of scoring algorithms to consume the analysis of the data mining pipelines to generate scoring indicators for the constructs; and
      use expert rules encoded in domain-specific languages to update the scoring indicators;
   serving layer configured to further fine tune the updated scoring indicators, to periodically write the fine-tuned updated scoring indicators to blob storage, and to use application programming interfaces (APIs) to make the fine-tuned updated scoring indicators to end users, and to display the fine-tuned updated scoring indicators across end user devices; and
   monitoring layer configured to generate logs and metrics for performance and data quality of other layers, apply feedback loops to improve data ingestion and model weights of the other layers, and provide retraining and benchmarking of models in the other layers.
2. The system of clause 1, wherein the structured data includes past score records and crowd sourced score data.
3. The system of clause 1, wherein the unstructured data includes data from one or more of one or more information networks.
4. The system of clause 1, wherein the structured and unstructured data is cleansed from missing values and outliers.
5. The system of clause 1, wherein the knowledge graph further identifies clusters of nodes in the knowledge graph and central nodes of the clusters of nodes, wherein the clusters of nodes and the central nodes of the clusters of nodes in the knowledge graph are identified using graph analytics.
6. The system of clause 1, further configured to use convolutional neural network (CNNs) embeddings to learn visual features from images to find similar styles and themes of the constructs.
7. The system of clause 6, further configured to use the CNNs to compare visual constructs.
8. The system of clause 1, further configured to use Word2Vec embeddings to learn vector representations of words and phrases.
9. The system of clause 8, further configured to use the Word2Vec embeddings to find similarity between construct titles and descriptions.
10. The system of clause 1, further configured to use graph community detection algorithms to identify clusters of related nodes in the knowledge graph.
11. The system of clause 10, further configured to use the graph community detection algorithms to find related constructors or related categories.
12. The system of clause 1, further configured to use a plurality of analytic models, including ANOVA, network centrality metrics, sentiment analysis, Hedonic regression, probit regression, and OLS regression.
13. The system of clause 1, wherein the knowledge graph is further configured to store constructor clusters that group similar constructors.
14. The system of clause 13, wherein the constructor clusters are based on shared forms of constructs.
15. The system of clause 13, wherein the constructor clusters are further based on shared categories of constructs.
16. The system of clause 13, wherein constructors in a particular constructor cluster are ranked as emerging, developed, and established.
17. The system of clause 1, wherein a memory is further configured to store a specification of influential sources of the structured and unstructured data.
18. The system of clause 17, wherein at least a portion of the structured data or unstructured data from the influential sources is weighted more.
33. The system of clause 32, wherein the generating the scoring indicators is configured to determine the scoring indicator of a target construct based on a weighted combination of a plurality of current popularity indicators, wherein the current popularity indicators include a percentage change between detected recent crowd sourced scores of intra-constructor constructs and historical crowd sourced scores of the intra-constructor constructs, detected recent crowd sourced scores of the inter-constructor constructs, a detected recent increased interest in intra-constructor constructs and associated sentiments, a detected recent increased interest in the target constructor and associated sentiments, and the detected recent increased interest in the related categories and the associated sentiments, and the intra-constructor constructs are other constructs of the target constructor that are similar to the target construct and the inter-constructor constructs are constructs of other constructors that are similar to the target construct.
20. The system of clause 19, wherein the weighted combination is modifiable based on human input.

What is claimed is:
1. A system, comprising:
   a data layer configured to:
      use large language models (LLMs) to extract information identifying one or more constructs, identifying one or more constructors that constructed the one or more constructs, and identifying one or more cat- egories of constructs, wherein individual constructs of the one or more constructs are:

pre-existing;

associated with at least one particular constructor of the one or more constructors that constructed the individual construct; and associated with at least one particular category of the one or more categories of constructs;

store a knowledge graph of the constructors, constructs, and categories in a graph database;

store structured data and unstructured data identifying the constructors, the constructs, and the categories in a relational database; and generate and store embeddings for images, texts, and metadata in the structured data and unstructured data in an embeddings database;

a processing layer configured to:

use data mining pipelines to analyze the structured data and unstructured data and the embeddings to update the knowledge graph;

use a plurality of scoring algorithms to consume the analysis of the data mining pipelines to generate scoring indicators for the constructs, wherein:

the generating the scoring indicators is configured to determine the scoring indicator of a target construct based on a weighted combination of a plurality of current popularity indicators, wherein the current popularity indicators include a percentage change between detected recent crowd sourced scores of intra-constructor constructs and historical crowd sourced scores of the intra-constructor constructs, detected recent crowd sourced scores of the inter-constructor constructs, a detected recent increased interest in intra-constructor constructs and associated sentiments, a detected recent increased interest in the target constructor and associated sentiments, and the detected recent increased interest in the related categories and the associated sentiments, and the intra-constructor constructs are other constructs of the target constructor that are similar to the target construct and the inter-constructor constructs are constructs of other constructors that are similar to the target construct, a memory is further configured to store a specification of influential sources of the structured and unstructured data, and at least a portion of the structured data or unstructured data from the influential sources is weighted more in the generating the scoring indicators; and use expert rules encoded in domain-specific languages to update the scoring indicators;

serving layer configured to further fine tune the updated scoring indicators, to periodically write the fine-tuned updated scoring indicators to blob storage, and to use application programming interfaces (APIs) to make the fine-tuned updated scoring indicators to end users, and to display the fine-tuned updated scoring indicators across end user devices; and monitoring layer configured to generate logs and metrics for performance and data quality of other layers, apply feedback loops to improve data ingestion and model weights of the other layers, and provide retraining and benchmarking of models in the other layers, wherein the knowledge graph is further configured to store constructor clusters that group similar constructors, wherein the constructor clusters are based on shared forms of constructs, wherein the constructor clusters are further based on shared categories of constructs, and wherein constructors in a particular constructor cluster are ranked as emerging, developed, and established.

2. The system of claim 1, wherein the structured data includes past score records and crowd sourced score data.

3. The system of claim 1, wherein the unstructured data includes data from one or more of one or more information networks.

4. The system of claim 1, wherein the structured and unstructured data is cleansed from missing values and outliers.

5. The system of claim 1, wherein the knowledge graph further identifies clusters of nodes in the knowledge graph and central nodes of the clusters of nodes, wherein the clusters of nodes and the central nodes of the clusters of nodes in the knowledge graph are identified using graph analytics.

6. The system of claim 1, further configured to use convolutional neural network (CNNs) embeddings to learn visual features from images to find similar styles and themes of the constructs.

7. The system of claim 6, further configured to use the CNNs to compare visual constructs.

8. The system of claim 1, further configured to use Word2Vec embeddings to learn vector representations of words and phrases.

9. The system of claim 8, further configured to use the Word2Vec embeddings to find similarity between construct titles and descriptions.

10. The system of claim 1, further configured to use graph community detection algorithms to identify clusters of related nodes in the knowledge graph.

11. The system of claim 10, further configured to use the graph community detection algorithms to find related constructors or related categories.

12. The system of claim 1, further configured to use a plurality of analytic models, including ANOVA, network centrality metrics, sentiment analysis, Hedonic regression, probit regression, and OLS regression.

13. The system of claim 1, wherein the weighted combination is modifiable based on human input.

* * * * *